US012633010B2

(12) United States Patent
Dalton

(10) Patent No.: US 12,633,010 B2
(45) Date of Patent: May 19, 2026

(54) SYSTEM AND METHOD FOR SINGLE-PASS PATH RENDERING USING COVERAGE COUNTING

(71) Applicant: Rive Inc., San Francisco, CA (US)

(72) Inventor: Christopher Dalton, San Francisco, CA (US)

(73) Assignee: Rive Inc., San Francisco, CA (US)

( * ) Notice: Subject to any disclaimer, the term of this patent is extended or adjusted under 35 U.S.C. 154(b) by 112 days.

(21) Appl. No.: 18/518,941

(22) Filed: Nov. 24, 2023

(65) Prior Publication Data

US 2024/0169620 A1     May 23, 2024

Related U.S. Application Data

(60) Provisional application No. 63/384,924, filed on Nov. 23, 2022.

(51) Int. Cl.
| | |
|---|---|
| *G06T 11/40* | (2006.01) |
| *G06T 1/20* | (2006.01) |
| *G06T 1/60* | (2006.01) |
| *G06T 11/20* | (2006.01) |

(52) U.S. Cl.
CPC ............... *G06T 11/40* (2013.01); *G06T 1/20* (2013.01); *G06T 1/60* (2013.01); *G06T 11/203* (2013.01)

(58) Field of Classification Search
CPC ... G06T 11/40; G06T 1/20; G06T 1/60; G06T 11/203
See application file for complete search history.

(56) References Cited

U.S. PATENT DOCUMENTS

| | | | |
|---|---|---|---|
| 7,148,897 B2 | 12/2006 | Ecob | |
| 7,952,580 B1 | 5/2011 | Yhann | |
| 8,243,070 B1 | 8/2012 | Brown | |
| 8,773,432 B2 | 7/2014 | Brown | |
| 9,330,495 B2 | 5/2016 | Goel et al. | |
| 2004/0207642 A1 | 10/2004 | Crisu | |
| 2004/0233210 A1 | 11/2004 | Hancock | |
| 2007/0103475 A1* | 5/2007 | Huang .................. | G06T 15/005 |
| | | | 345/522 |
| 2011/0285740 A1 | 11/2011 | Kilgard | |
| 2013/0104036 A1 | 4/2013 | Nordback | |
| 2014/0043342 A1* | 2/2014 | Goel ......................... | G06T 9/00 |
| | | | 345/501 |

(Continued)

OTHER PUBLICATIONS

Fredriksen, "Pixel Local Storage on Arm Mali GPUs" (Year: 2014).*

(Continued)

*Primary Examiner* — Kee M Tung
*Assistant Examiner* — Xiaoming Wei
(74) *Attorney, Agent, or Firm* — PATENT LAW WORKS LLP

(57) ABSTRACT

An improved algorithm and technique for use in interactive graphics is disclosed. The new algorithm works by keeping three values in fast, memoryless pixel local storage for coverage counting (store the current coverage count at the pixel being covered), original framebuffer color (stores the color that was in the framebuffer at the pixel being covered immediately before the current path starts rendering), and the path ID (stores the unique ID of the last path to be drawn at the current pixel). The framebuffer is accessed from a fourth, texture-backed, pixel local storage plane.

20 Claims, 46 Drawing Sheets

(56)                    References Cited

U.S. PATENT DOCUMENTS

| | | |
|---|---|---|
| 2015/0062142 A1 | 3/2015 | Goel et al. |
| 2015/0077420 A1 | 3/2015 | Bolz |
| 2017/0316604 A1* | 11/2017 | Yang ..................... G06T 17/20 |
| 2019/0057536 A1* | 2/2019 | Fenney ................... G06T 3/18 |
| 2019/0108663 A1 | 4/2019 | Batra |

OTHER PUBLICATIONS

Google Git, "Angle_shader_pixel_local_storage.txt" Git at Google, ,https://chromium.googlesource.com/angle/angle/+/HEAD/extensions/ANGLE_shader_pixel_local_storage.txt modified Aug. 18, 2022, 8 pgs.

Kessenich John M et al. OpenGL Programming Guide: The Official Guide to Learning Opengl. Chapter 14, Now That You Know. Addison-Wesley 2017, Version 1.1 https://www.glprogramming.com/red/chapter14.html#name 13. Accessed Oct. 30, 2023. 21 pgs.

Liland, Eivind Lyngsnes, "Path Rasterizer for OpenVG" NTNU Institutt for datateknikk og informasjonsvitenskap, 2007. retrieved on Feb. 1, 2024, https://ntnuopen.ntnu.no/ntnu-xmlui/handle/11250/252871.

Loop, Charles and Blinn, Jim. "Resolution Independent Curve Rendering Using Programmable Graphics Hardware." Acm Transactions on Graphics (Tog) 2005 pp. 1000-1009. https://doi.org/10.1145/1073204.1073303.

PCT International Search Report and Written Opinion, Application No. PCT/US23/81043 Rive Inc. date of mailing Apr. 1, 2024, 7 pgs.

Salomon, Brian, et al. "Path rendering by counting pixel coverage", Technical Disclosure Commons, May 17, 2017, http://www.tdcommons.org/dpubs_series/525, 12 pgs.

Fredriksen, "Pixel Local Storage on Arm Mali GPUs" (2014).

America, Wilcom, "New EmbroideryStudio E4 Designing Element: Spiral Fills." YouTube, YouTube, May 8, 2017, www.youtube.com/watchv=RebNFgzFRk8. (Year: 2017).

Brown, Sue, "Wilcom E4 Check out These New Elements Motifs Will Never Be the Same" YouTube, OML Embroidery, Mar. 15, 2019, www.youtube.com/watchv=BAi1LqrpYNg. (Year: 2019).

Johnson, Angus. Fill Rule [Online]. Aug. 18, 2022 [Date from Wayback Machine. Retrieved on Sep. 18, 2025]. Retrieved from the Internet: URL: https://www.angusj.com/clipper2/Docs/Units/Clipper/Types/FillRule.htm (Year: 2022).

Wang et al. Decoupled Coverage Anti-Aliasing [Online]. Aug. 7, 2015 [Retrieved on Sep. 22, 2025]. Retrieved from the Internet: URL: http://dl.acm.org/doi/pdf/10.1145/2790060.2790068 (Year: 2015).

* cited by examiner

230

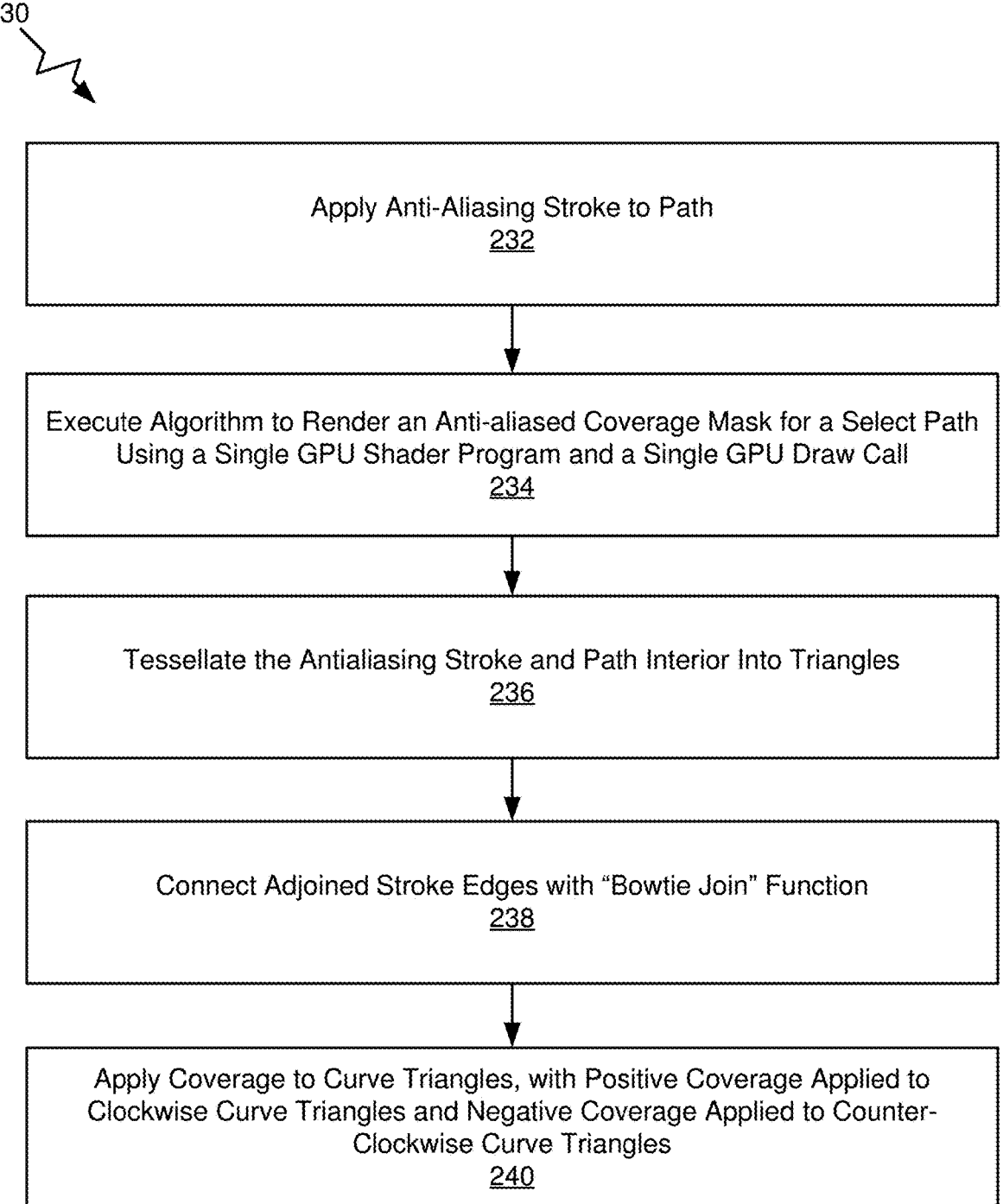

Apply Anti-Aliasing Stroke to Path
232

Execute Algorithm to Render an Anti-aliased Coverage Mask for a Select Path
Using a Single GPU Shader Program and a Single GPU Draw Call
234

Tessellate the Antialiasing Stroke and Path Interior Into Triangles
236

Connect Adjoined Stroke Edges with "Bowtie Join" Function
238

Apply Coverage to Curve Triangles, with Positive Coverage Applied to
Clockwise Curve Triangles and Negative Coverage Applied to Counter-
Clockwise Curve Triangles
240

FIG. 2B

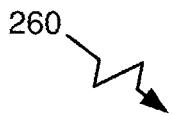

260

Algorithm Maintains Three Values in Fast, Memoryless Pixel Local Storage: currentPathID, coverageCount, and framebufferOriginalColor
262

Stores the Current Coverage Count at the Pixel Being Covered
264

Store the Color in the Framebuffer at the Pixel Being Covered Immediately Before the Current Path Starts Rendering
266

Stores the Unique ID of the Last Path to be Drawn at the Current Pixel
268

If Multiple Fragments From a Single Path Touch the Same Pixel, the framebufferOriginalColor Value allows to re-blend the path into the framebuffer using the updated coverageCount Value
270

If the pathID Being Rendered Doesn't Match the One in Pixel Local Storage, Then This is the First Fragment From That Path to Touch the Pixel
272

Load the Current Framebuffer Color Into the framebufferOriginalColor Value in Pixel Local Storage (Enables Single-Pass Path Rendering as the Right Answer is Still Obtained, Even When Fragments Overlap)
274

Reset Coverage Count to Zero (Enables Batching of Multiple Paths)
276

Update the currentPathID Value in Pixel Local Storage to Match the PathID Being Rendered
278

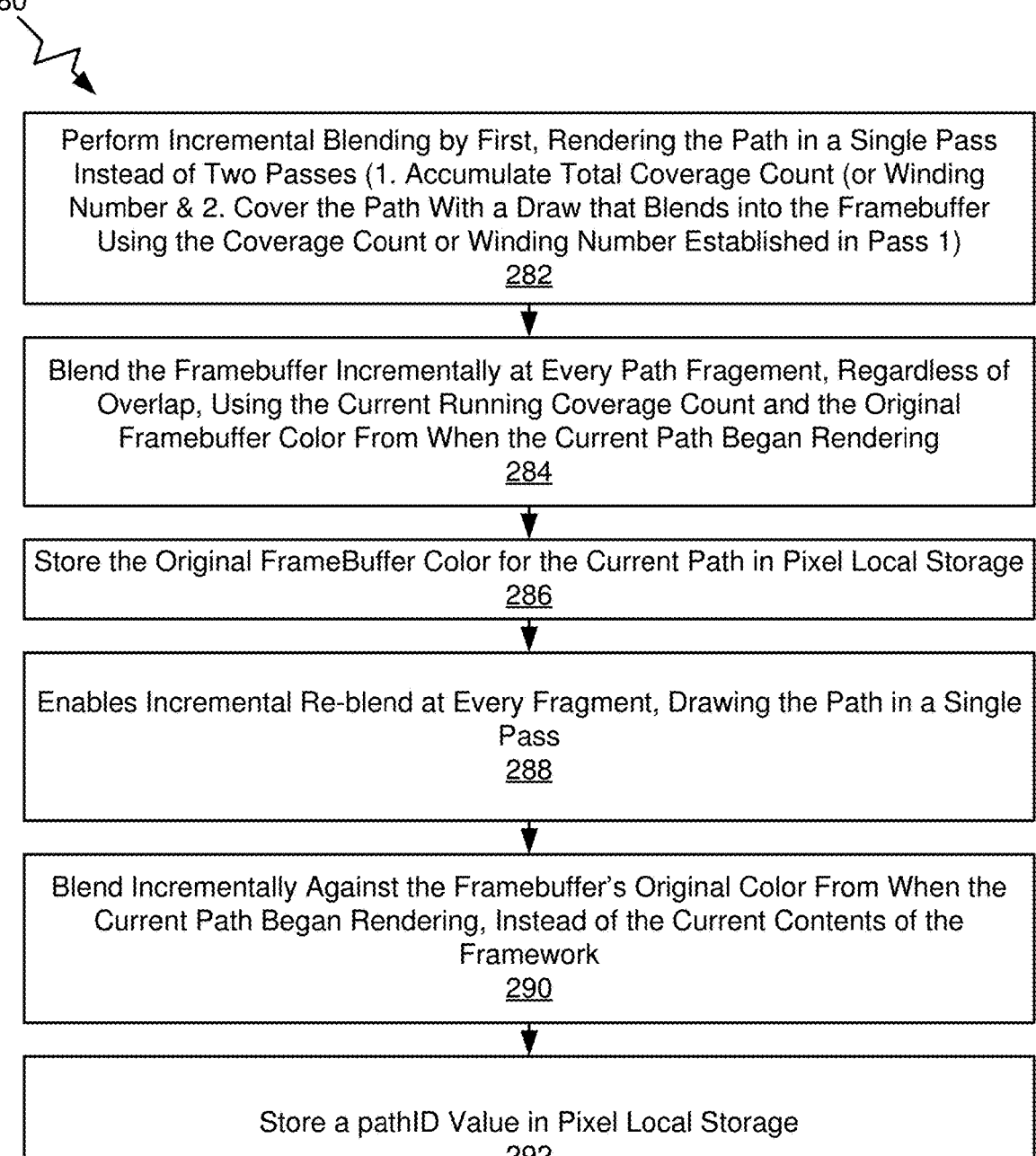

Perform Incremental Blending by First, Rendering the Path in a Single Pass Instead of Two Passes (1. Accumulate Total Coverage Count (or Winding Number & 2. Cover the Path With a Draw that Blends into the Framebuffer Using the Coverage Count or Winding Number Established in Pass 1)
282

Blend the Framebuffer Incrementally at Every Path Fragement, Regardless of Overlap, Using the Current Running Coverage Count and the Original Framebuffer Color From When the Current Path Began Rendering
284

Store the Original FrameBuffer Color for the Current Path in Pixel Local Storage
286

Enables Incremental Re-blend at Every Fragment, Drawing the Path in a Single Pass
288

Blend Incrementally Against the Framebuffer's Original Color From When the Current Path Began Rendering, Instead of the Current Contents of the Framework
290

Store a pathID Value in Pixel Local Storage
292

'A: 134
B: 123 134
C: 134 145
'D: 134 145 156
E: 123 134 145 156
'F: 156
G: 123 156
H: 156 167
I: (none)

400

404

402

500

502

| coverage = -1 | coverage = 0 | coverage = +1 |

600

602

700

702

800

802

900

902

1000

1002

1100

1102

1200

1202 coverage = -1          coverage = 0          coverage = +1

1300

1302

1400

1402 coverage = -1          coverage = 0          coverage = +1

1500

1502

1700

1702

1900

1902

2000

2002

2200

2202

2300

2302

2400

2402

2500

2700

2702

2704

2800

2802

2804

2900

2902

2904

3000

3002

3004

3100

3102

3104

3300

3302

3304

3400

3402

3404

3500

3502

3504

3600

3602

3604

3900

3902

3904

4100

4102

4104

4202

4204

4300

4302

4304

SYSTEM AND METHOD FOR SINGLE-PASS PATH RENDERING USING COVERAGE COUNTING

CROSS REFERENCE TO RELATED APPLICATIONS

This application claims priority under 35 USC § 119(e) to the provisional U.S. Application No. 63/384,924, titled "The "Single-pass Path Rendering Using Coverage Counting" and filed on Nov. 23, 2022, wherein the entirety of the provisional application is herein incorporated by reference.

BACKGROUND

1. Field of the Invention

The present invention relates generally to the field of interactive computer graphics. More particularly, the present invention relates to a system, methods, and processes with algorithms for single-pass, antialiased path rendering capable of speedy performance on any path, using coverage counting and pixel local storage.

2. Description of the Related Art

Interactive graphics refers to a computer graphics system that allows users or operators to interact with the graphical information presented on a display of a computing device, using one or more of a number, of input devices, some of which are aimed at delivering positions relevant to the information being displayed. Almost all computer workstations and personal systems are now able to be used interactively. An interactive graphic is a way to present data to users who visit a page containing animations and customizations, creating a unique experience for those who wish to review specific information. Therefore, instead of just presenting a fixed frame, the system enables each user to interact with the images displayed in any way they want. Interactive graphics may be applications on their own or alternatively, may be embedded within applications. They may contain multiple forms of images, such as photography, video, and illustrations, and typically incorporate principles of successful image design as well as design and presentation of appropriate controls. Interactive graphics are used to configure images, in myriad applications, including teaching tools, educational games, wherein input and feedback are key to engagement, in demos, simulations, or the like. Interactive graphics provide an opportunity to manipulate things and see results.

It is well known to those skilled in the art that path rendering is a style of resolution-independent two-dimensional ("2D") rendering, often referred to as "vector graphics," which is the basis for a number of important rendering standards such as PostScript, Java 2D, Apple's Quartz 2D, OpenVG, PDF, TrueType fonts, OpenType fonts, PostScript fonts, Scalable Vector Graphics (SVG) web format, Microsoft's Silverlight and Adobe Flash for interactive web experiences, Open XML Paper Specification (OpenXPS), drawings in Office file formats including PowerPoint, Adobe Illustrator illustrations, and more. Path rendering is resolution-independent meaning that a scene is described by paths without regard to the pixel resolution of the framebuffer. It will also be recognized by those skilled in the art, that this is in contrast to the resolution-dependent nature of so-called bitmapped graphics. Whereas bitmapped images exhibit blurred or pixelated appearance when zoomed or otherwise transformed, "scenes" specified with path rendering can be rendered at different resolutions or otherwise transformed without blurring the boundaries of filled or stroked paths.

As recognized by those skilled in the art, sometimes the term "vector graphics" is used to mean path rendering, but path rendering is a more specific approach to computer graphics. Although "vector graphics" may refer to any computer graphics approach that represents objects (typically 2D) in a resolution-independent way, path rendering is a much more specific rendering model with salient features that include path filling, path stroking, dashing, path masking, compositing, and path segments typically specified as Bèzier curves. It should also be recognized by those skilled in the art that Bézier curves are used in computer graphics to produce curves which appear reasonably smooth at all scales (as opposed to polygonal lines, which will not scale nicely). Mathematically, they are a special case of cubic Hermite interpolation (whereas polygonal lines use linear interpolation).

The prior way of creating dimensional vector graphics using path rendering is awkward and requires intensive processing. Moreover, there are many bottlenecks, including various mathematical calculations that must be undertaken to create curves, state changes, etc.

Furthermore, there are existing ways of drawing a concave polygon to render interactive graphics. One such way is described here. Consider the concave polygon 1234567 shown in FIG. 3. Recognizing that it is drawn as a series of triangles: 123, 134, 145, 156, 167, all of which are referenced in the figure. The heavier line represents the original polygon boundary. Drawing all these triangles divides the buffer into nine regions A, B, C, . . . , I, where region I is outside all the triangles.

In the text of the figure, each of the region names is followed by a list of the triangles that cover it. Regions A, D, and F make up the original polygon; note that these three regions are covered by an odd number of triangles. Every other region is covered by an even number of triangles (possibly zero). Thus, to render the inside of the concave polygon, one just needs to render regions that are enclosed by an odd number of triangles. This can be done using the stencil buffer, with a two-pass algorithm.

First, clear the stencil buffer and disable writing into the color buffer. Next, draw each of the triangles in turn, using the GL_INVERT function in the stencil buffer. (For best performance, use triangle fans.) This flips the value between zero and a nonzero value every time a triangle is drawn that covers a pixel. After all the triangles are drawn, if a pixel is covered an even number of times, the value in the stencil buffers is zero; otherwise, it's nonzero. Finally, draw a large polygon over the whole region (or redraw the triangles), but allow drawing only where the stencil buffer is nonzero.

It is noteworthy, that there is a slight generalization of the preceding technique, where one does not need to start with a polygon vertex. In the 1234567-example illustrated, let P be any point on or off the polygon. Draw the triangles: P12, P23, P34, P45, P56, P67, and P71. Regions covered by an odd number of triangles are inside; other regions are outside. This is a generalization in that if P happens to be one of the polygon's edges, one of the triangles is empty.

This technique can be used to fill both non-simple polygons (polygons whose edges cross each other) and polygons with holes. The following example illustrates how to handle a complicated polygon with two regions, one four-sided and one five-sided. Assume further that there is a triangular and a four-sided hole (it does not matter in which regions the holes lie). Let the two regions be abcd and efghi, and the holes jkl and mnop. Let z be any point on the plane. Draw the following triangles:

zab zbc zcd zda zef zfg zgh zhi zie zjk zkl zlj zmn zno zop zpm

Mark regions covered by an odd number of triangles as in, and those covered by an even number as out.

However, this way of drawing a concave polygon has several drawbacks. First, it is not anti-aliased, that is, applications must rely on hardware multisampling. Second, it requires a lot of state changes dealing with the stencil buffer. Third, it may be expanded to paths by linearizing curves into small line segments. As one example, Skia renders paths by this approach, by performing the subdivision with hardware tessellation or fixed-count instancing. As should be recognized by those skilled in the art, a graphics path is encapsulated by the SkPath object. A path is a collection of one or more contours. Each contour is a collection of connected straight lines and curves. Contours are not connected to each other but they may visually overlap. Sometimes, a single contour can overlap itself.

A paper by Charles Loop and Jim Blinn describes Resolution Independent Curve Rendering Using Programmable Graphics Hardware Blinn. This paper describes one of few proposals for calculating per-pixel coverage of a Bézier curve instead of relying on hardware multisampling. It is interesting for a single Bézier curve, but only provides a "brute force" method of combining Bézier curves into full paths.

Yet another paper on "Coverage counting" path renderer is written by Brian Salomon, Christopher Dalton, and Allan Mackinnon. This paper recognizes that a frequent task in computer graphics is to render a closed path, e.g., a polygon or other shape. Such shapes are found in typography, vector graphics, design applications, etc. Current path-rendering techniques have certain drawbacks, e.g., paths cannot scale too far during animation, control points within the path must remain static, etc. The ability to render paths efficiently and with fewer constraints allows interfaces and applications with richer and more dynamic content. This disclosure describes techniques for efficient path rendering using a GPU. In particular, it introduces the concept of fractional coverage counting, which ameliorates aliasing at the edges of shapes. These techniques can reduce or eliminate reliance on hardware multisampling to achieve anti-aliasing, and open up the possibility of sophisticated graphics rendering on mobile devices or other platforms with resource constraints. It will be recognized by those skilled in the art that this paper builds on the Loop/Blinn paper above, proposing a simple mechanism to combine the fractional coverages of Bézier curves and draw a complete path. This approach introduces the concept of counting fractional coverage per pixel in order to render a path, by assigning positive coverage to clockwise-winding regions and negative coverage to counter-clockwise regions or by ensuring that a pixel completely inside the region gets a coverage magnitude of 1 and a pixel partially inside the region gets a fractional coverage. This approach also defines functions for converting a pixel's final "coverage count" to actual coverage for antialiasing, by using one function for "winding" fill rule, and one function for "even/odd." This paper assumes the ability to render anti-aliased triangles, but does not present an efficient method of doing so. In practice, this algorithm was implemented using multiple shader programs and context switches.

Other prior systems use pixel local storage that enables access to fast, user-defined values at each pixel. The "coherent" version of the extension guarantees that shaders execute coherently and in API primitive order. These are supported on almost all GPUs and include Atlasing: (high upfront GPU memory bandwidth cost). These systems involve functions, including path coverage masks rendered into an atlas upfront. Once the atlas has been rendered, paths may be batched together and drawn in a single pass by referencing the atlas. Some drawbacks of such systems include rendering an atlas large enough to contain all paths, a process that is GPU memory bandwidth intensive. Each path must render an entire bounding box worth of pixels plus padding. As paths grow larger, they require $O(N^2)$ more memory. Further, packing the atlas is expensive on the CPU side. Another function is the CPU-side triangulation: (high upfront CPU and PCI bandwidth cost). This function involves the following functions. Each path is dissected into a polygon with many small edges, then triangulated on the CPU. Once triangulated, path draws may be batched together and drawn in a single pass. The drawbacks of this process include a high CPU cost of triangulation, which is not desirable for complicated scenes. Further, there is high PCI bandwidth uploading vertex data to GPU and it is not resolution independent. This process makes antialiasing even more costly. Yet another function is signed distance fields: (High upfront generation cost), which has many quality concerns. There is an immense overhead when the distance field needs to be regenerated and it is not resolution independent. The GPU compute algorithms are not first-class, they cannot take advantage of certain hardware GPU features, like the rasterizer or tiled rendering system, and they are not available in WebGL.

It should be recognized that most path rendering algorithms require two-path rendering (e.g., stencil then cover). For complicated scenes with many paths, two-pass rendering becomes bottlenecked by GPU state changes and performance is unacceptable. There are a few special-case algorithms that achieve single-pass path rendering under fixed constraints, but an approach that works generally is unknown and does not exist.

Accordingly, with the increasing need for high performance graphics in every realm of digital life, there is a continuing need for improved systems, methods, and tools.

SUMMARY

The present technology overcomes the deficiencies and limitations of prior systems and methods used for creating computer graphics, at least in part, by providing improved algorithms, techniques, and software user tools that are effective, efficient, and seamless for developers and other users to use to create high performance interactive graphics. In some embodiments, the present invention may be embodied as editing tools or features for computer graphics and provided to users or developers via a software-as-a-service ("SAS") product that users or developers may use to create computer graphics. In some embodiments, users may use these software graphic tools to build interactive animations that can run anywhere. These interactive graphics builder tools provide a new graphics format configured to nimbly react, animate, and change itself in any instance.

In accordance with some aspects of the present invention, the invention solutions recognize that most known path rendering algorithms require two-pass rendering (e.g., stencil then cover). For creating complicated scenes with many paths, two-pass rendering become bottlenecked by GPU state changes and performance is acceptable. Although there are few special-case algorithms that achieve single-pass path rendering under fixed constraints, an approach that works generally is not known. The present invention is directed to an algorithm that makes use of coverage counting and pixel local storage.

In accordance with some aspects of the present invention, the new algorithm executes by keeping four values in pixel local storage. The first, is the coverage count, which is memoryless and stores the current coverage count at the pixel being covered. The second is a framebuffer original color, which is memoryless and stores the color that was in the framebuffer at the pixel being covered, immediately before the current path started rendering, and if multiple fragments from a single path touch the same pixel, this value allows the system to re-blend against the framebuffer's original color. The third is the path ID, which is memoryless and first, stores the unique ID of the last path to be drawn at the current pixel and if the path ID being rendered does not match the one in the pixel local storage, then this is the first fragment from that path to touch the pixel. This function includes the following: load the current framebuffer color into memoryless pixel local storage if this is the first fragment from the path to touch the pixel being rendered; and reset coverage count to zero (enables batching of multiple paths). The $4^{th}$ value in pixel local storage represents the framebuffer's actual color and is texture-backed. It should be recognized that a traditional graphics pipeline does not allow reading the framebuffer, therefore, this value is also stored in the pixel local storage.

Additional details are described below in the detailed description.

BRIEF DESCRIPTION OF THE DRAWINGS

The present invention is illustrated by way of example, and not by way of limitation in the figures of the accompanying drawings in which like reference numerals are used to refer to the same or similar elements.

FIG. 2B is a flow chart of the method for creating graphic images using an antialiasing stroke in accordance with the present invention embodied in software tools.

FIG. 2C is a flow chart of the method for single-pass path rendering using coverage count.

FIG. 2D is a flow chart of the method performed by the fragment shader.

FIG. 26 is a graphical representation illustrating an artifact where very sharp corners have too much coverage. In practice, this can be ameliorated by only using 1 triangle in

Figure 23:
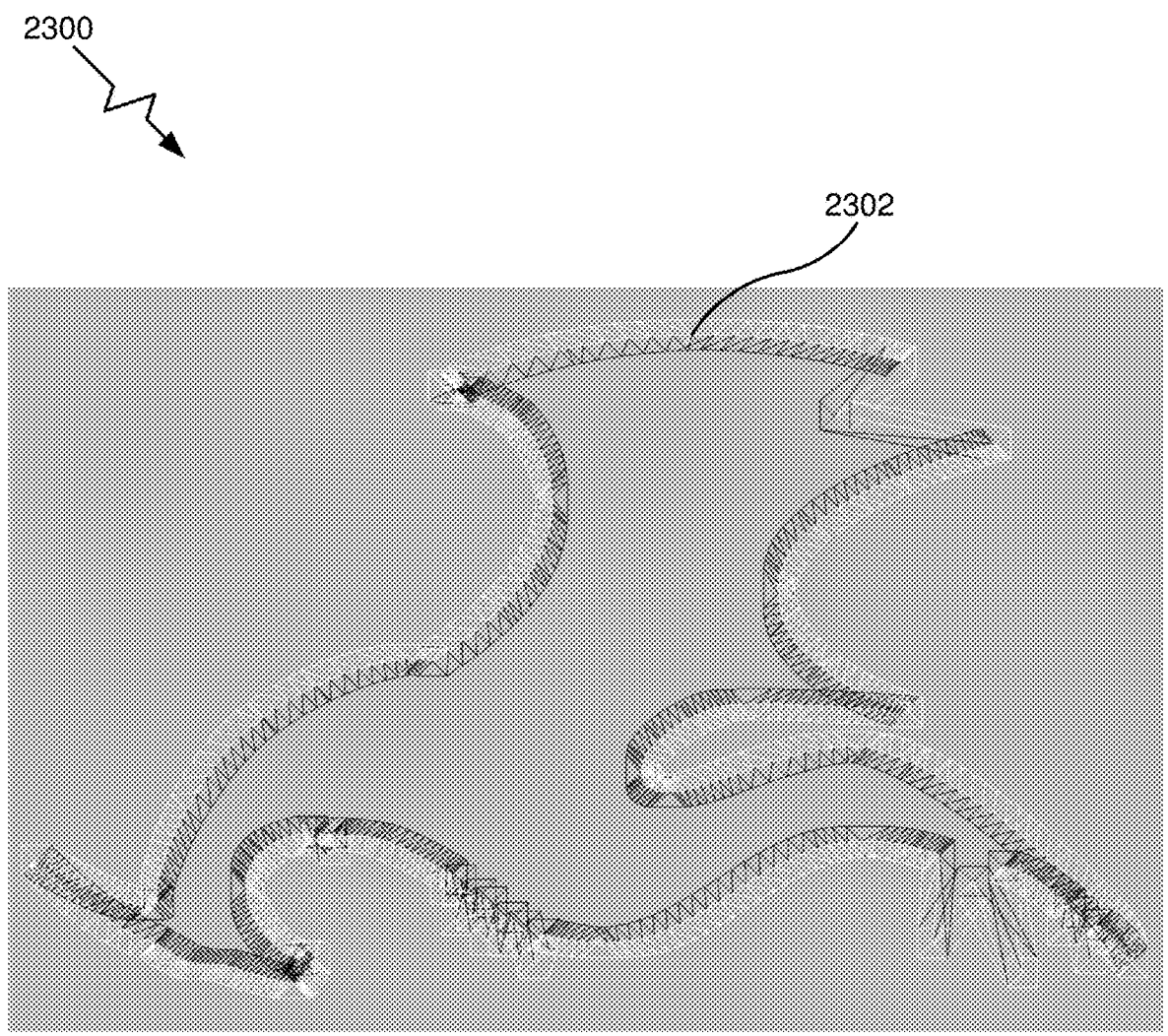
FIG. 23 is a graphical representation illustrating Manhattan AA triangles to make square patterns instead of circular in the drawing.
Figure 24:
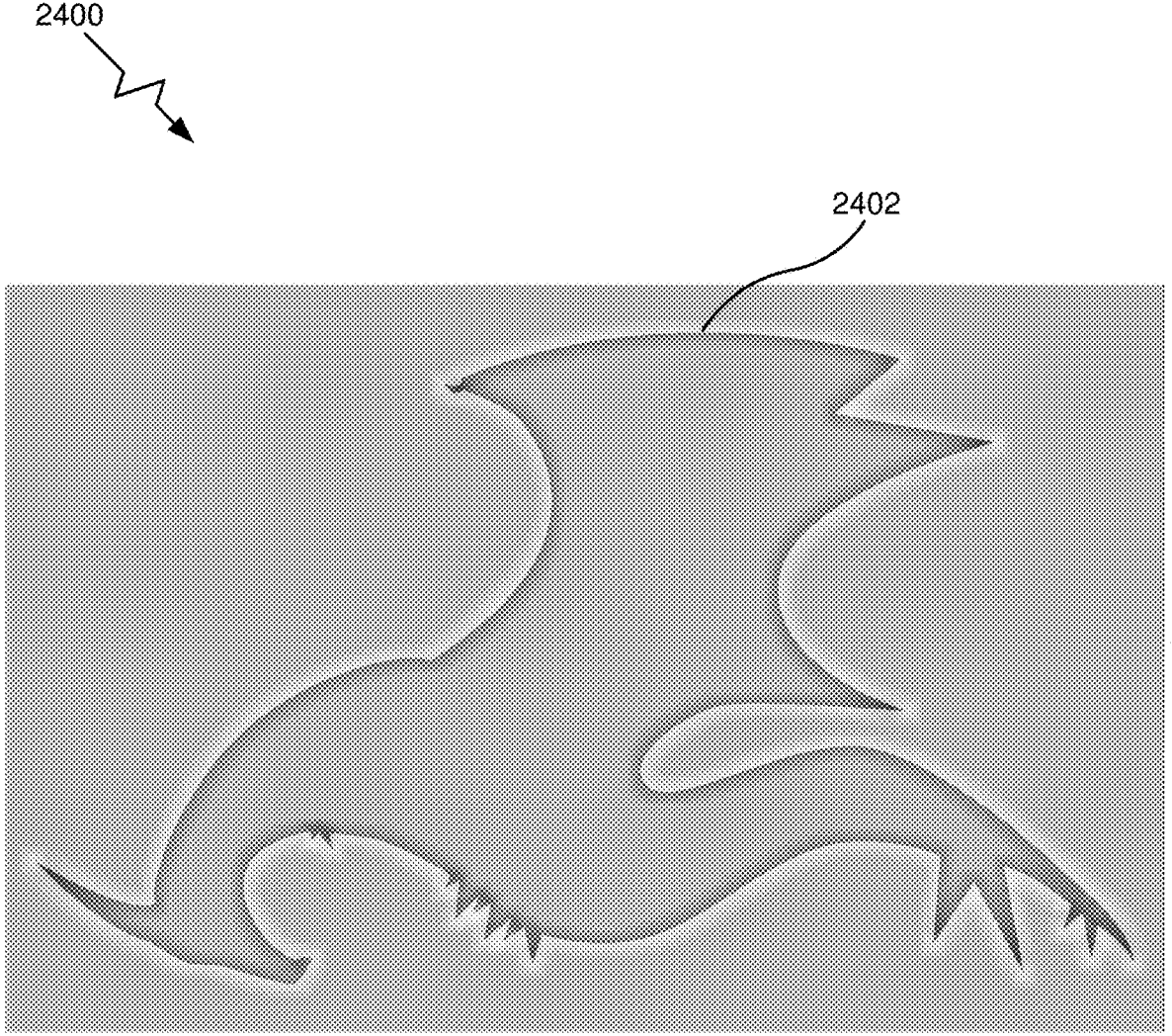
FIG. 24 is a graphical representation illustrating the complete antialiasing stroke when generated by Manhattan AA triangles. From this figure, it can be seen that the ramp is visibly wider when on diagonals.

7 bowtie joins (e.g., FIG. 30), in combination with using "Manhattan AA" triangles (FIG. 23).

Figure 27:
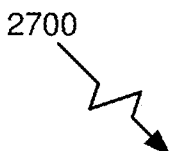

FIG. 27 is a graphical representation illustrating another example rendered image using the software builder tools in accordance with the present invention.

Figure 28:
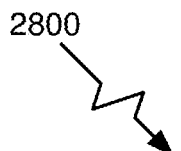

FIG. 28 is a graphical representation illustrating another example rendered image using the software builder tools in accordance with the present invention.

Figure 29:
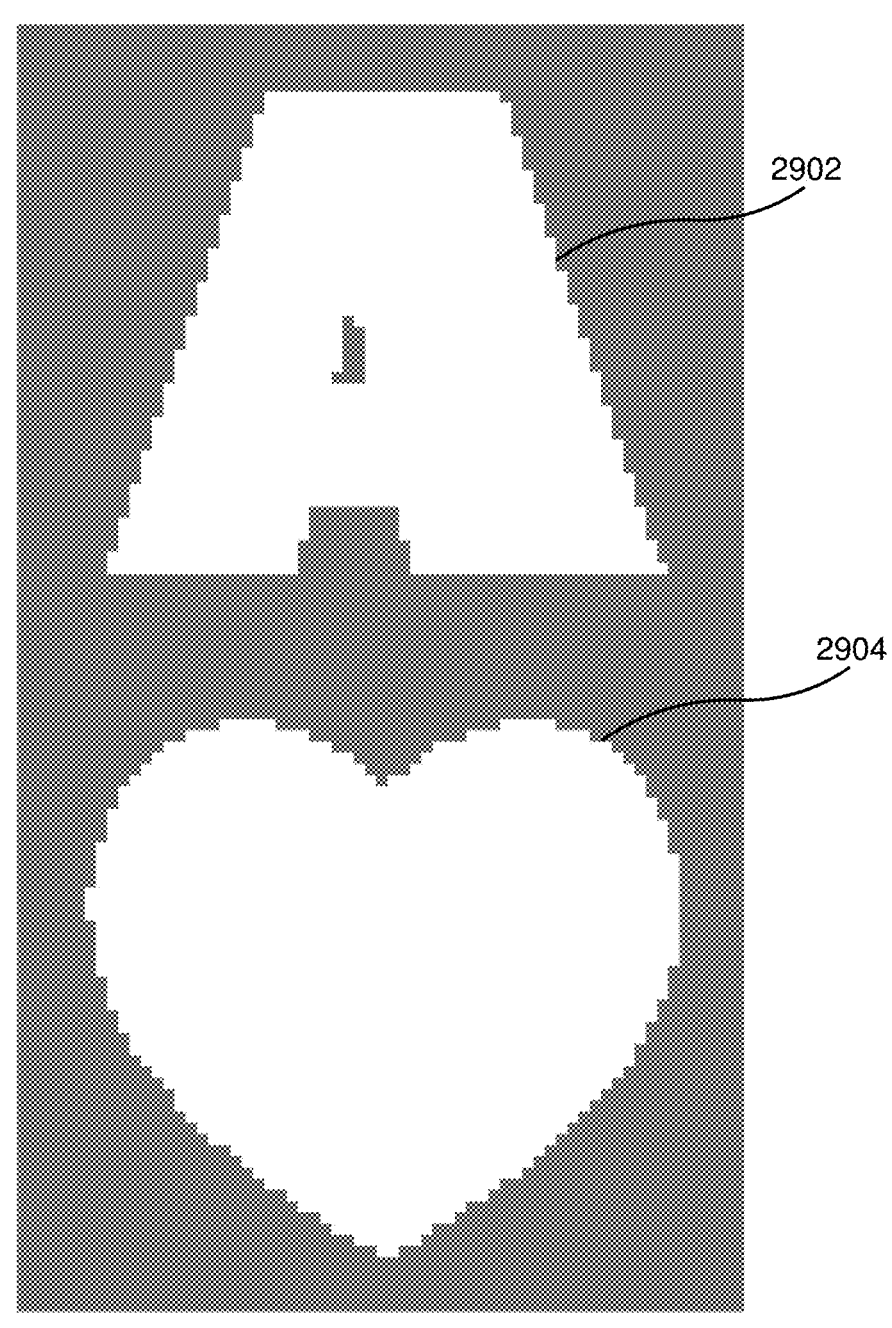

FIG. 29 is a graphical representation illustrating another example rendered image using the software builder tools in accordance with the present invention.

Figure 30:
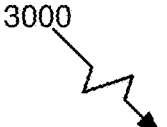

FIG. 30 is a graphical representation illustrating another example rendered image using the software builder tools in accordance with the present invention.

Figure 31:
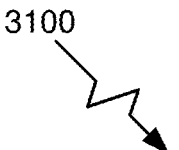

FIG. 31 is a graphical representation illustrating another example rendered image using the software builder tools in accordance with the present invention.

Figure 32:
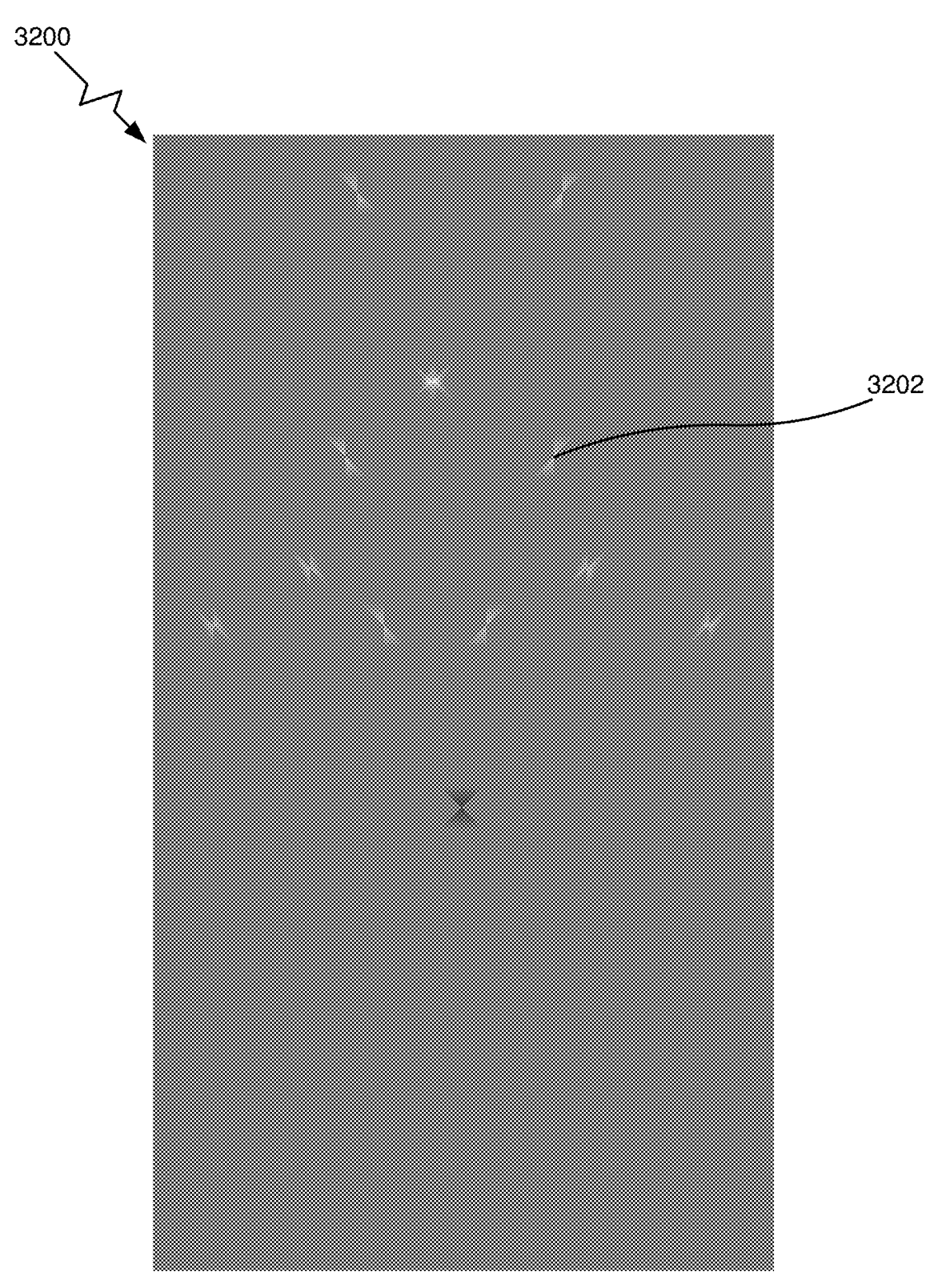

FIG. 32 is a graphical representation illustrating another example rendered image using the software builder tools in accordance with the present invention.

Figure 33:
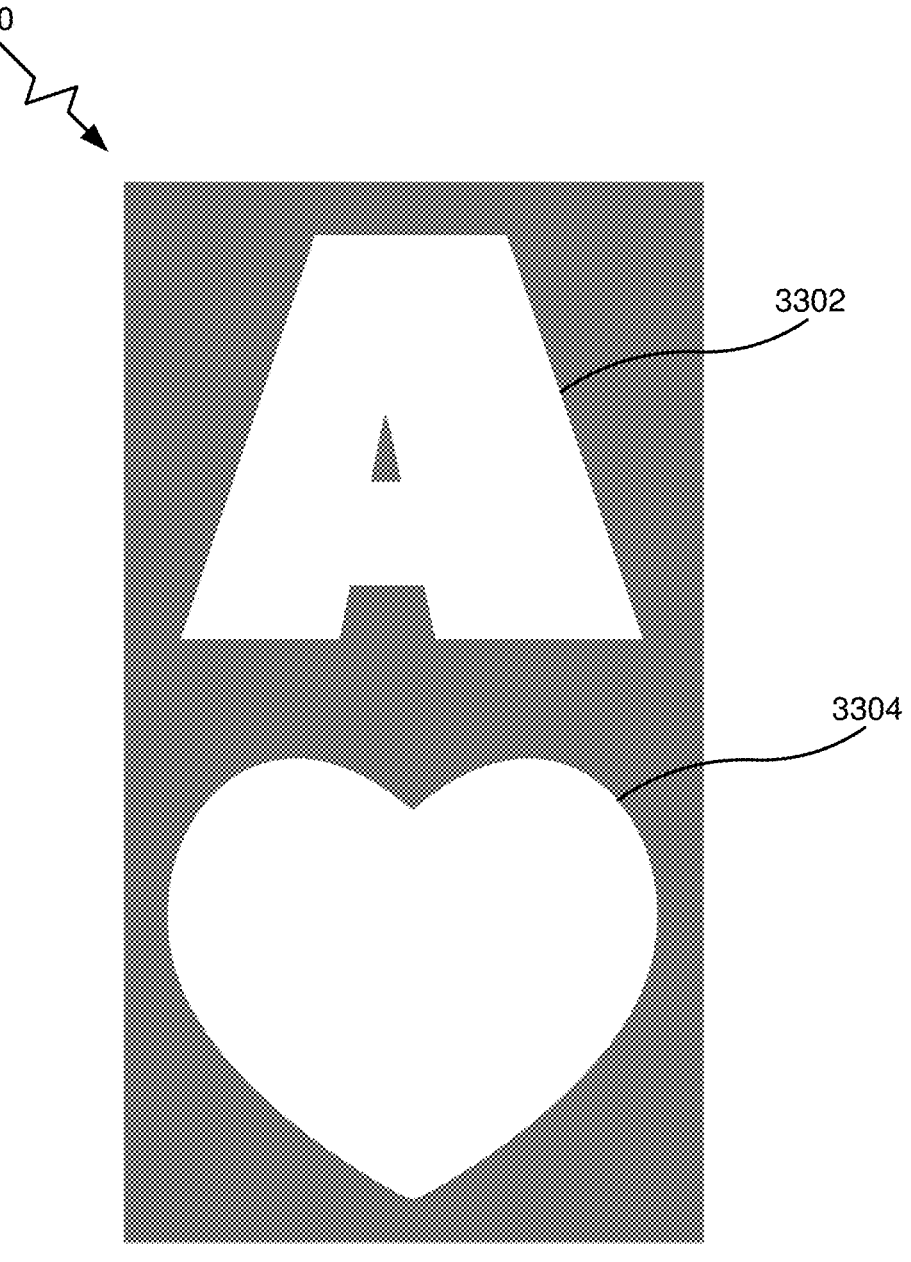

FIG. 33 is a graphical representation illustrating another example rendered image using the software builder tools in accordance with the present invention.

Figure 34:
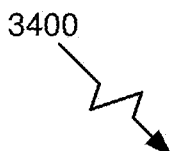

FIG. 34 is a graphical representation illustrating another example rendered image using the software builder tools in accordance with the present invention.

Figure 35:
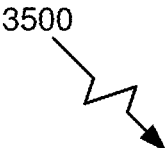

FIG. 35 is a graphical representation illustrating another example rendered image using the software builder tools in accordance with the present invention.

Figure 36:
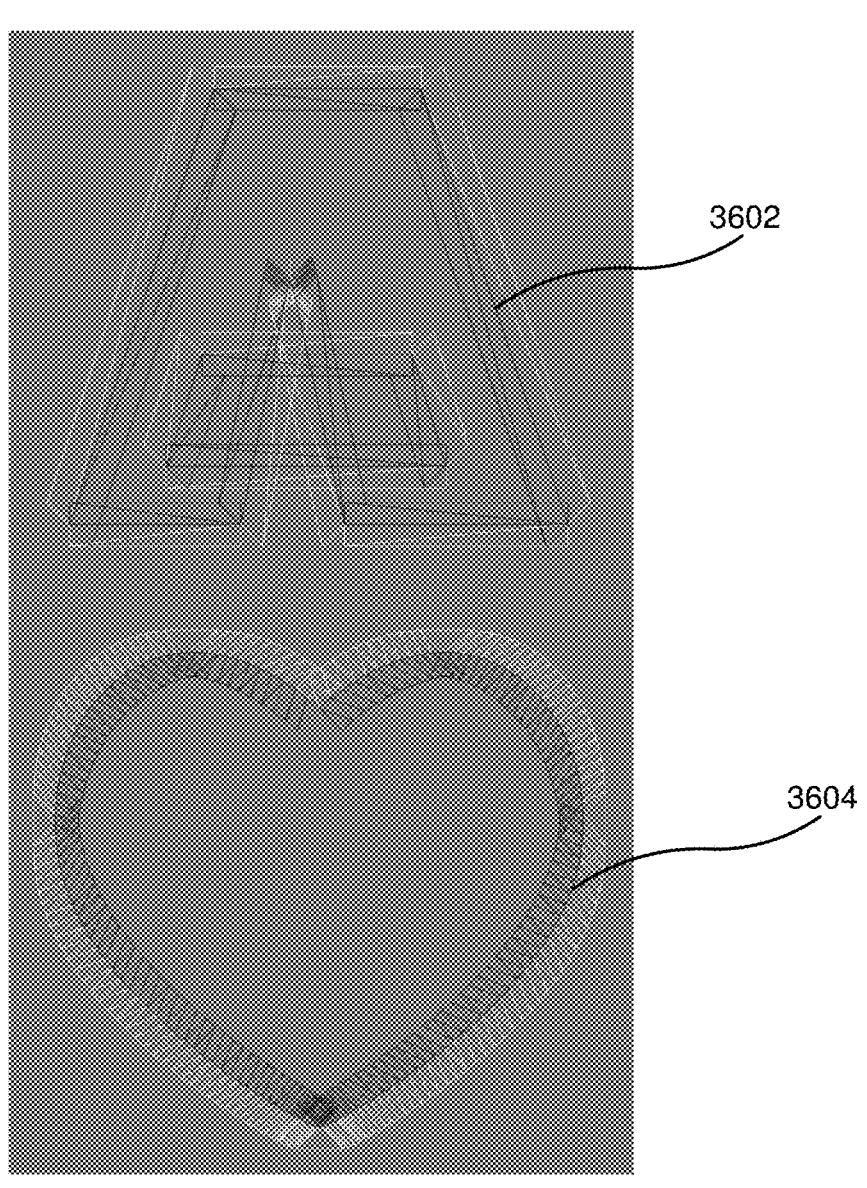

FIG. 36 is a graphical representation illustrating another example rendered image using the software builder tools in accordance with the present invention.

Figure 37:
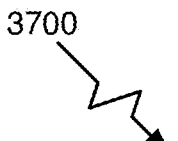
Figure 37:
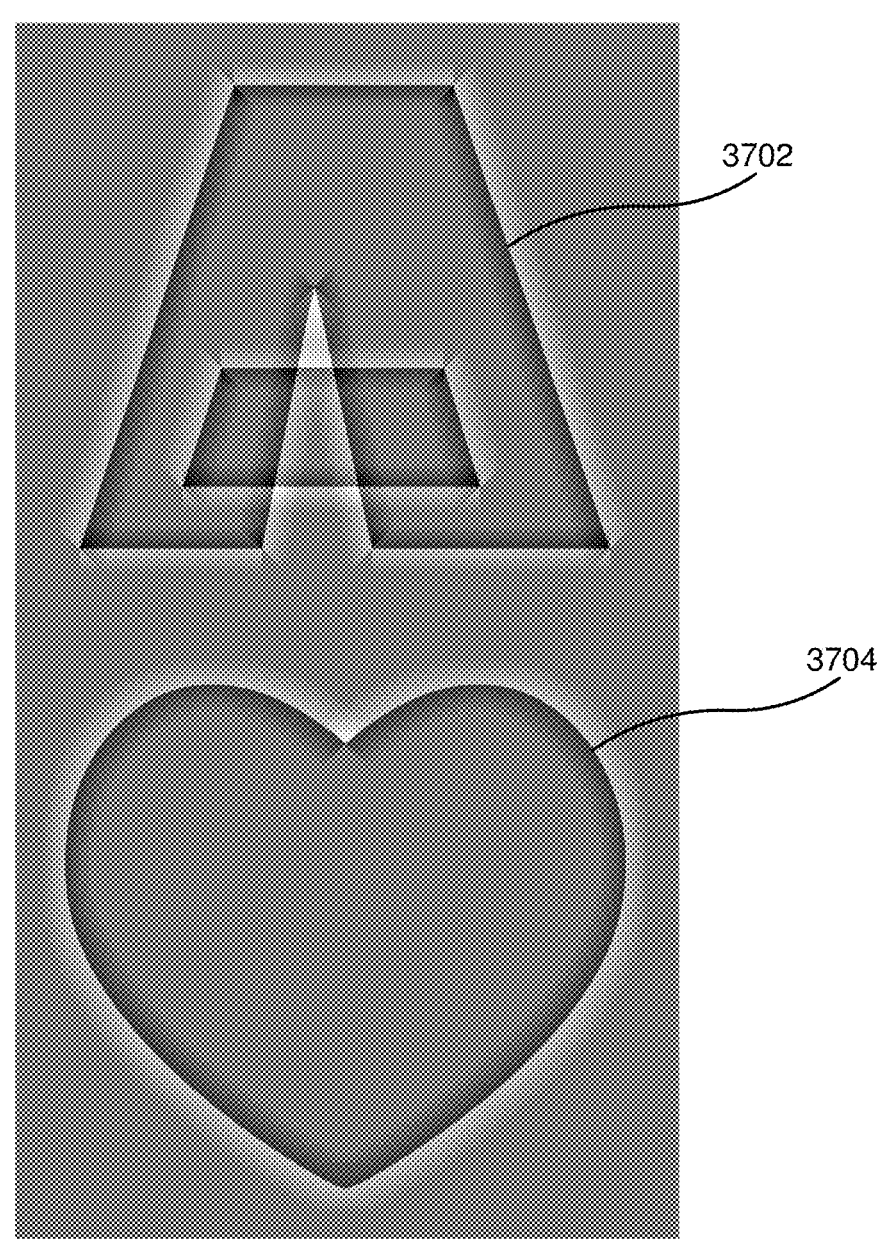

FIG. 37 is a graphical representation illustrating another example rendered image using the software builder tools in accordance with the present invention.

Figure 38:
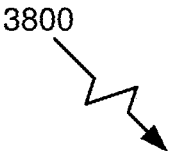

FIG. 38 is a graphical representation illustrating another example rendered image using the software builder tools in accordance with the present invention.

Figure 39:
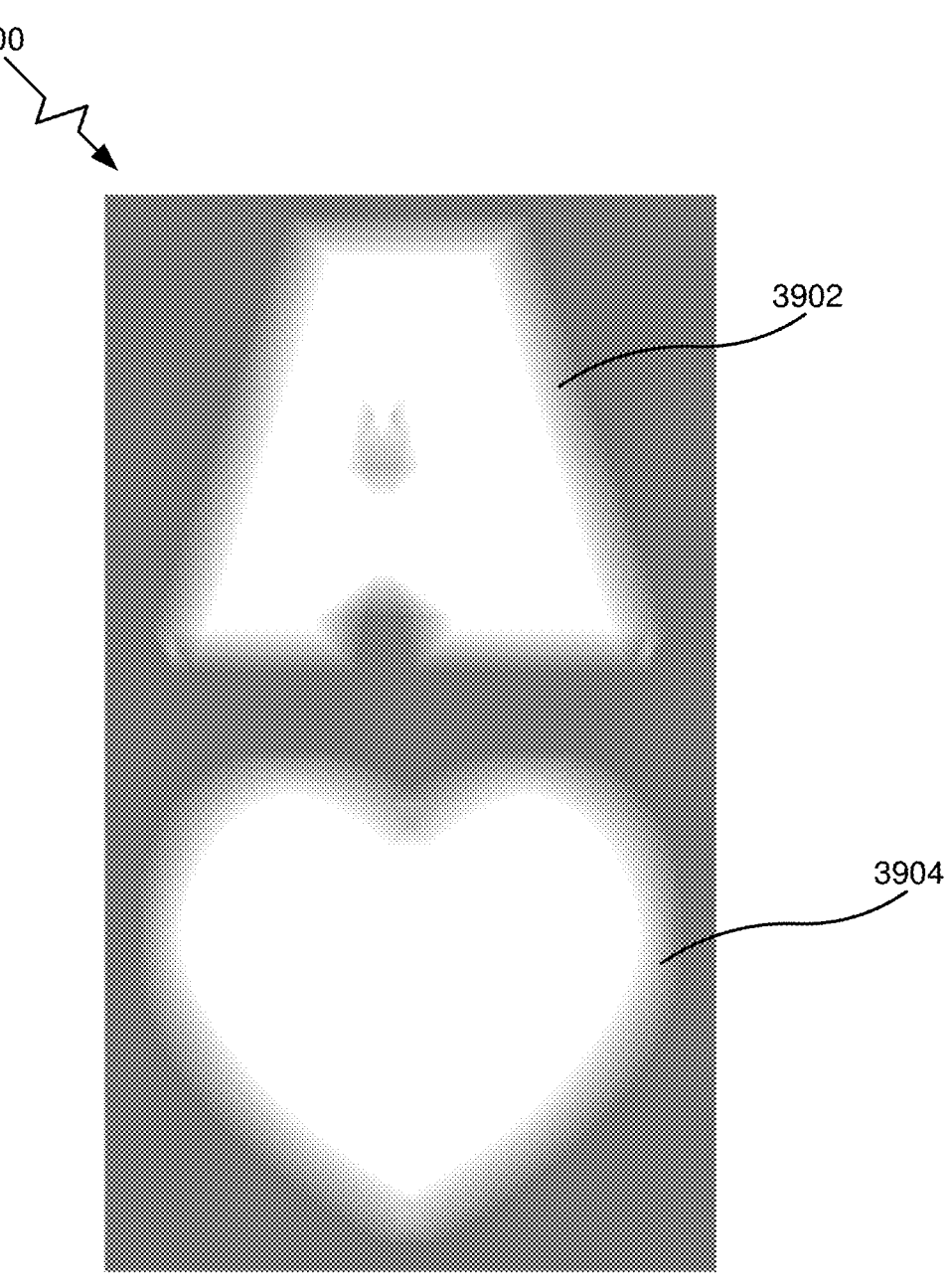
Figure 40:
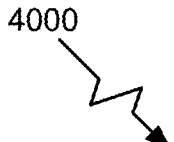
Figure 40:
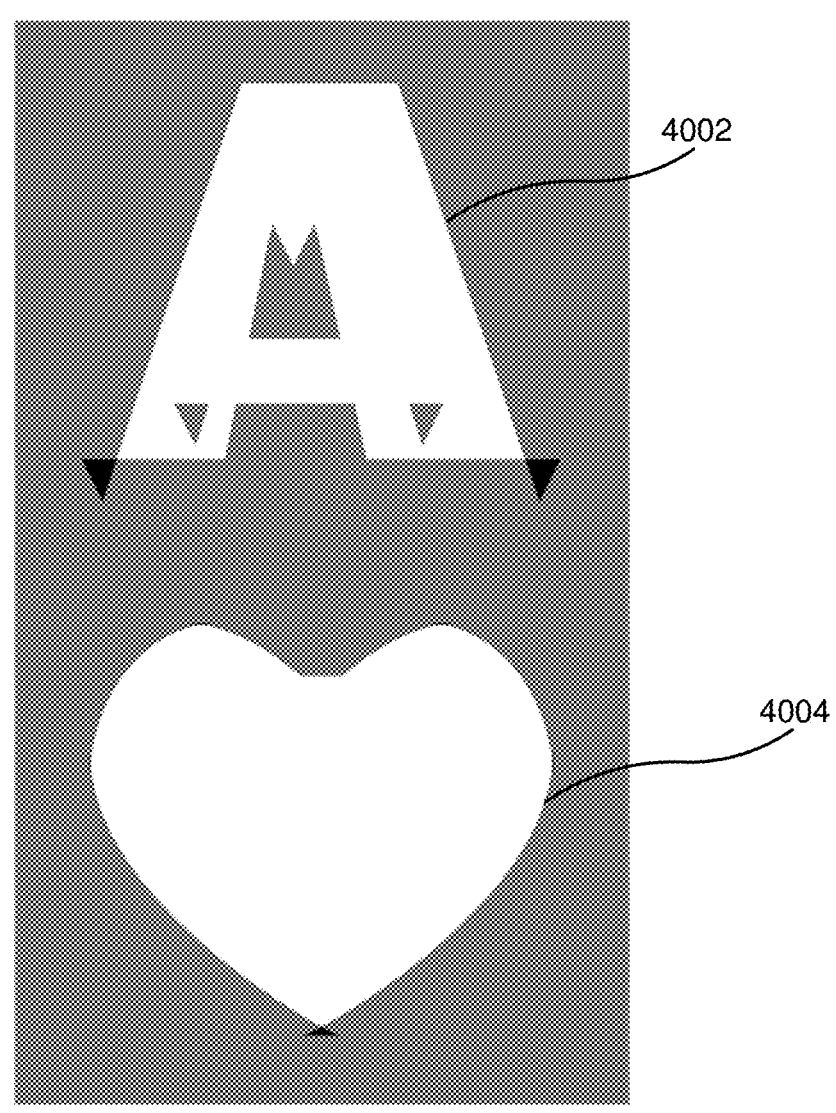
Figure 41:
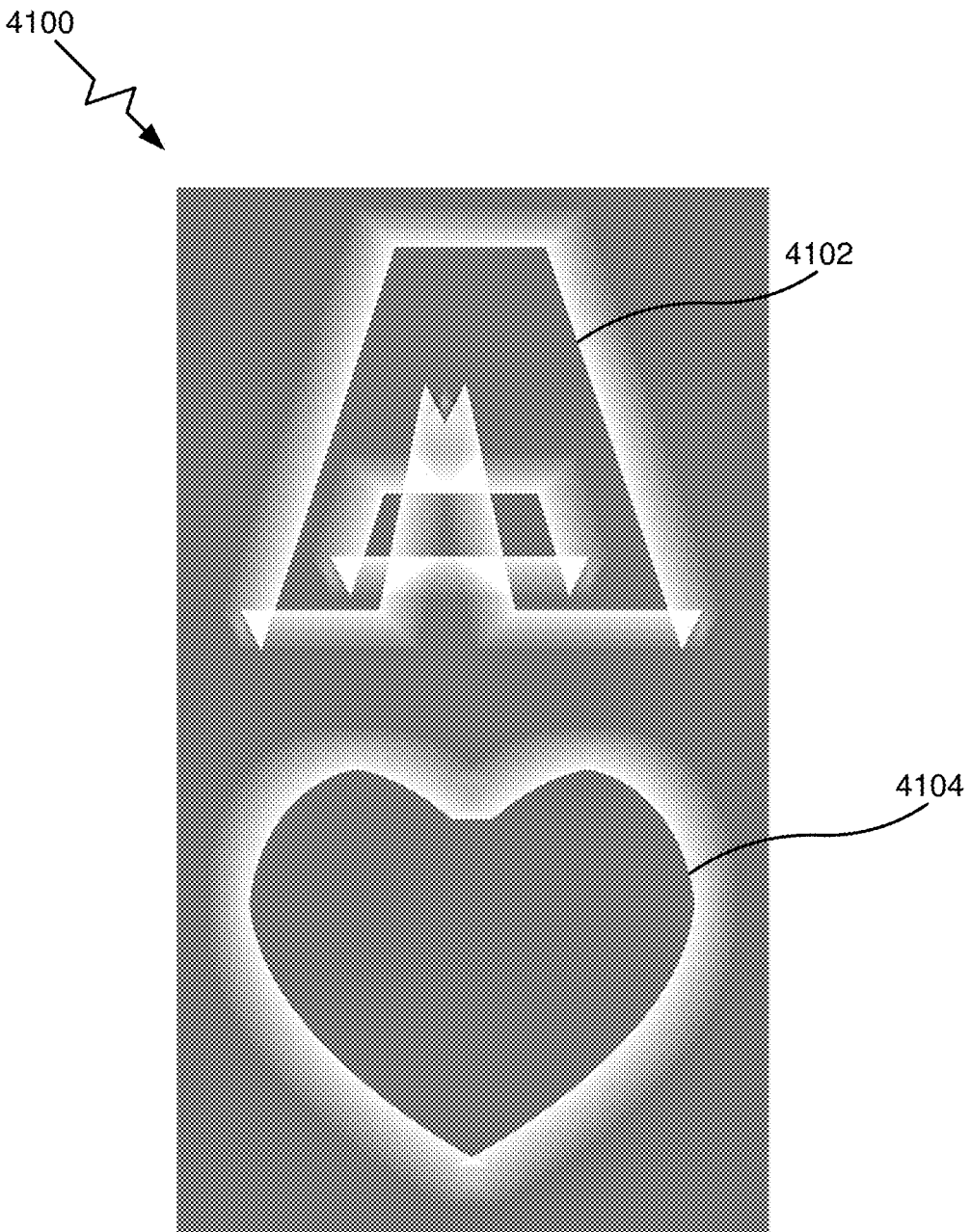
Figure 42:
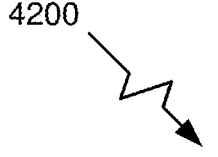
Figure 42:
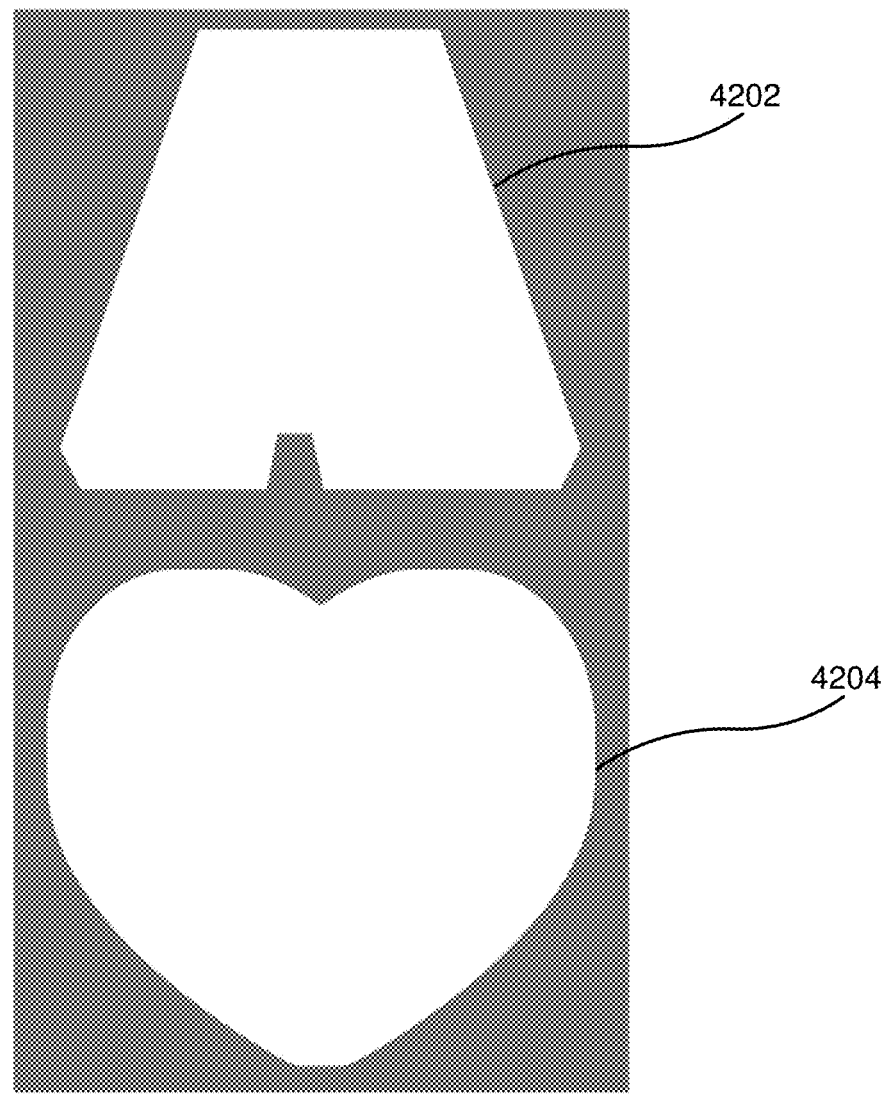
Figure 43:
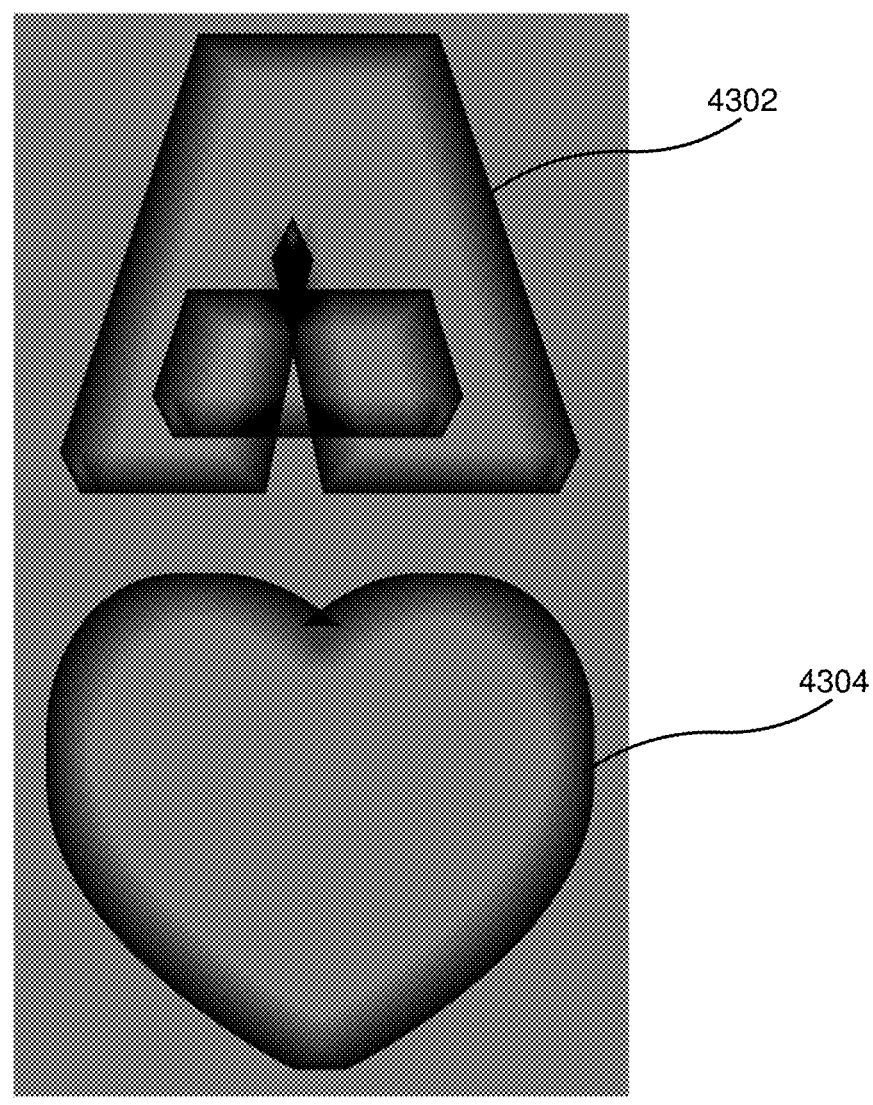

FIG. 39 is a graphical representation illustrating the result of summing the coverage counts at each pixel from FIG. 40 and FIG. 41, or, from FIG. 42 and FIG. 43. It can be seen that regardless of whether the path interior and antialiasing stroke meet at the inner or outer edge, the final result is identical.

FIG. 40 is a graphical representation illustrating an antialiasing stroke that meets the path interior at its inner edge instead of the center.

FIG. 41 is a graphical representation illustrating another example rendered image using the software builder tools with an off-center stroke in accordance with the present invention.

FIG. 42 is a graphical representation illustrating a path interior that meets the antialiasing stroke at its outer edge instead of the center.

FIG. 43 is a graphical representation illustrating an antialiasing stroke that meets the path interior at its outer edge instead of the center.

DETAILED DESCRIPTION

In the following description, numerous specific details are set forth to provide a more thorough understanding of the various embodiments of the present invention. However, it will be apparent to one of skill in the art that the present invention may be practiced without one or more of these specific details. In other instances, well-known features have not been described in order to avoid obscuring the present invention.

In computer graphics, "antialiasing" refers to a technique to remove the aliasing effect, which is appearance of jagged edges in a rasterized image. As is well known to those skilled in the art, a rasterized image is an image rendered using pixels. The problem of jagged edges technically occurs due to distortion of the image. In other words, "aliasing" occurs when real-world objects, which comprise smooth, continuous curves are rasterized using pixels. Typically, "aliasing" results from undersampling, which is a loss of information about the picture.

The invention solutions described here recognize that most known path rendering algorithms require two-pass rendering (e.g., stencil then cover). For creating complicated scenes with many paths, two-pass rendering become bottle-necked by GPU state changes and performance is acceptable. Although there are few special-case algorithms that achieve single-pass path rendering under fixed constraints, an approach that works generally is not known. The present invention is directed to an algorithm that makes use of coverage counting and pixel local storage. This algorithm executes by keeping four values in pixel local storage. The first, is the coverage count, which is memoryless and stores the current coverage count at the pixel being covered. The second is a framebuffer original color, which is memoryless and stores the color that was in the framebuffer at the pixel being covered, immediately before the current path started rendering, and if multiple fragments from a single path touch the same pixel, this value allows the system to re-blend against the framebuffer's original color. Also, if multiple fragments from a single path touch the same pixel, this value allows us to re-blend against the framebuffer's original color. The third is the path ID, which is memoryless and first, stores the unique ID of the last path to be drawn at the current pixel and if the path ID being rendering does not match the one in the pixel local storage, then this is the first fragment from that path to touch the pixel. This function includes the following: load the current framebuffer color into memoryless pixel local storage if this is the first fragment from the path to touch the pixel being rendered; and reset; and reset coverage count to zero (enables batching of multiple paths). The $4^{th}$ value in pixel local storage represents the framebuffer's actual color and is texture-backed. It should be recognized that a traditional graphics pipeline does not allow rendering the framebuffer, therefore, this value is also stored in the pixel local storage.

The present invention includes a distinct and elegant solution to building two-dimensional computer graphics. Two-dimensional computer graphics are widely used in animation and video games, providing a realistic, but flat, view of movement on the screen. The present invention is a novel process that is created and executed to stroke the entire path with tessellation. The solution is configured to render to a floating point "coverage count" buffer. It is configured to tessellate an antialiasing stroke with triangles running orthogonally from the center. The coverage ramps from "0.5" in the center of the antialiasing stroke to "0" on the edge. As illustrated in the graphical representations in the drawing figures, the clockwise triangles have positive coverage (shaded white) and the counterclockwise triangles have negative coverage (shaded black). There is a "hard" (non-anti-aliased) edge in the center where coverage switches from 0.5 to −0.5.

It is noteworthy that the system of the present invention connects adjoined stroke edges with a "bowtie." There are coverage artifacts at the corners where edges overlap. The inside triangles of a bowtie naturally cross over backwards, giving them the opposite winding direction as the other inside triangles. The opposite-sign winding naturally cancels out the double-hit artifacts where the adjoining edges overlapped. A bowtie is geometrically equivalent to a cubic cusp, and may be rendered with the exact same SIMD code as any other edge.

The solution and techniques of the present invention are configured to tessellate the path interior with hard (non-AA) edges. It can draw each positive (clockwise) curve triangles and negative (counter-clockwise) curve triangles. Clockwise triangles get a coverage of 1. Counterclockwise triangles get a coverage of −1. The hard edges of the curves align precisely with the hard edges in the center of the antialiasing stroke. Combining the antialiasing stroke and the path interior results in a path rendered with no hard edges anywhere (stroke Width=40 px). For example, see FIGS. 7 and 35

The solution can change stroke width to 1 pixel, which makes an antialiased edge. All triangles are rendered in a single call to glDrawArrays( ) Vertex data is just the path's control points; tessellation is done on the GPU. Hardware (database) shards may be used for tessellation. It will be recognized by those skilled in the art that database sharding is the process of storing a large database across multiple machines (method of distributing data across multiple machines). A single machine, or database server, can store and process only a limited amount of data.

There are many additional features and benefits to these solutions of the present invention, including but not limited to, the following: creating anti-aliased paths without any state changes or buffer, not needing stencil or MSAA, issuing one call to graphics pipeline vs. multiple calls with state changes. The present invention offers a two-part solution, including "Coverage count→off screen buffer," and "Transfer back."

In the following description, for purposes of explanation, numerous specific details are set forth in order to provide a thorough understanding of this technology. It will be apparent, however, that this technology can be practiced without some of these specific details. In other instances, structures and devices are shown in block diagram form in order to avoid obscuring the innovative aspects of the present invention. For example, the present technology is described in some implementations below with reference to particular hardware and software.

Various aspects of the present disclosure may be embodied as a method, a system, or a non-transitory, computer readable storage medium having one or more computer readable program codes stored thereon. Accordingly, various embodiments of certain components of the present disclosure described may take the form of an entirely hardware embodiment, an entirely software embodiment comprising, for example, microcode, firmware, software, etc., or an embodiment combining software and hardware aspects that may be referred to herein as a "system," a "module," an "engine," a "circuit," or a "unit."

Reference in this specification to "one implementation or embodiment" or "an implementation or embodiment" simply means that a particular feature, structure, or characteristic described in connection with the implementation or embodiment is included in at least one implementation or embodiment of the technology described. The appearances of the phrase "in one implementation or embodiment" in various places in the specification are not necessarily all referring to the same implementation or embodiment.

Some portions of the detailed descriptions that follow are presented in terms of algorithms and symbolic representations of operations on data bits within a computer memory. These algorithmic descriptions and representations are the means used by those knowledgeable in the data processing arts to most effectively convey the substance of their work to others in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device (such as or including the computer/processor), that manipulates and transforms data represented as physical (electronic) quantities within the computer system's registers and memories (such as or including the memory and data storage) into other data similarly represented as physical quantities within the computer system memories or registers or other such information storage, transmission or display devices.

The unique solutions and processing techniques of the present invention are embodied in a graphics processing unit ("GPU") with a modern architecture for rasterization. A GPU herein refers to a graphics processing unit, which is any specialized processor designed to accelerate graphics rendering. As is known to those skilled in the art, GPUs can process many pieces of data simultaneously, making them useful for application in creative production, video editing, gaming applications, and machine learning. A GPU may be integrated into a computer's CPU or be a discrete hardware unit. A GPU enables parallel processing, is flexible and programmable, allowing graphics developers to create more interesting visual effects and realistic and desired scenes. GPUs makes it faster and easier to render video and graphics in high-definition formats. A single GPU shader referred to herein, is code that is executed on the GPU, typically found on a graphics card, to manipulate an image before it is drawn to the screen or display. Shaders permit various kinds of rendering effect, ranging from adding an X-ray view to adding outlines to rendering output.

Figure 1:
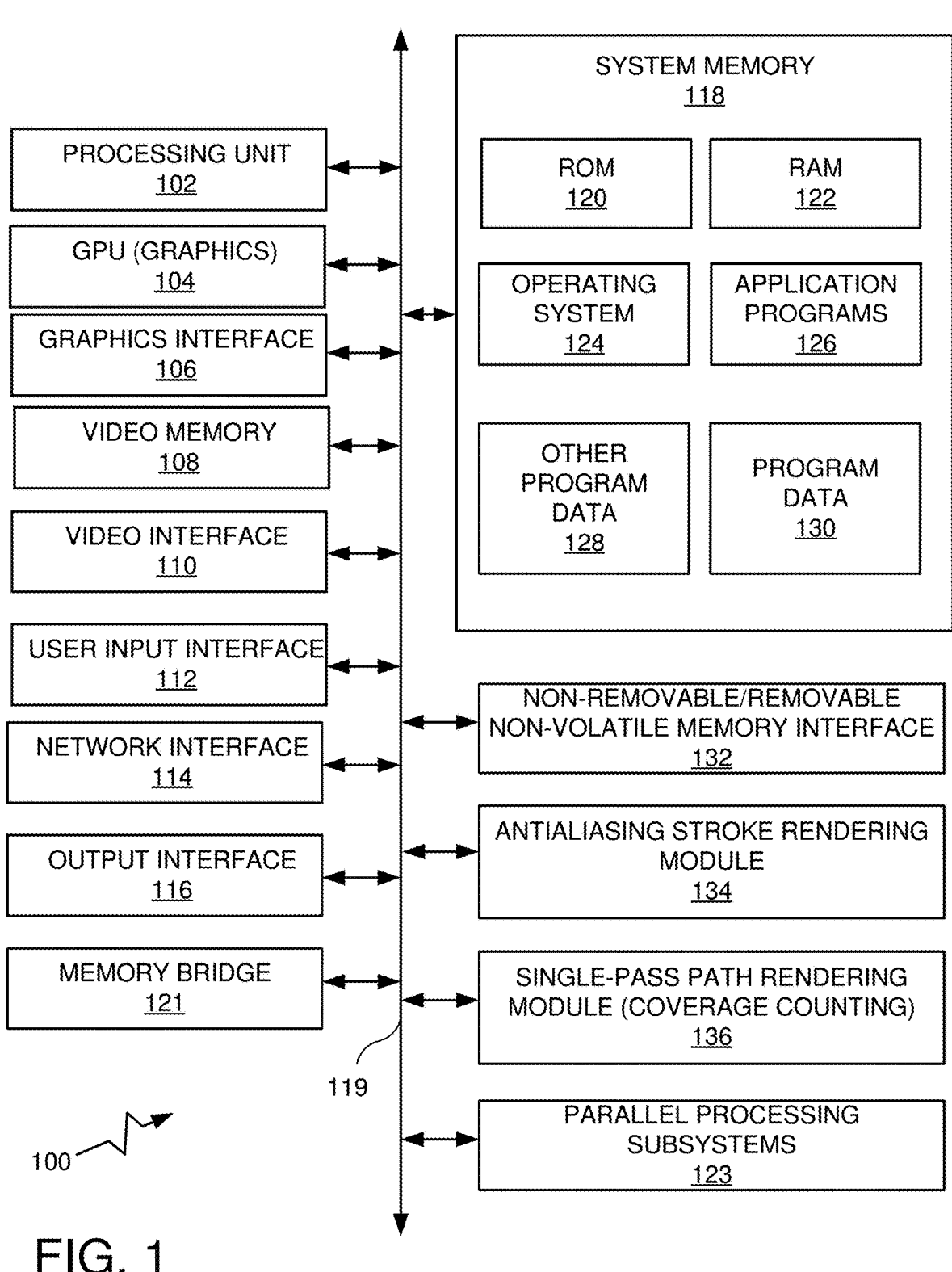
FIG. 1 is a high-level block diagram, illustrating example architecture in which the present invention is embodied as software tools for creating or building interactive graphics.

FIG. 1 illustrates a block diagram of an example computer system 100 configured to implement one or more aspects of the present invention. Computer system 100 may include a processing unit (e.g., a CPU) 102 and a graphical processing unit (GPU) 104, as described above. The computer system 100 further includes a video memory 108, a video interface 110, a user input interface 112, a network interface 114, an output interface 116, a system memory 118, a non-removable/removable non-volatile memory interface 132, and an antialiasing stroke rendering module 134 that is illustrated separately for purpose of illustration, but may be configured as part of the GPU 104 or provided as a subsystem coupled to the GPU 104. The system 100 further comprises a single-pass path rendering module (coverage counting) 136.

The processing unit 102 as illustrated is a computer or data processing system suitable for storing and/or executing program or executable code in any of the modules or units described here. In some embodiments, the system memory 118 may communicate via an interconnection path 119, which in some embodiments may include a memory bridge 121, connected via a bus or other communication path to an I/O (input/output) bridge in the user input interface 112. In some embodiments, the I/O bridge may be a Southbridge chip. The I/O bridge is configured to receive user input from one or more user input devices (e.g., keyboard or mouse) and forward input to the processing unit 102 via a bus and/or the memory bridge 121. In some embodiments, the memory bridge 121 may be a Northbridge chip. As is recognized by those skilled in the art, parallel processing subsystems 123 may be coupled to the memory bridge 121 via the bus or other communication path. Examples include a PCI Express, Accelerated Graphics Port, or a HyperTransport link. It some embodiments, the parallel processing systems designated by reference numeral 123 may be graphics subsystems that deliver pixels to a display device, for example, a CRT or LCD based monitor. A system disk may be connected to the I/O bridge. A switch may be configured to provide connections between the I/O bridge and other components such as network adaptor and various add-in cards. Other components including USB or other port connections, CD drives, DVD drives, film recording devices, or the like, may also be connected to the I/O bridge. Communication paths interconnecting the various components illustrated may be implemented by suitable protocols, such as PCI (Peripheral Component Interconnect), PCI-Express, AGP (Accelerated Graphics Port), HyperTransport, or any other bus or point-to-point communication protocol and connections between different devices as is known in the field.

In some embodiments, the parallel processing subsystems 123 may incorporate circuitry optimized for graphics and video processing, including, but not limited to, video output circuitry, and other graphics processing units (GPU). In some embodiments, the parallel processing subsystems 123 may incorporate circuitry optimized for general processing, while preserving the underlying computational architecture.

The particular GPU 104, as illustrated, represents a specialized electronic circuit designed to manipulate and alter memory to accelerate the creation of images in a frame buffer intended to output to a display device (FIG. 2). As is recognized by those skilled in the art, GPUs are embedded systems that may be used on mobile phones, personal computers, workstations and game consoles. It will also be recognized by those skilled in the art that GPUs are also referred to as graphics cards or video cards. Every PC uses a GPU to render images, video, 2D, and 3D animations for display. The GPU is configured to perform quick mathematical calculations and free up the CPU 102 for other tasks. Typically, the CPU uses a few cores focused on sequential serial processing and the GPU 104 comprises thousands of smaller cores configured for multi-tasking. It will be recognized by those skilled in the art that there are two different types of GPUs, namely, integrated GPUs, which are located on a personal computer's CPU and share memory with the CPU's processor and discrete GPUs that are a graphics card with its own video memory (VRAM), so that the personal computer does not have to use its RAM for graphics operations.

In some embodiments, the system memory 118 is a non-transitory, computer-readable storage medium. As used herein, "non-transitory computer-readable storage medium" refers to all computer-readable media, for example, non-volatile media, volatile media, and transmission media, except for a transitory, propagating signal. Non-volatile media comprise, for example, solid state drives, optical discs or magnetic disks, and other persistent memory volatile media including a dynamic random access memory (DRAM), which typically constitute a main memory. Volatile media comprise, for example, a register memory, a processor cache, a random-access memory (RAM), etc. Transmission media comprise, for example, coaxial cables, copper wire, fiber optic cables, modems, etc., including wires that constitute a system bus coupled to the CPU 102. The CPU 102 is operably and communicatively coupled to the system memory 118 for executing the computer program instructions defined by modules, for example, any of the modules described here. The system memory 118 is used for storing program instructions, the operating system 124, application programs 126, other program data 128 and program data 130. The memory 118 comprises, for example, a read-only memory (ROM) 120, a random-access memory (RAM) 122, or another type of dynamic storage device that stores information and instructions for execution by the processing unit 102.

Figure 2A:
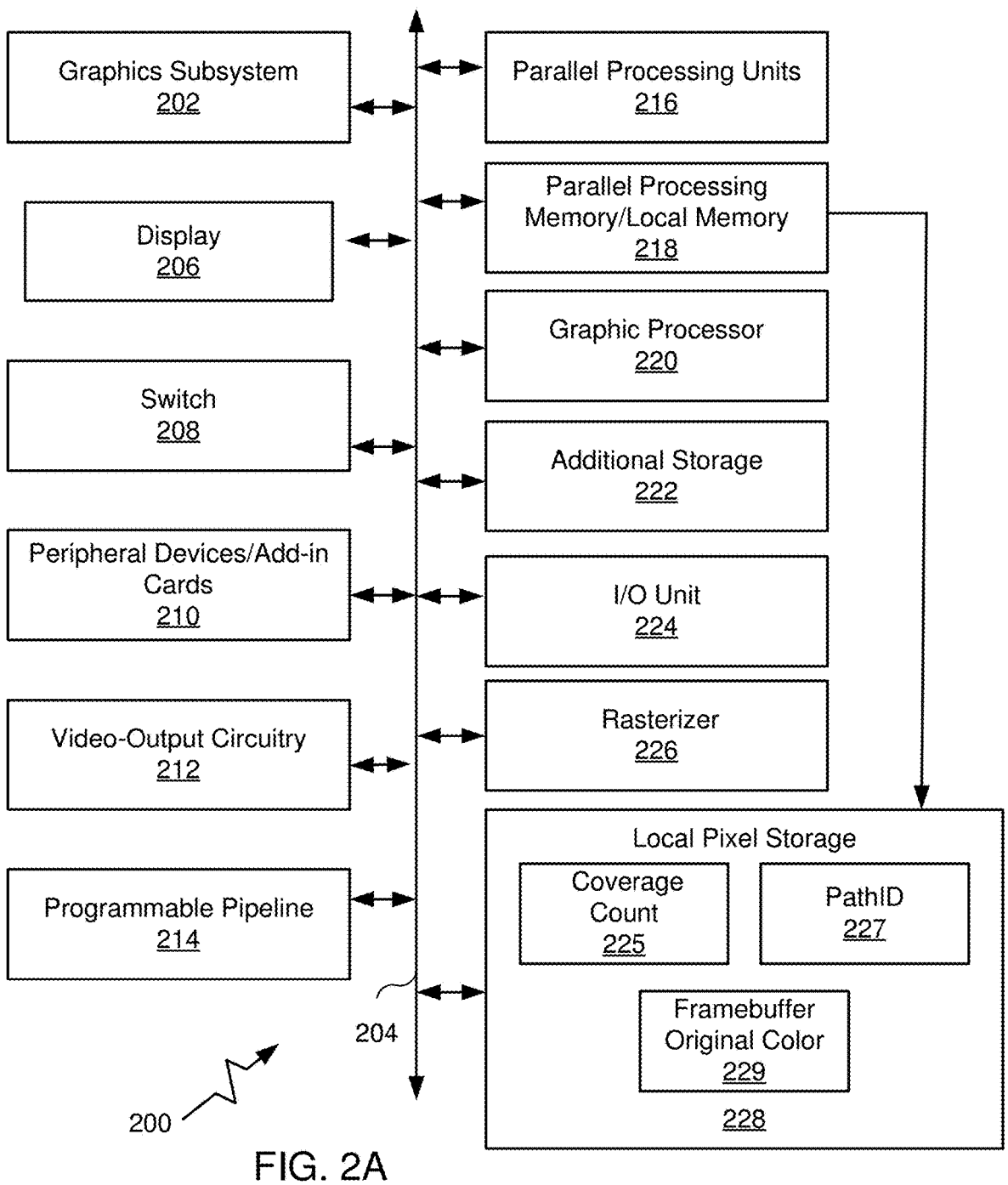
FIG. 2A is a high-level block diagram illustrating example hardware and software components of the present invention in accordance with some embodiments of the invention.

Referring now to FIGS. 1 and 2A, the GPU 104 is configured to render images more quickly than a CPU 102 because of its parallel processing architecture, which allows it to perform multiple calculations across streams of data simultaneously. This GPU 104 architecture comprises parallel processing subsystems or cores coupled to the memory bridge via the bus or other communication path 119 (204 in FIG. 2A), which may include a graphics subsystem 202 that delivers pixels to a display device 206 (e.g., a conventional CRT or LCD based monitor). In some embodiments, a system disk may also be connected to the I/O bridge in the user input interface 112. A switch 208 is configured to provide connections between the I/O bridge or other communication path in the user input interface 112 and other components such as a network interface 114 and various peripheral devices 210 (e.g., add-in cards) that may be used. Other components (not explicitly shown), including USB or other port connections, CD drives, DVD drives, film recording devices, and the like, may also be connected to I/O bridge in the user input interface 112. Communication paths interconnecting the various components in FIG. 1 may be implemented using any suitable protocol, such as PCI (Peripheral Component Interconnect), PCI-Express, AGP (Accelerated Graphics Port), HyperTransport, or any other bus or point-to point communication protocols, and connections between different devices may use different protocols as is known in the art.

In some embodiments, the parallel processing subsystems 123 in the GPU 104 may incorporate circuitry optimized for graphics and video processing, including, for example, video output circuitry 212. In another embodiment, the parallel processing subsystems 123 in the GPU 104 incorporate circuitry optimized for general purpose processing, while preserving the underlying computational architecture, described in greater detail herein. In yet another embodiment, the parallel processing subsystem 123 in the GPU 112 may be integrated with one or more other system elements, such as the memory bridge in the system memory 118 (FIG. 1), processing unit 102 (FIG. 1), and I/O bridge in the user input interface 112 (FIG. 1) to form a system on chip ("SoC"). It will be appreciated that the system shown herein is illustrative and that variations and modifications are possible. The connection topology, including the number and arrangement of bridges, the number of processing units 102, and the number of parallel processing subsystems in the GPU 104, may be modified as desired. For instance, in some embodiments, system memory 118 may be connected to the processing unit 102 directly rather than through a bridge, and other devices communicate with system memory 118 via memory bridge and the processing unit 102. In other alternative topologies, parallel processing subsystems in the GPU may be connected to the user input interface 112 or directly to the processing unit 102, rather via a memory bridge. In still other embodiments, the user input interface and memory components may be integrated into a single chip. Large embodiments may include two or more processing units 102 and two or more parallel processing systems in the GPU 104. The particular components shown herein are optional and illustrative; for instance, any number of add-in cards or peripheral devices may be integrated and supported.

It should be recognized that graphics hardware has evolved from a fixed function to a programmable pipeline 214. The programmable pipeline 214 is based on vertex and pixel shaders. A vertex shader program (stored in other program data 128 in FIG. 1) executes on each vertex of a graphics primitive, while a pixel shader program (also stored in other program data 128 in FIG. 1) executes on every pixel of a rasterized triangle. The data encapsulated in a vertex may a user defined collection of floating-point numbers, much like a C struct (program data 130 in FIG. 1). The vertex shader program may modify this, or invent new data, and pass the result along to a pixel shader. The input to a pixel shader is an interpolation of the vertex data on the vertices of a triangle. This interpolation is non-linear, involving the projective transform that maps a triangle from model to screen space. The pixel shader can output a color value that is written to the frame buffer.

The parallel processing subsystems 123 in the GPU 104 may include one or more parallel processing units 216, each of which may be coupled to a local parallel processing memory 218. In a typical architecture, a parallel processing subsystem may include a number of parallel processing units 216. The parallel processing units 216 and the parallel processing memories (local memory 218) may be implemented using one or more integrated circuit devices, such as programmable processors, application specific integrated circuits (ASICs), or memory devices, or in any other technically feasible fashion.

In some embodiments, some or all of the parallel processing units 216 in parallel processing subsystem 123 are graphics processors 220 with rendering pipelines that may be configured to perform various tasks related to generating pixel data from graphics data supplied by CPU 102 and/or system memory 118, interacting with local parallel processing memory 218 (which can be used as graphics memory including, e.g., a conventional frame buffer) to store and update pixel data, delivering pixel data to display devices, and the like. In some embodiments, the parallel processing subsystem in the GPU 104 may include one or more parallel processing units 216 that operate as graphics processors 220 and one or more other parallel processing unis 216 that may be used for general-purpose computations. The parallel processing units 216 may be identical or different, and each parallel processing unit 216 may have its own dedicated parallel processing memory device 218 or no dedicated parallel processing memory device 218 and may use a shared memory (e.g., the system memory 118 in FIG. 1). One or more parallel processing units 216 may output data to the display device 206 or each parallel processing unit 216 may output data to one or more display devices 206.

In operation, the processing unit 102 may serve as the "master" processor of computer system 100, controlling and coordinating operations of other system components. In particular, the processing unit 102 may execute commands that control the operation of the parallel processing units 216. In some embodiments, the processing unit 102 may write a stream of commands for each parallel processing units 216 to a pushbuffer (not explicitly shown) that may be located in system memory 118, parallel processing memory 218, or another storage location 222 accessible to both the processing unit 102 and the parallel processing units 216 in the GPU 104. The parallel processing units 216 (in GPU 104) read the command stream from the pushbuffer and then execute commands asynchronously relative to the operation of the processing unit 102. Each parallel processing unit 216 may include an I/O (input/output) unit 224 configured to communicate with the other components in the computer system 100 via a communication path, which may connect to a memory bridge (or, in one alternative embodiment, directly to processing unit 102). The connection of the parallel processing units 216 to the other parts of the computer system 100 may also vary.

In one embodiment, the communication path may be a PCI EXPRESS link, in which dedicated lanes are allocated to each PPU, as is known in the art. Other communication paths may also be used. The I/O unit 224 generates packets (or other signals) for transmission on communication path and also receives all incoming packets (or other signals) from communication path 204, directing the incoming packets to appropriate components of parallel processing units 216. Each parallel processing unit 216 advantageously implements a highly parallel processing architecture. Each parallel processing unit 216 may include a processing cluster array that includes a number C of general processing clusters (GPCs). Each GPC is capable of executing a large number (e.g., hundreds or thousands) of threads concurrently, where each thread is an instance of a program. In various applications, different GPCs may be allocated for processing different types of programs or for performing different types of computations. For example, in an example graphics application, a first set of the allocation of GPCs may vary dependent on the workload arising for each type of program or computation. GPCs are configured to receive processing tasks to be executed via a work distribution unit, which may receive commands defining processing tasks from a front-end unit. Processing tasks may include indices of data to be processed, e.g., surface (patch) data, primitive data, vertex data, and/or pixel data, as well as state parameters and commands defining how the data is to be processed (e.g., what program is to be executed). Work distribution units may be configured to fetch the indices corresponding to the tasks, or work distribution units may receive the indices from the front-end unit. The front-end unit ensures that GPCs are configured to a valid state before the processing specified by the pushbuffers is initiated. When the parallel processing units 216 are used for graphics processing, for example, the processing workload for each patch is divided into approximately equal sized tasks to enable distribution of the tessellation processing to multiple GPCs. A work distribution unit may be configured to produce tasks at a frequency capable of providing tasks to multiple GPCs for processing. In some embodiments, portions of GPCs may be configured to perform different types of processing. For example, a first portion may be configured to perform vertex shading and topology generation, a second portion may be configured to perform tessellation and geometry shading, and a third portion may be configured to perform pixel shading in pixel space to produce a rendered image. Intermediate data produced by the GPCs may be stored in buffers to allow the intermediate data to be transmitted between GPCs for further processing.

A memory interface may be configured with partitioned units that are each directly coupled to a portion of parallel processing memory 218. Each partitioned memory may be a RAM or DRAM. Frame buffers or texture maps may be stored across the memory 218, allowing partition units to write portions of each render target in parallel to efficiently use the available bandwidth of parallel processing memory. Any one of GPCs may process data to be written to any of the DRAMs within parallel processing memory.

In some configurations, a crossbar unit may be configured to route the output of each GPC to the input of any partition unit or to another GPC for further processing. GPCs communicate through the crossbar unit to read from or write to various external memory devices. In one embodiment, crossbar unit has a connection to memory interface to communicate with I/O unit, as well as a connection to local parallel processing memory, thereby enabling the processing cores within the different GPCs to communicate with system memory or other memory that is not local to a PPU. The crossbar unit may use virtual channels to separate traffic streams between the GPCs and partition units. Again, GPCs may be programmed to execute processing tasks relating to a wide variety of applications, including but not limited to, linear and nonlinear data transforms, filtering of video and/or audio data, modeling operations (e.g., applying laws of physics to determine position, Velocity and other attributes of objects), image rendering operations (e.g., tessellation shader, Vertex shader, geometry shader, and/or pixel shader programs), and so on. Parallel processing units 216 may transfer data from system memory 118 and/or local parallel processing memories 218 into internal (on-chip) memory, process the data, and write result data back to system memory 118 and/or local parallel processing memories 218, where such data may be accessed by other system components, including the CPU 102 or another parallel processing subsystem. A parallel processing unit 216 may be provided with any amount of local parallel processing memory 218, including no local memory, and may use local memory and system memory in any combination. For instance, a parallel processing unit 216 may be a graphics processor 220 in a unified memory architecture (UMA) embodiment. In such embodiments, little or no dedicated graphics (parallel processing) memory would be provided, and the parallel processing units 216 may use system memory exclusively or almost exclusively. In UMA embodiments, a particular parallel processing unit 216 may be integrated into a bridge chip or processor chip or provided as a discrete chip with a high-speed link (e.g., PCI-EX-PRESS) connecting the parallel processing units 216 to system memory via a bridge chip or other communication means. As noted above, any number of parallel processing units 216 may be included in a parallel processing subsystem. Parallel processing units 216 in a multi-parallel processing system may be identical to or different from one another. For instance, different parallel processing units 216 may have different numbers of processing cores, different amounts of local parallel processing memory, and so on. Where multiple parallel processing units 216 are present, those parallel processing units 216 may be operated in parallel to process data at a higher throughput than is possible with a single parallel processing unit 216. Systems incorporating one or more parallel processing units 216 may be implemented in a variety of configurations and form factors, including desktop, laptop, or handheld personal computers, servers, workstations, game consoles, embedded systems, and the like.

A graphics processing pipeline (in 214) may be configured to implement and perform the functions of one or more of a Vertex processing unit, a geometry processing unit, and a fragment processing unit. The functions of a data assembler, a primitive assembler, a rasterizer 226, and a raster operations unit may also be performed by other processing engines within a GPC and a corresponding partition unit. Alternately, a graphics processing pipeline 214 may be implemented using dedicated processing units for one or more functions. The data assembler is configured to collect vertex data for high-order surfaces, primitives, and the like, and output the vertex data, including the vertex attributes, to vertex processing unit. The vertex processing unit represents a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. Vertex processing unit may read data that is stored in L1 cache, parallel processing memory, or system memory by data assembler for use in processing the vertex data. Primitive assembler receives vertex attributes from Vertex processing unit, reading stored vertex attributes, as needed, and constructs graphics primitives for processing by geometry processing unit. Graphics primitives may include triangles, line segments, points, and the like. Geometry processing unit is a programmable execution unit that is configured to execute geometry shader programs, transforming graphics primitives received from primitive assembler as specified by the geometry shader programs. For example, geometry processing unit may be programmed to subdivide the graphics primitives into one or more new graphics primitives and calculate parameters, such as plane equation coefficients, that are used to rasterize the new graphics primitives. In some embodiments, geometry processing unit may also add or delete elements in the geometry stream. Geometry processing unit outputs the parameters and vertices specifying new graphics primitives to a viewport scale, cull, and clip unit. Geometry processing unit may read data that is stored in parallel processing memory or system memory for use in processing the geometry data. Viewport scale, cull, and clip unit performs clipping, culling, and viewport Scaling and outputs processed graphics primitives to the rasterizer 226.

The rasterizer 226 scans and converts the new graphics primitives and outputs fragments and coverage data to fragment processing unit. Additionally, the rasterizer 226 may be configured to perform Z culling and other Z-based optimizations. Fragment processing unit is a programmable execution unit that is configured to execute fragment shader programs, transforming fragments received from the rasterizer 226 as specified by the fragment shader programs. For example, the fragment processing unit may be programmed to perform operations such as perspective correction, texture mapping, shading, blending, and the like, to produce shaded fragments that are output to raster operations unit. Fragment processing unit may read data that is stored in parallel processing memory or system memory for use in processing the fragment data. Fragments may be shaded at pixel, sample, or other granularity, depending on the programmed sampling rate. Raster operations unit is a processing unit that performs raster operations, such as stencil, Z test, blending, and the like, and outputs pixel data as processed graphics data for storage in graphics memory. The processed graphics data may be stored in graphics memory, e.g., parallel processing memory 218, and/or system memory 118, for display on a display device 206 or for further processing by the processing unit 102 or parallel processing subsystem 112. In some embodiments of the present invention, raster operations unit is configured to compress Z or color data that is written to memory and decompress Z or color data that is read from memory.

FIG. 2A includes a local pixel storage 228 illustrated to store three values as illustrated. A coverage count as referenced by reference numeral 225, a pathID as referenced by reference numeral 227, and a framebuffer original color 228. The pixel storage 228 enables access to fast, user-defined values at each pixel location. The "coherent" version of the extension ensures that shaders execute coherently and in API order. A pixel local storage is supported on most GPUs as recognized by those skilled in the art.

Figure 4:
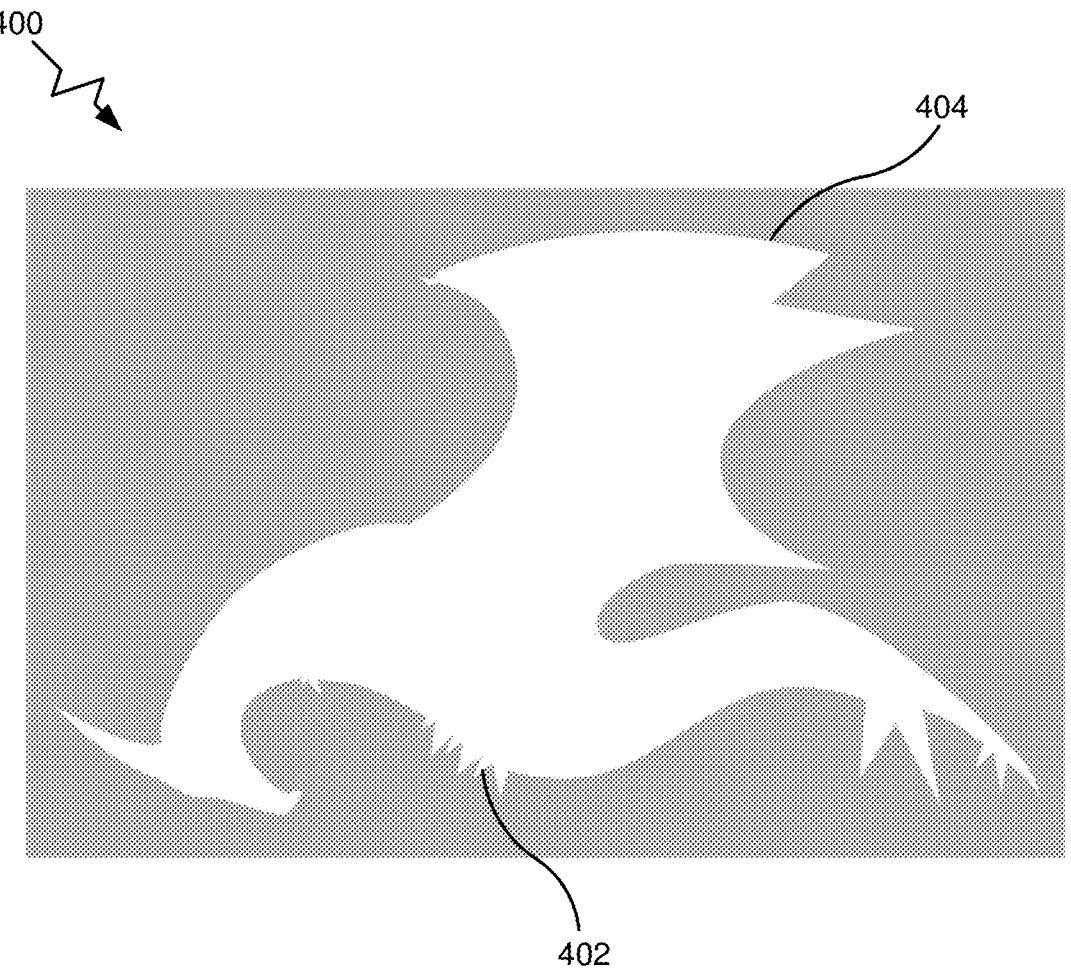
FIG. 4 is a graphical representation illustrating one example drawing with a path. The path is a closed, filled shape composed of Bézier curves in accordance with some embodiments of the present invention.

The architecture illustrated in FIGS. 1 and 2A further includes an antialiasing stroke rendering module 134, which is coupled to the other components. The antialiasing stroke rendering module 134 in accordance with the present invention provides the functionalities described herein. The antialiasing stroke rendering module 134 executes an algorithm that can render an antialiased coverage mask for any path, using a single GPU shader program and a single GPU draw call. Referring now to FIG. 4, a "path" is a closed, filled shape composed of Bézier curves, as defined in the "SVG" (Scalable Vector Graphics) specification. As is known to those skilled in the art, SVG is a platform for two-dimensional graphics. It has two parts, an XML-based file format and a programming API for graphical applications. Its key features include shapes, text and embedded raster graphics, with many different painting styles. The architecture illustrated in FIG. 1 illustrates the single-pass path rendering module (coverage counting) 136 coupled to the other hardware/software components.

Referring now to FIG. 2B, the flow chart represents the functions implemented to execute the antialiasing stroke tool to automatically create smooth paths while rendering images. The flow chart depicts the process designated generally by reference numeral 230 begins at block 234, including one or more operations to apply the anti-aliasing stroke rendering function to a user's desired path. The process flow 230 continues to block 234, including one or more operations that execute the algorithm to render an anti-aliased coverage mask for a select path using a single GPU shader program and a single GPU draw cell. The process flow 230 continues to the next block 236, including one or more operations that tessellate the antialiasing stroke and path interior into triangles. The process flow 230 continues to the next block 238, including one or more operations that connect adjoined stroke edges with "Bowtie Join" function. In some embodiments, the function of block 238 is included in the function of block 236. The process flow 230 continues to the next block 240, including one or more operations that apply coverage to curve triangles, with positive coverage applied to clockwise curve triangles and negative coverage applied to counter-clockwise curve triangles.

Figure 3:
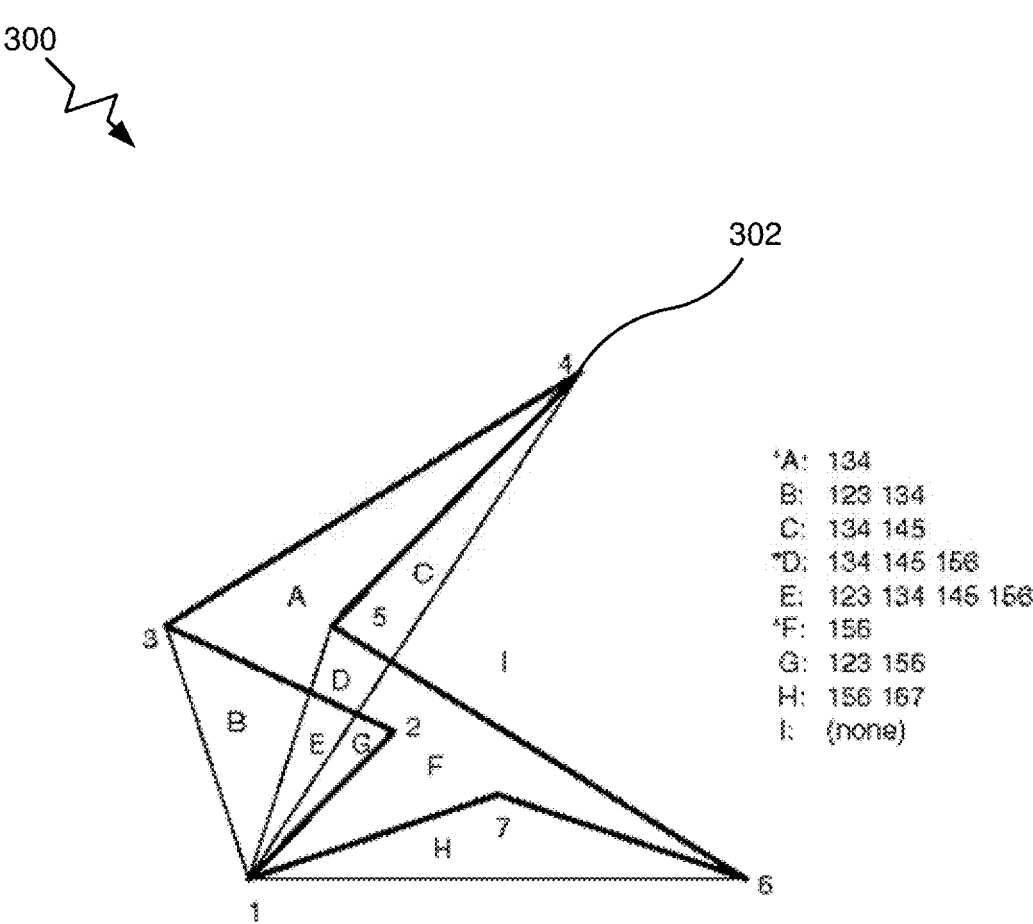
FIG. 3 is a graphical representation of a concave polygon rendered by drawing a series of triangles, which illustrates one approach used for building interactive graphics.

A detailed description of how to generate an antialiasing stroke and draw a path is described in greater detail below. Referring to the concave polygon 1234567 illustrated in FIG. 3, and recognizing that it is drawn as a series of triangles, each of the triangles is illustrated and referenced as "123," "134," "145," "156," and "167." One of the vertices of the concave polygon is designated by reference numeral 302. The heavier line represents the original polygon boundary. Drawing all these triangles divides the buffer into nine regions A, B, C, . . . , I, where region I is outside all the triangles.

In the text within the figure, each of the region names is identified by a list of the triangles that cover it. Regions A, D, and F make up the original polygon. These three regions as illustrated are covered by an odd number of triangles. Every other region as illustrated is covered by an even number of triangles (possibly zero). Therefore, to render the inside of the concave polygon, a developer or user can render regions that are enclosed by an odd number of triangles. This may be accomplished by using the stencil buffer, with a two-pass algorithm.

In a first pass, the algorithm clears the stencil buffer and disables writing into the color buffer. In a next pass, the algorithm draws each of the triangles in turn, using the GL_INVERT function in the stencil buffer. For optimum performance, triangle fans are used. This function flips the value between zero and a nonzero value in every instance that a triangle is drawn that covers a pixel. After all the triangles are drawn, if a pixel is covered an even number of times, the value in the stencil buffers is zero; otherwise, it is nonzero. Finally, the algorithm draws a large polygon over the whole region (or redraws the triangles), but automatically allows drawing only where the stencil buffer is nonzero. In accordance with the present invention, the algorithm does not need to start with a polygon vertex. In this 1234567-example illustrated, the algorithm can set P to be any point on or off the polygon. The algorithm draws the triangles designated in Figure as P12, P23, P34, P45, P56, P67, and P71. The regions covered by an odd number of triangles are inside; the other regions are outside. In the event that P is located on one of the polygon's edges, one of the triangles drawn will appear empty.

This rendering technique may be used to fill both nonsimple polygons (polygons whose edges cross each other) as well as polygons with holes or empty spaces.

Another example illustrates the rendering technique for drawing a complicated polygon with two regions, one four-sided and one five-sided. Consider an instance of a triangular and a four-sided hole (it does not matter in which regions the holes lie). Designate the two regions to be "abcd" and "efghi," and the holes as "jkl" and "mnop." Designating z to be any point on the plane, the following triangles are drawn: zab zbc zcd zda zef zfg zgh zhi zie zjk zkl zlj zmn zno zop zpm. The algorithm marks regions covered by an odd number of triangles as "in," and those covered by an even number as "out."

Those skilled in the art may rely on the OpenGL "Redbook" method of drawing a concave polygon as disclosed in Chapter 14. However, it should be recognized that this method is not antialiased and its applications must rely on hardware multisampling. It may require many state changes dealing with the stencil buffer. And, it may be expanded to paths by linearizing curves into small line segments. As should also be recognized by those skilled in the art, Skia renders paths in a similar way, by performing the subdivision with hardware tessellation or fixed-count instancing.

Another method known to those skilled in the art, referred to as "Resolution Independent Curve Rendering Using Programmable Graphics Hardware," is disclosed herein and is incorporated herein by reference. It should be recognized that this method represents the following functions: calculating per-pixel coverage of a Bézier curve instead of relying on hardware multisampling; applicable to a single Bézier curve, but only provides a "brute force" method of combining Bézier curves into full paths. Yet another method referred to as "Coverage counting"1 path renderer is known and described in a paper, the contents of which are incorporated herein by reference. This reference builds on the Loop/Blinn paper referenced above, proposing a simple mechanism to combine the fractional coverages of Bézier curves and draw a complete path. This method introduces the concept of counting fractional coverage per pixel in order to render a path, by assigning positive coverage to clockwise-winding regions and negative coverage to counter-clockwise regions. A pixel completely inside the region gets a coverage magnitude of 1 and a pixel partially inside the region gets a fractional coverage. This method defines functions for converting a pixel's final "coverage count" to actual coverage for antialiasing. This method defines one function for "winding" fill rule, and one function for "even/odd." This method has the ability to render antialiased triangles, but is not efficient. In practice, this algorithm is implemented using multiple shader programs and context switches.

The present invention establishes a rendering context that accumulates fragment coverage at each pixel. Coverage is linearly interpolated across triangles. Coverage from fragments of clockwise triangles is added to the per-pixel coverage value and coverage from fragments of counter-clockwise triangles is subtracted from the per-pixel coverage value. In some embodiments, such a context may be a color attachment on a framebuffer, including the following functions:

Render to a single-channel, fp16 coverage mask (or fp32, or fixed point, etc.)

Use a blend equation of "src+dst" (e.g., glBlendFunc (GL_ONE, GL_ONE))

The fragment shader takes a varying "coverage" value, negates it if gl_FrontFacing is false, and outputs the new value:

---

Example fragment shader

---

```
in float coverage; // Interpolated.
out float signed coverage;
void main ( )
{
  signed_coverage = IsClockwise ( ) ? coverage : -coverage;
}
```

---

The Algorithm executes as follows:
1. Render the triangles outlined below:
2. Draw the path, un-antialiased It should be recognized that drawing un-antialiased path on top of an antialiasing stroke in a coverage counting system produces a complete mask. The final coverage count may then be converted to path coverage using the functions described for path rendering by counting pixel coverage. As is recognized by those skilled in the art, rendering a closed path is a frequent task in computer graphics, for example, a polygon or other shape as described above. Such shapes are typically found in typography, vector graphics, design applications, etc. The system and methods of the present invention enhance path-rendering techniques to provide scale during animation, and address prior limitations that required control points within the path to remain static. The ability of the present invention to render paths efficiently and with fewer constraints allows interfaces and applications with richer and more dynamic content. The present techniques introduce efficient path rendering using a GPU as one described above. In particular, the rendering techniques address fractional coverage counting, which ameliorates aliasing at the edges of shapes, reduce or eliminate reliance on hardware multisampling to achieve anti-aliasing, and open up the possibility of sophisticated graphics rendering on mobile devices or other platforms with resource constraints. The final coverage count may be converted to path coverage using the function described in technical disclosure publication entitled "Path rendering by counting pixel coverage,"2 by Brian Salomon, Christopher Dalton, and Allan Mackinnon on May 17, 2017, the contents of which are incorporated herein by reference.

In addition, it should be recognized that there are various methods known to those skilled in the art for drawing an un-antialiased path, for example based on the OpenGL "Redbook" method, triangulation, or hybrids. One approach is to use the path tessellation algorithm found in Skia, with some key differences. Technically feasible approaches described here do not use multisampling. The antialiasing stroke in accordance with the present invention smoothes the edges. The techniques described here do not use the stencil buffer. The algorithms of the present invention draw a coverage of +1.0 for clockwise triangles and −1.0 for counterclockwise triangles. The algorithms use the same vertices that are on the hard middle edge of the antialiasing stroke. These hard edges match identically in order to be rasterized correctly.

Referring now to FIG. 2C, the process for single-pass rendering is illustrated generally by reference numeral 260, which begins at block 262, including one or more operations for creating an algorithm that maintains three values in fast memoryless pixel local storage including the currentPathID, coverageCount, and the framebufferOriginalColor. The process 260 proceeds to the next block 264, including one or more operations for storing the current coverage count at the pixel being covered. The process 260 proceeds to the next block 266, including one or more operations for storing the color in the framebuffer at the pixel being covered immediately before the current path starts rendering. The process 260 proceeds to the next block 268, including one or more operations for storing the unique ID of the last path to be drawn at the current pixel. The process 260 proceeds to the next block 270, including one or more operations for determining if multiple fragments from a single path touch the same pixel, the framebufferOriginalColor Value allows a function to re-blend the path into the framebuffer using the updated coverageCount Value. The process 260 proceeds to the next block 272, including one or more operations for determining if the pathID being rendered does not match the one in the pixel local storage, in which instance it is determined that this particular one is the first fragment from that path to touch the pixel. The process 260 proceeds to the next block 274, including one or more operations for loading the current framebuffer color into the framebufferOriginalColor value in the pixel local storage to enable single-pass path rendering as the right answer is delivered, even when the fragments overlap. The process 260 proceeds to the next block 276, including one or more operations for resetting the coverage count to zero, which enables batching of multiple paths. The process 260 proceeds to the next block 278, including one or more operations for updating the currentPathID value in the pixel local storage to match the PathID being rendered. The framebuffer may also be accessed from the texture-backed pixel local storage.

In one example implementation, the software tools described herein draw the triangles as described in FIG. 4 and on, for any number of paths, with an additional integer per triangle that uniquely identifies the path it belongs to. An example fragment shader program as illustrated below may be used.

```
Example fragment shader
// Pixel local storage data.
layout (binding=0, r32ui) upixelLocalANGLE pls_PathID;
layout (binding=1, r32f) pixelLocalANGLE pls_CoverageCount;
layout (binding=2, rgba8) pixelLocalANGLE pls_FramebufferOriginalColor;
layout (binding=3, rgba8) pixelLocalANGLE pls_Framebuffer;
// Inputs from the vertex stage.
flat in uint pathID;
in vec4 pathColor;
in float fragmentCoverage;
void main ( )
{
vec4 framebufferOriginalColor;
float coverageCount;
uint lastPathID = pixelLocalLoadANGLE (pls_PathID) . r;
if (pathID != lastPathID)
{
// This is the first fragment from the current path to touch this pixel.
// Update the path ID in pixel local storage so future fragments from
// the same path don't take this branch.
pixelLocalStoreANGLE (pls_PathID, uvec4 (pathID) ) ;
// Load the current framebuffer color into pixel local storage. We blend
// every fragment in the path against this color instead of what's in
// the framebuffer. This is what enables single-pass path rendering
// because we still get the right answer when fragments overlap.
framebufferOriginalColor = pixel Local LoadANGLE (pls_Framebuffer) ;
pixelLocalStoreANGLE (pls_FramebufferOriginalColor,
framebufferOriginalColor) ;
// Reset coverageCount to 0. This is what allows us to batch multiple
// paths together in a single draw call.
coverageCount = 0.0;
} else
{
// This fragment has been touched before by the current path. Load the
// original framebuffer color from before the path began rendering, and
// load the path's current coverage count.
framebufferOriginalColor =
pixel LocalLoadANGLE (pls_FramebufferOriginalColor) ;
coverageCount = pixel Local LoadANGLE (pls_CoverageCount) . r;
}
if (gl_FrontFacing)
{
// Add the coverage fragment if its triangle is clockwise.
coverageCount += fragmentCoverage;
} else
{
// Subtract the coverage fragment if its triangle is counterclockwise.
coverageCount -= fragmentCoverage;
}
// Store the current coverageCount for the next fragment in the path.
pixelLocalStoreANGLE (pls_CoverageCount, vec4 ( coverageCount) ) ;
// Recalculate the path's coverage at this pixel.
float newCoverage = convertCoverageCountToCoverage ( coverageCount) ;
// Re-blend against the framebuffer's original color before this path began
// rendering.
vec4 newBlendedColor = applyBlendMode (pathColor * newCoverage,
framebufferOriginalColor) ;
pixelLocalStoreANGLE (pls_Framebuffer, newBlendedColor) ;
}
```

Using this approach, the software tools in accordance with the present invention can batch together any number of paths of all shapes and sizes, and render them with no upfront costs to a user.

Referring now to FIG. 2D, the process 280 begins at block 282, including one or more operations for proceeding with performing incremental blending by first, rendering the path in a single pass instead of two passes. These include first accumulating total coverage count or winding number and second covering the path with a draw that blends into the framebuffer using the coverage count or winding number that was established in pass 1. The process 280 proceeds to the next block 284, including one or more operations for blending the framebuffer incrementally at every path fragment, regardless of overlap, using the current running coverage count and the original framebuffer color from when the current path began rendering. The process 280 proceeds to the next block 286, including one or more operations for storing the original framebuffer color for the current path in the pixel local storage. The process 280 proceeds to the next block 288, including one or more operations for enabling incremental re-blending at every fragment, drawing the path in a single pass. The process 280 proceeds to the next block 290, including one or more operations for blending incrementally against the framebuffer's original color from when the current path began rendering, instead of the current contents of the framework. The process 280 proceeds to the next block 290, including one or more operations for storing a pathID value in the pixel local storage.

Referring now to FIG. 4, the effective solution provided by the present invention is illustrated. The rendered image on the graphical user interface 400 is purely geometric, composed of a single set of triangles, designated collectively by reference numeral 402 with an interpolated coverage value per vertex, that may be rendered on any modern GPU rasterization hardware. The path is designated by reference numeral 404.

Figure 5:
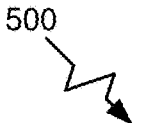
FIG. 5 is a graphical representation illustrating an antialiasing stroke on the same example drawing, illustrating the width enlarged for visualization in accordance with some embodiments of the present invention.
Figure 5:
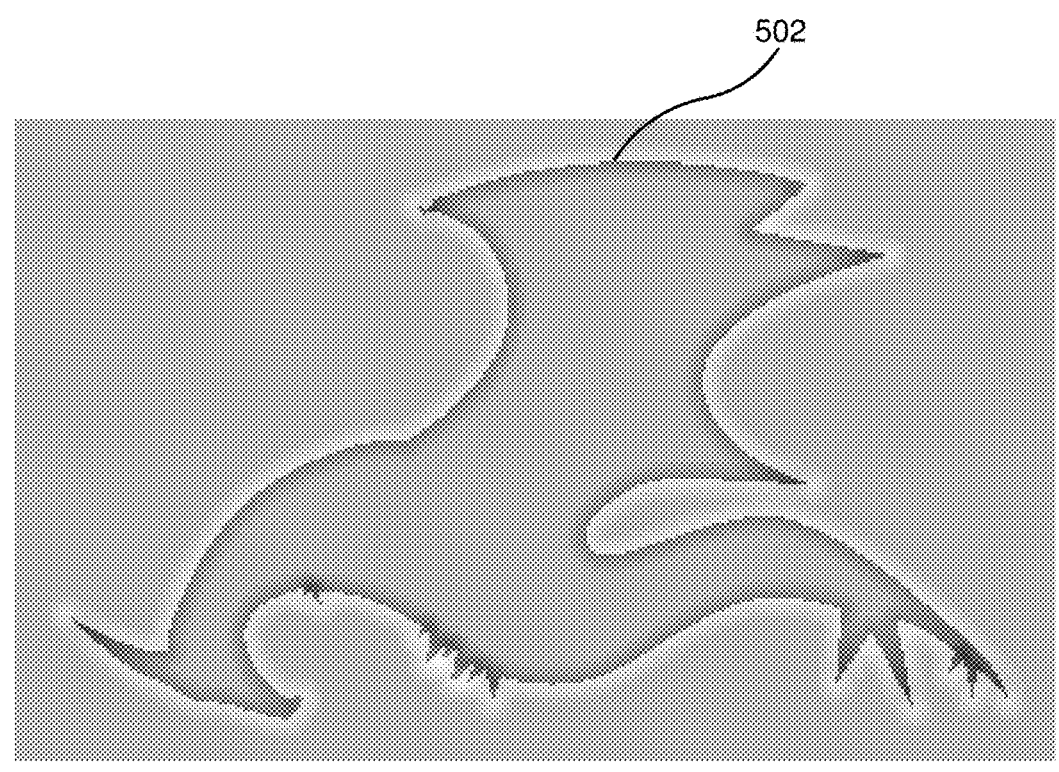
Figure 5:
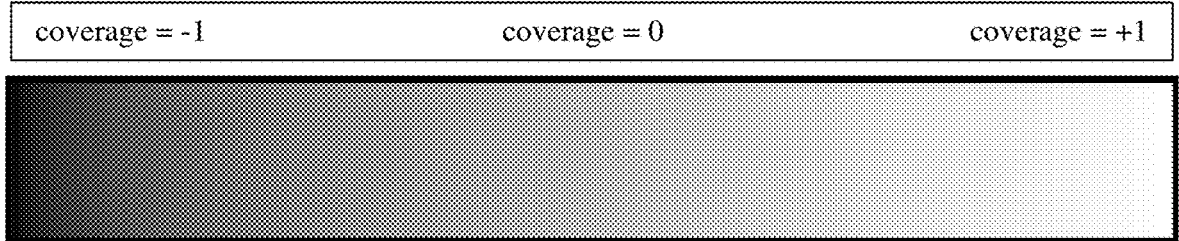

Referring to FIG. 5, the editor tool on the graphical user interface (designated by reference numeral 500) in accordance with the present invention introduces an antialiasing stroke that has positive coverage on the left side and negative coverage on the right side. The path is designated by reference numeral 502.

Figure 6:
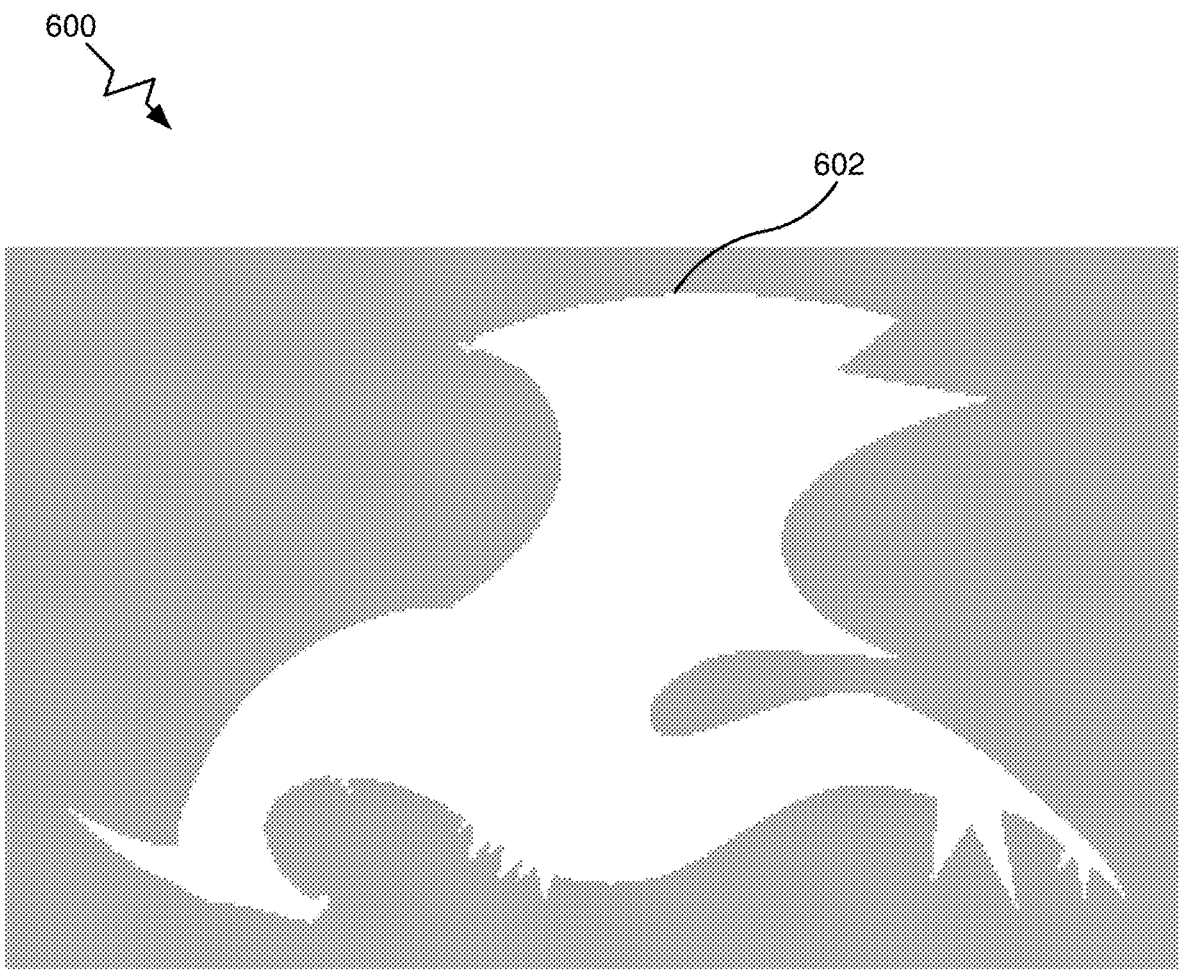
FIG. 6 is a graphical representation illustrating an unantialiased path of the same drawing in accordance with some embodiments of the present invention.

Referring to FIG. 6, when drawn on top of an un-antialiased path, in a coverage counting system, this stroke automatically smooths the edges. The graphical user interface is designated by reference numeral 600 and the path is designated by reference numeral 602. In some embodiments, when the antialiasing stroke is configured to be ~=1 pixel wide, it has the resulting effect of antialiasing the edges smoothly and elegantly. The path here is designated by reference numeral 602.

Figure 7:
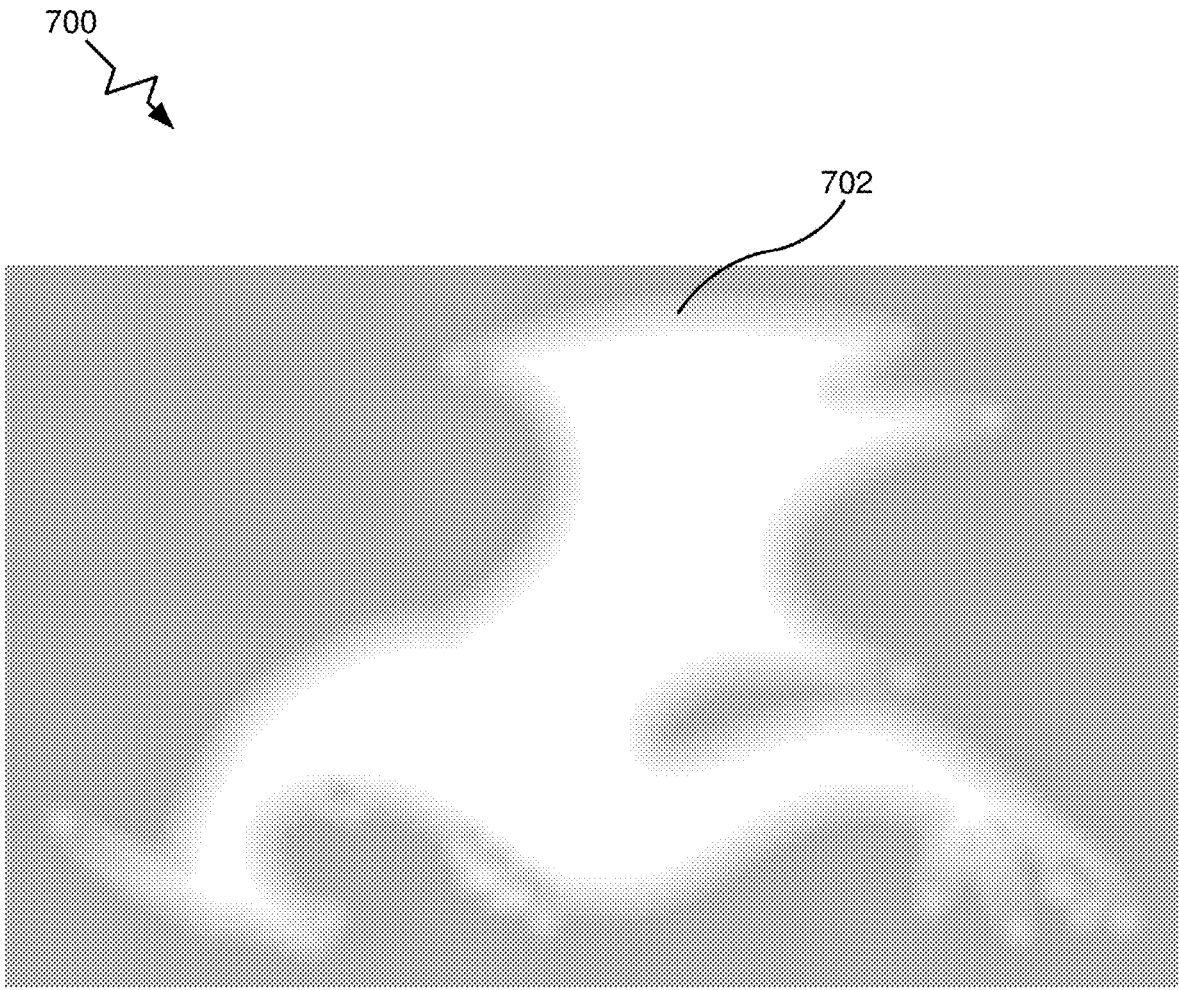
FIG. 7 is a graphical representation illustrating the result of summing the coverage counts at each pixel from FIG. 5 and FIG. 6 (stroke width enlarged for visualization) in accordance with some embodiments of the present invention.

FIG. 7 illustrates the result on a graphical user interface 700 of Summing the coverage counts at each pixel from the antialiasing stroke (in FIG. 5) and the un-antialiased path (in FIG. 6), which is a smooth path, with the stroke width enlarged for visualization. It should be recognized that the illustration appears to be blurry because it is enlarging the smooth path, which would appear smoother if ~1 pixel in width. The path here is designated by reference numeral 702.

Figure 8:
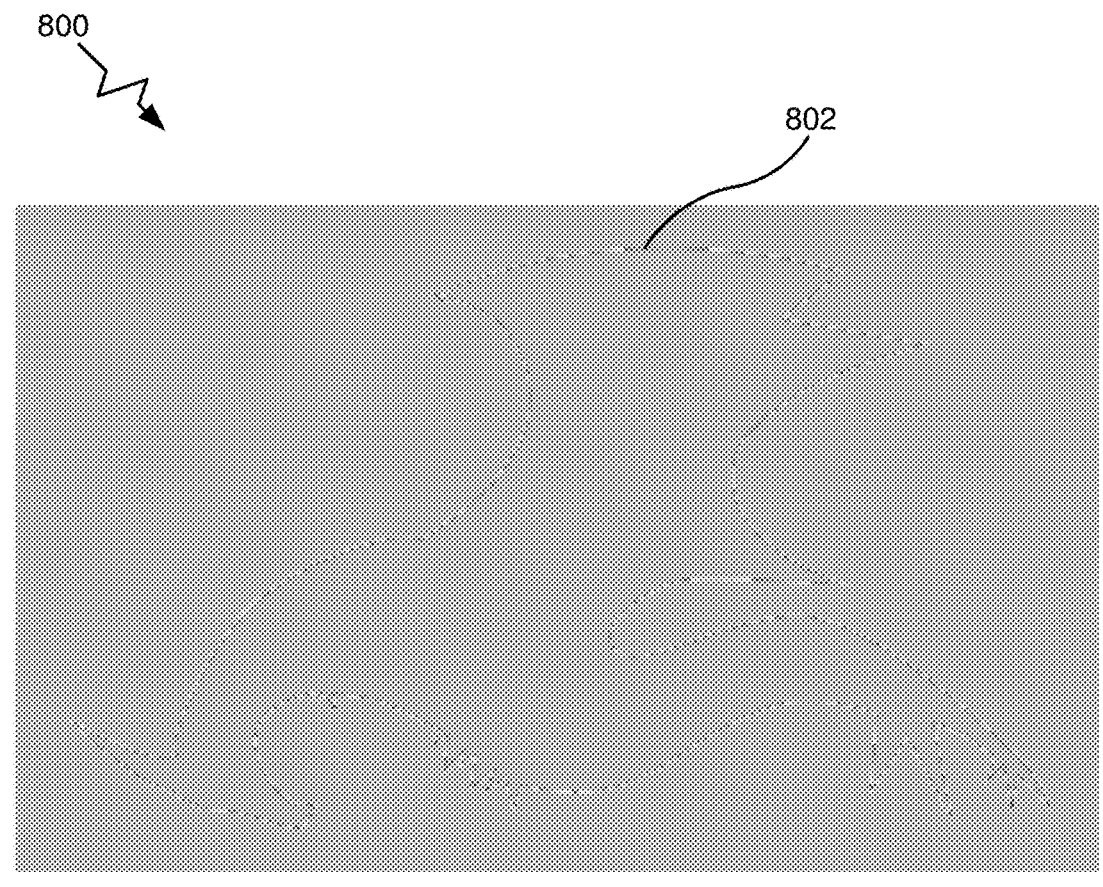
FIG. 8 is a graphical representation illustrating the drawn antialiasing stroke of the path on the same drawing (width ~=1 pixel, pixelated for visualization) in accordance with some embodiments of the present invention.
Figure 8:
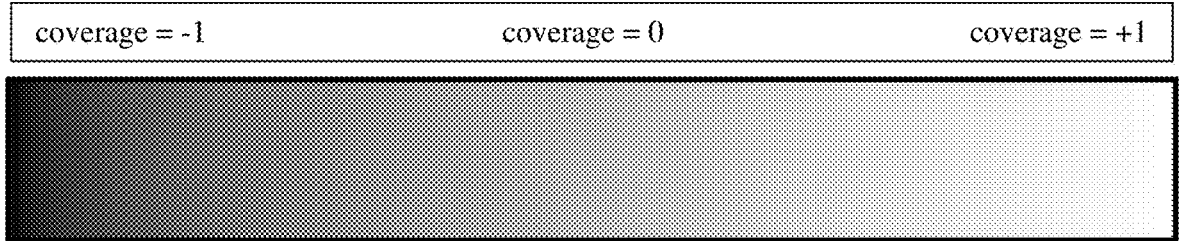

FIG. 8 illustrates the entire stroke at a width of ~=1. The graphical user interface is designated by reference numeral 800 and the path is designed by reference numeral 802. This figure shows a pixelated stroke for easier visualization.

Figure 9:
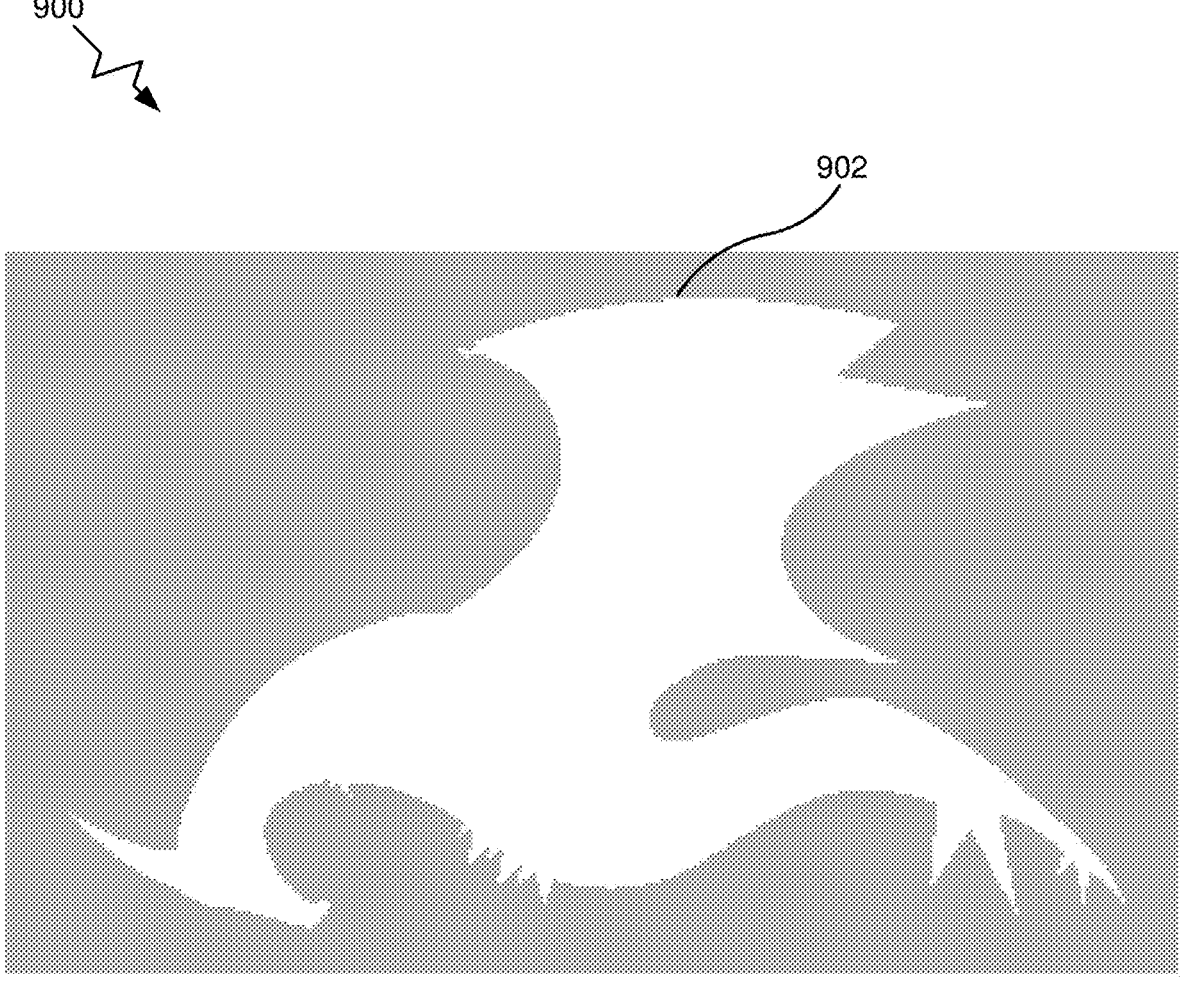
FIG. 9 is a graphical representation illustrating an unantialiased path of the same drawing in accordance with some embodiments of the present invention.

FIG. 9 illustrates a graphical user interface designated by reference numeral 900 with the un-antialiased path designated by reference numeral 902.

Figure 10:
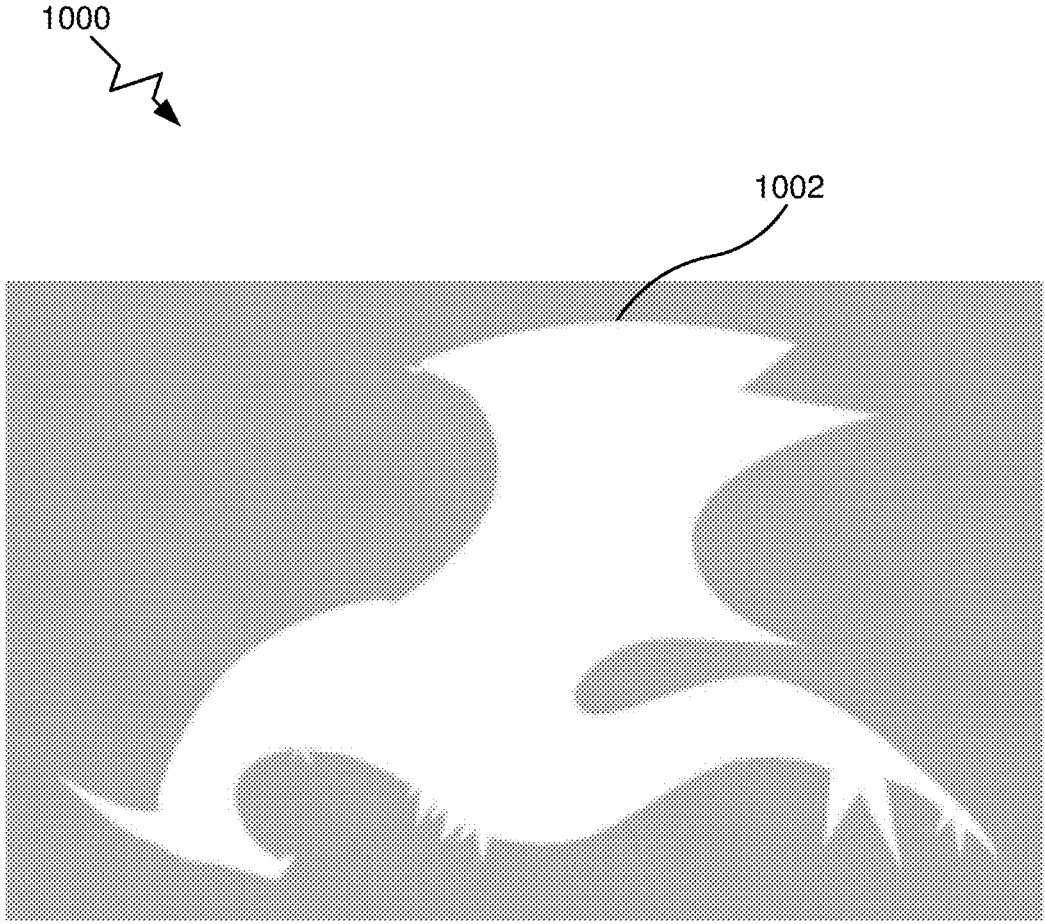
FIG. 10 is a graphical representation illustrating the result of summing the coverage counts at each pixel from FIG. 8 and FIG. 9 in accordance with some embodiments of the present invention. From this representation it may be seen that when the antialiasing stroke is ~1 pixel wide, its effect is to smooth the edges of a path and produce beautiful antialiasing.

FIG. 10 illustrates a graphical user interface 1000 displaying the result of applying the antialiasing stroke (FIG. 8) to the un-antialiased path (FIG. 9). The path is designated by reference numeral 1002.

Figure 11:
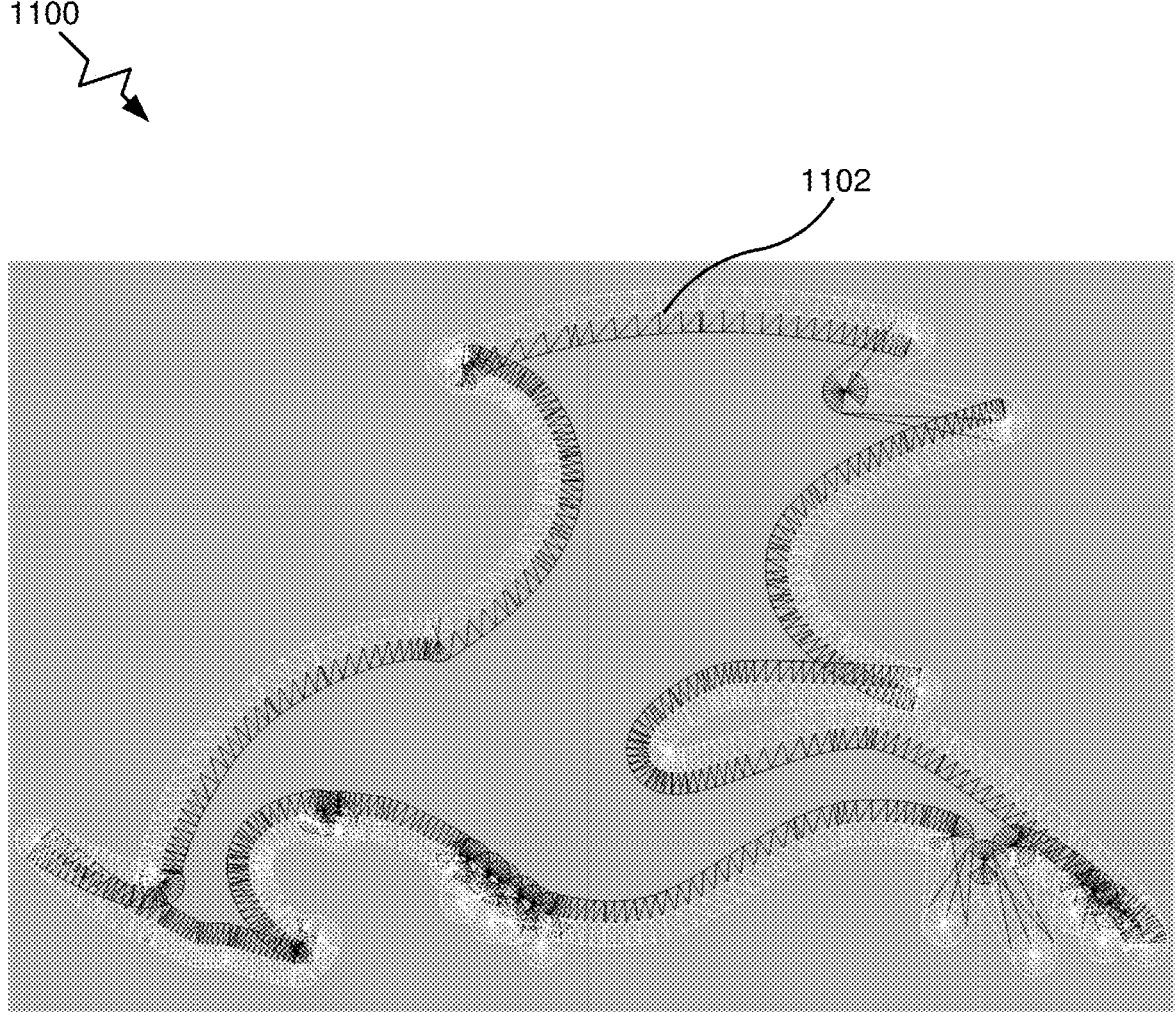
FIG. 11 is a graphical representation illustrating individual triangles generated by the antialiasing stroke.

FIG. 11 illustrates a graphical user interface designated by reference numeral 1000, with the triangles generated by the antialiasing stroke in accordance with the present invention. The path is designated by reference numeral 1002.

Figure 12:
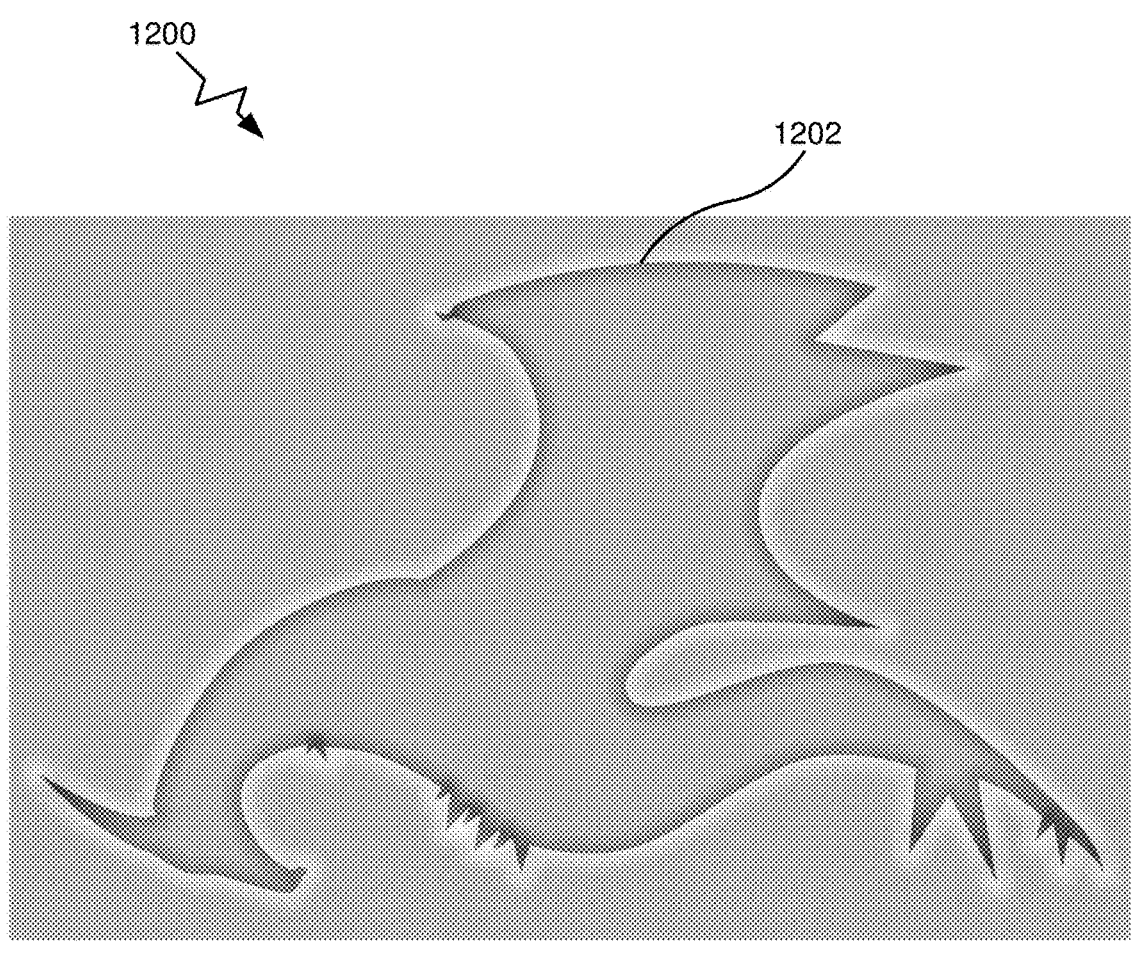
FIG. 12 is a graphical representation illustrating the coverage drawn by the antialiasing stroke on the same drawing (width enlarged for visualization).
Figure 12:
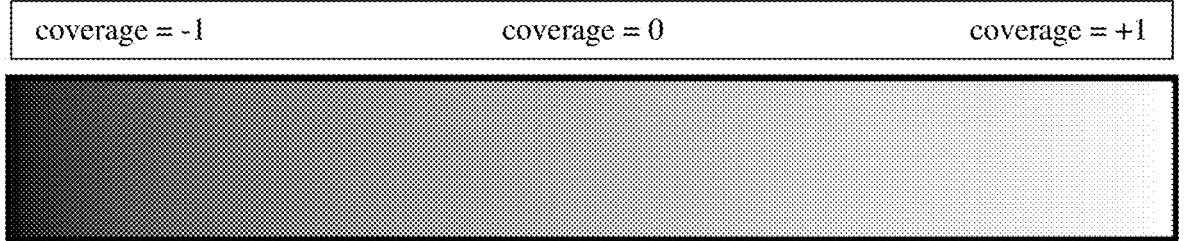

FIG. 12 illustrates a graphical user interface designated by reference numeral 1200, with the path designated by reference numeral 1202, with the coverage drawn by antialiasing stroke with the width enlarged for easier visualization.

Figure 13:
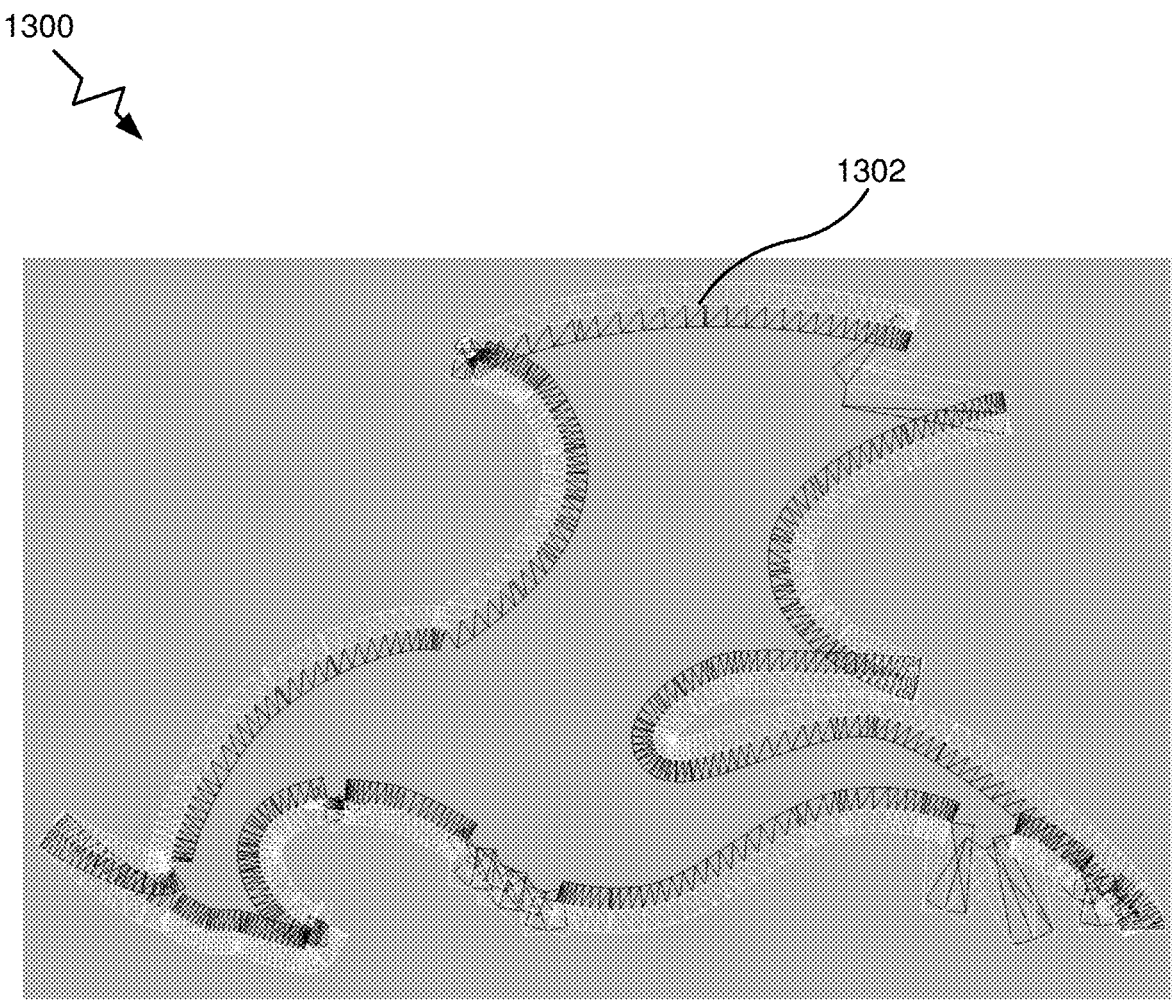
FIG. 13 is a graphical representation illustrating techniques applied to the same drawing where each Bézier in the path draws its own standalone stroke.
Figure 14:
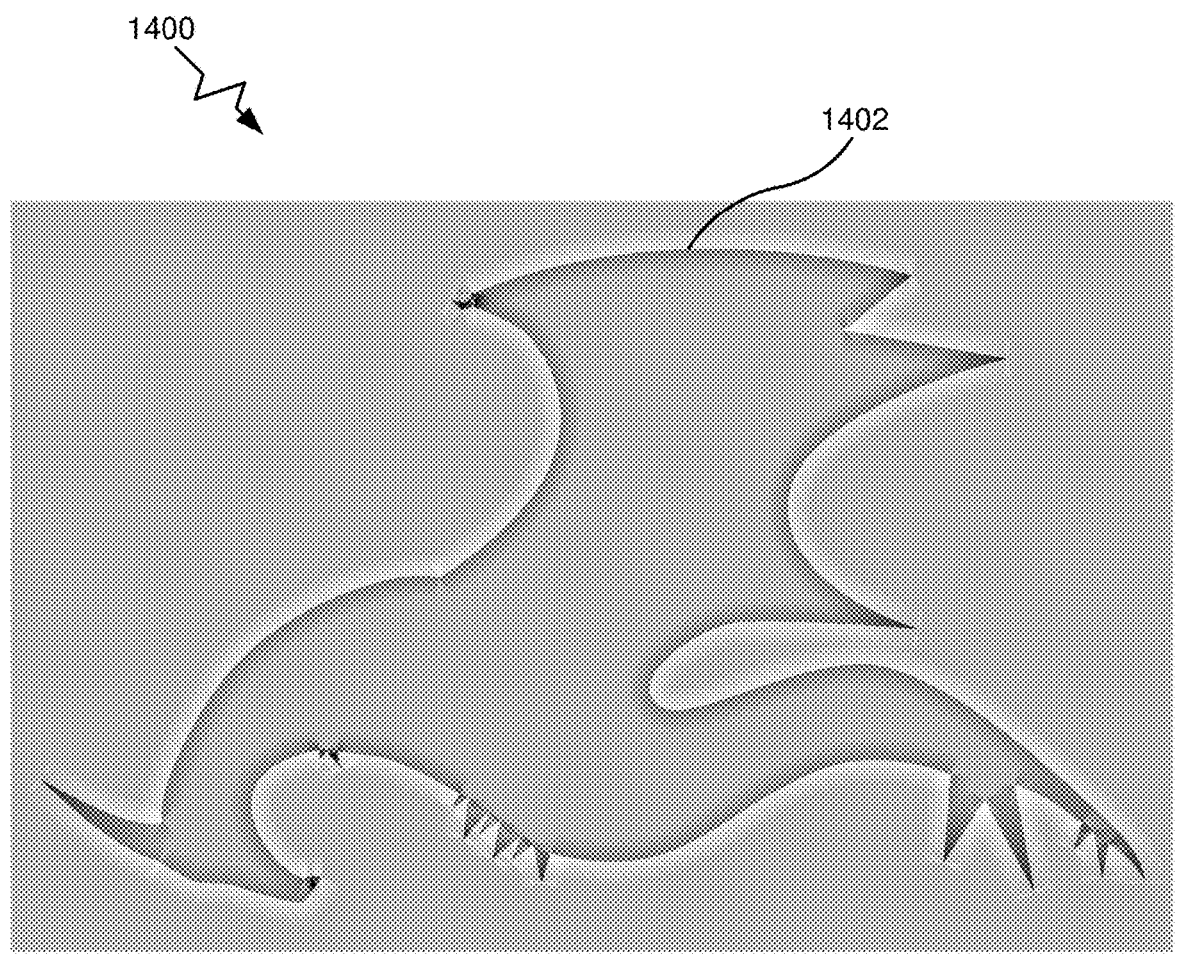
FIG. 14 is a graphical representation illustrating overlaps and gaps at the vertices of the same drawing, which may be fixed by using "Bowtie Joins."
Figure 14:
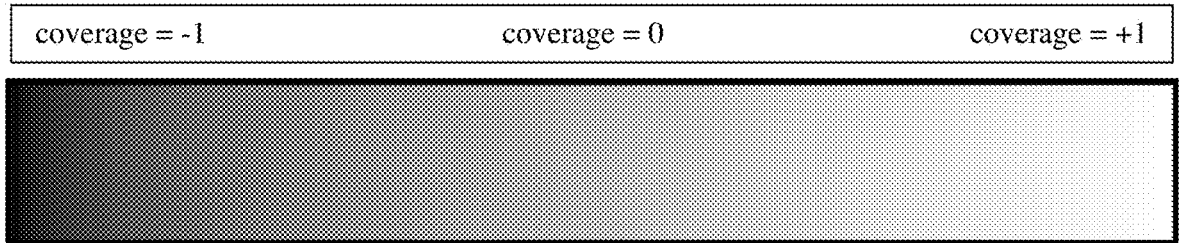

FIG. 13 illustrates a graphical user interface designated by reference numeral 1300, with the path designated by reference numeral 1302, with distinct standalone strokes for each Bézier curve in the path. FIG. 14 illustrates a graphical user interface designated by reference numeral 1400, with the overlaps and gaps at the vertices in the rendered image path, designated by reference numeral 1402.

Figure 15:
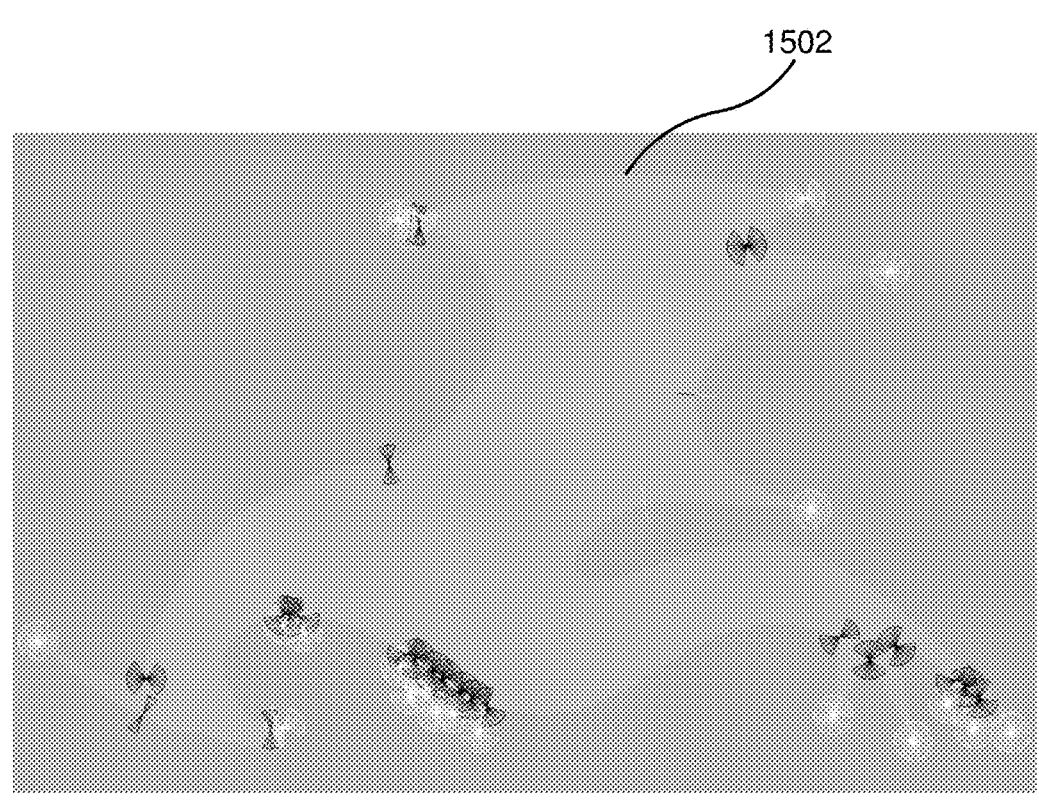
FIG. 15 is a graphical representation illustrating "Bowtie Join" triangles applied to the same drawing.

FIG. 15 illustrates a graphical user interface 1500 with the "Bowtie join" triangles applied to the rendered image path, designated by reference numeral 1502.

Figure 16:
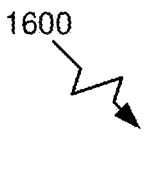
FIG. 16 is a graphical representation illustrating a "Bowtie Join" coverage count on the same drawing.
Figure 16:
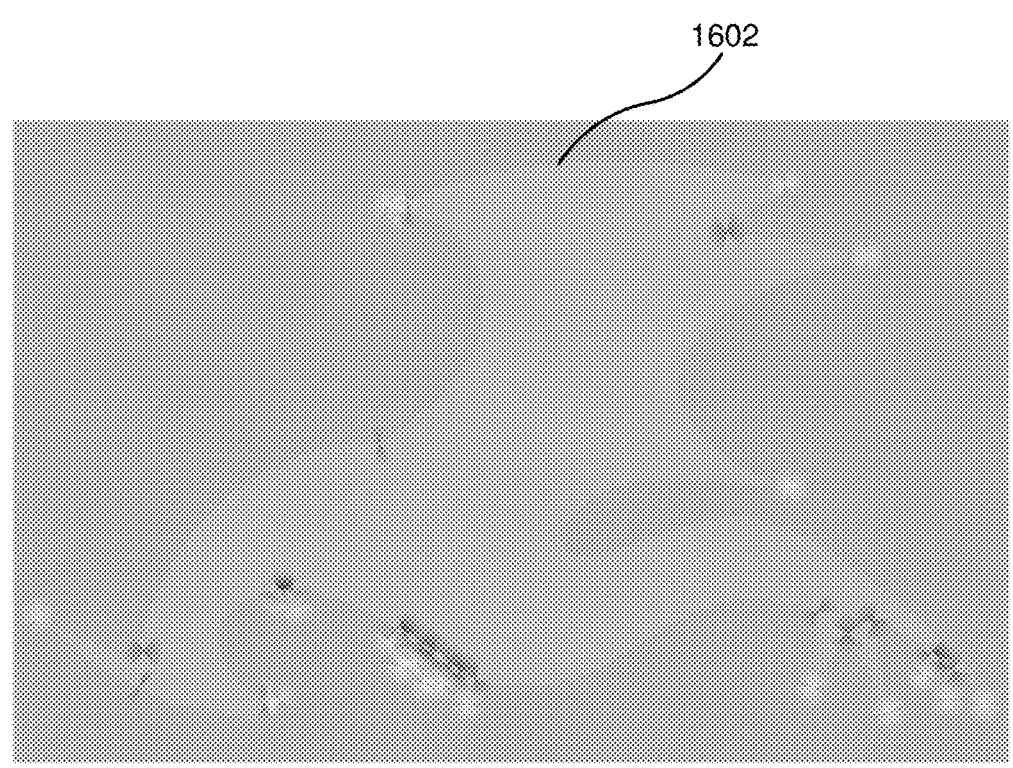
Figure 16:
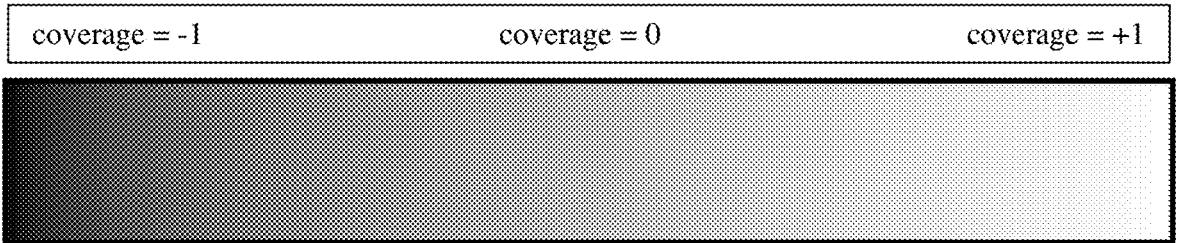
Figure 17:
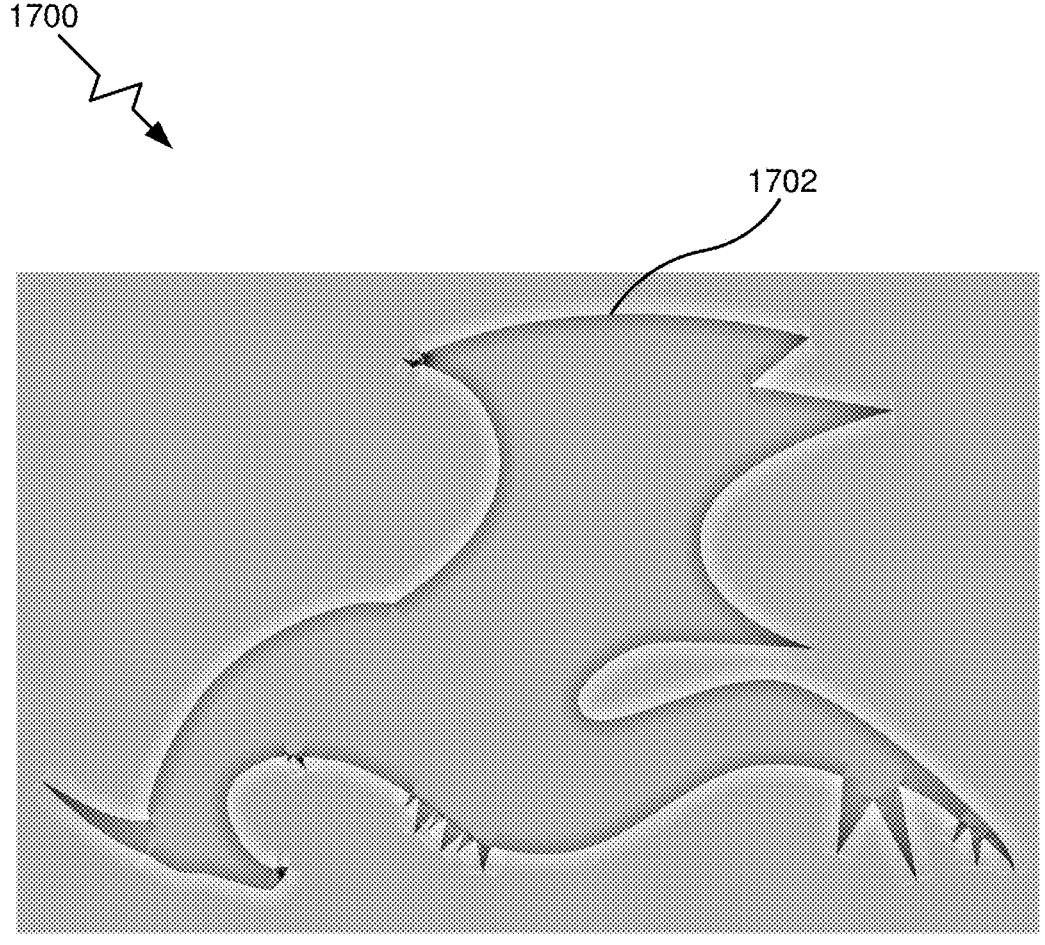
FIG. 17 is a graphical representation illustrating an individual Bézier stroke coverage count on the same drawing.
Figure 18:
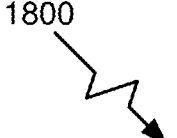
FIG. 18 is a graphical representation illustrating a completed antialiasing stroke on the same drawing.
Figure 18:
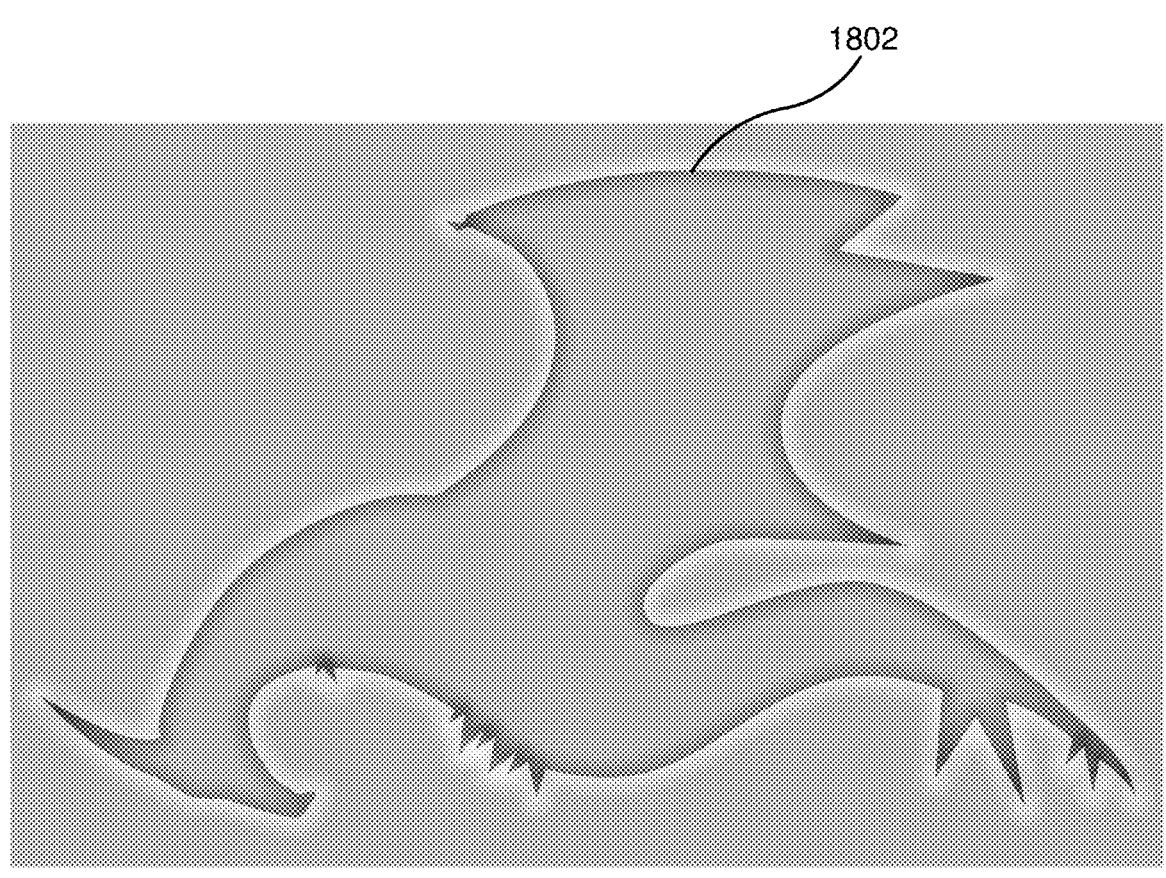

FIG. 16 illustrates a graphical user interface 1600, which shows the "Bowtie join" coverage count. The path is designated by reference numeral 1602. FIG. 17 a graphical user interface designated by reference numeral 1700, which illustrates the individual Bézier stroke coverage count. The path is designated by reference numeral 1702. FIG. 18 shows a graphical user interface 1800, with the completed antialiasing stroke. The path is designated by the reference numeral 1802.

Figure 19:
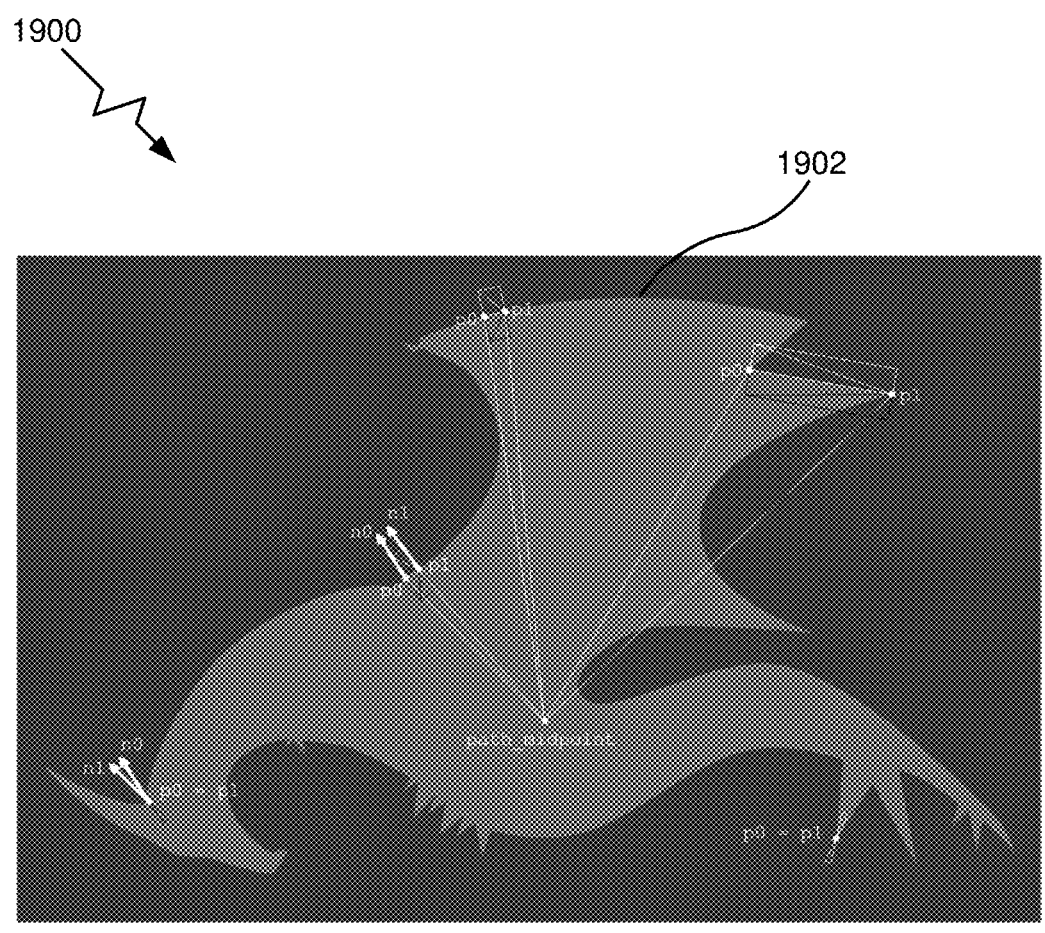
FIG. 19 is a graphical representation illustrating a technique of the present invention used on the same drawing. As illustrated, there are three different Bézier segments and two Bowtie segments, each with five triangles. It should be recognized that three of the five triangles in a Bowtie segment become degenerate since "p0=p1." It should also be recognized that "n0" and "n1" always cross in Bowtie segments.

Referring now to FIG. 19, in one example implementation, the algorithms of the present invention execute a first function to subdivide the entire path into "linear segments." Each linear segment consists of a beginning and ending point (p0 and p1). The beginning and ending normal vectors are configured to point in the left direction (n0 and n1). The points (p0, n0) and (p1, n1) are shared with the previous and next segments respectively. It should be recognized that slices of a "Bowtie Join" are just a special case of linear segment where p0=p1. The algorithm uses Wang's formula, to determine how many linear segments to subdivide Béziers. The Wang's formula gives the minimum number of evenly spaced (in the parametric sense) line segments that a Bézier curve may be divided into in order to guarantee all lines stay within a distance of "1/precision" pixels from the true curve. The definition of Wang's Formula for a Bézier curve of degree "n" is as follows:

$$\text{maxLength} = \max([\text{length}(p[i+2] - 2p[i+1] + p[i]) \text{ for } (0 <= i <= n-2)])$$

$$\text{numParametricSegments} = \text{sqrt}(\text{maxLength} * \text{precision} * n * (n-1)/8)$$

Those skilled in the art may reference Wang's Formula in Chapter 5, sub-chapter 6.3 in the book by Ron Goldman, published in 2003, titled "Pyramid Algorithms: A Dynamic Programming Approach to Curves and Surfaces for Geometric Modeling," published by Morgan Kaufmann Publishers, the contents of which are incorporated herein by reference.

Figure 20:
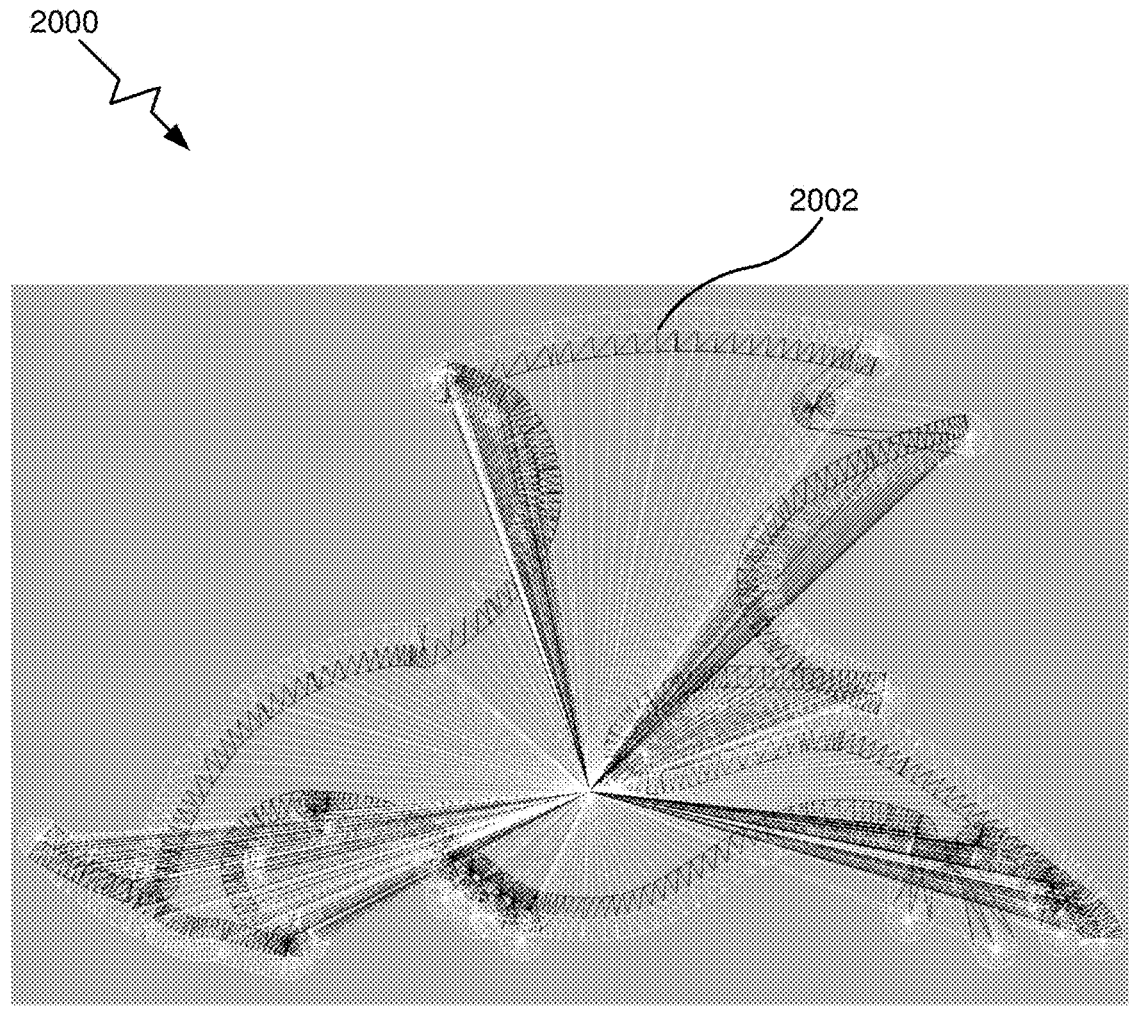
FIG. 20 is a graphical representation illustrating all triangles taken from all linear segments of the same drawing.
Figure 20:
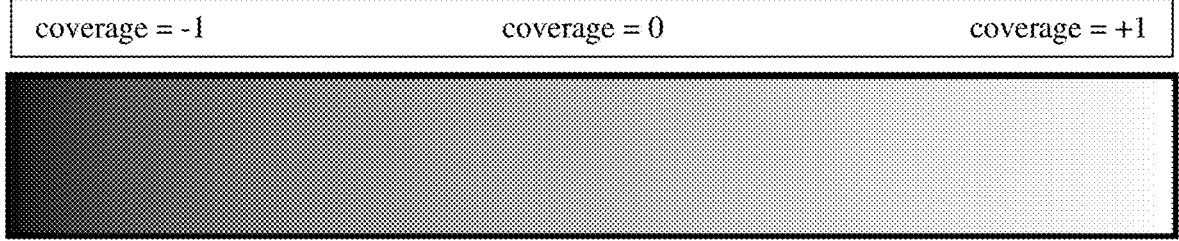
Figure 21:
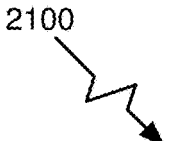
FIG. 21 is a graphical representation illustrating a coverage count of all triangles from all linear segments of the same drawing (stroke width enlarged for visualization).
Figure 21:
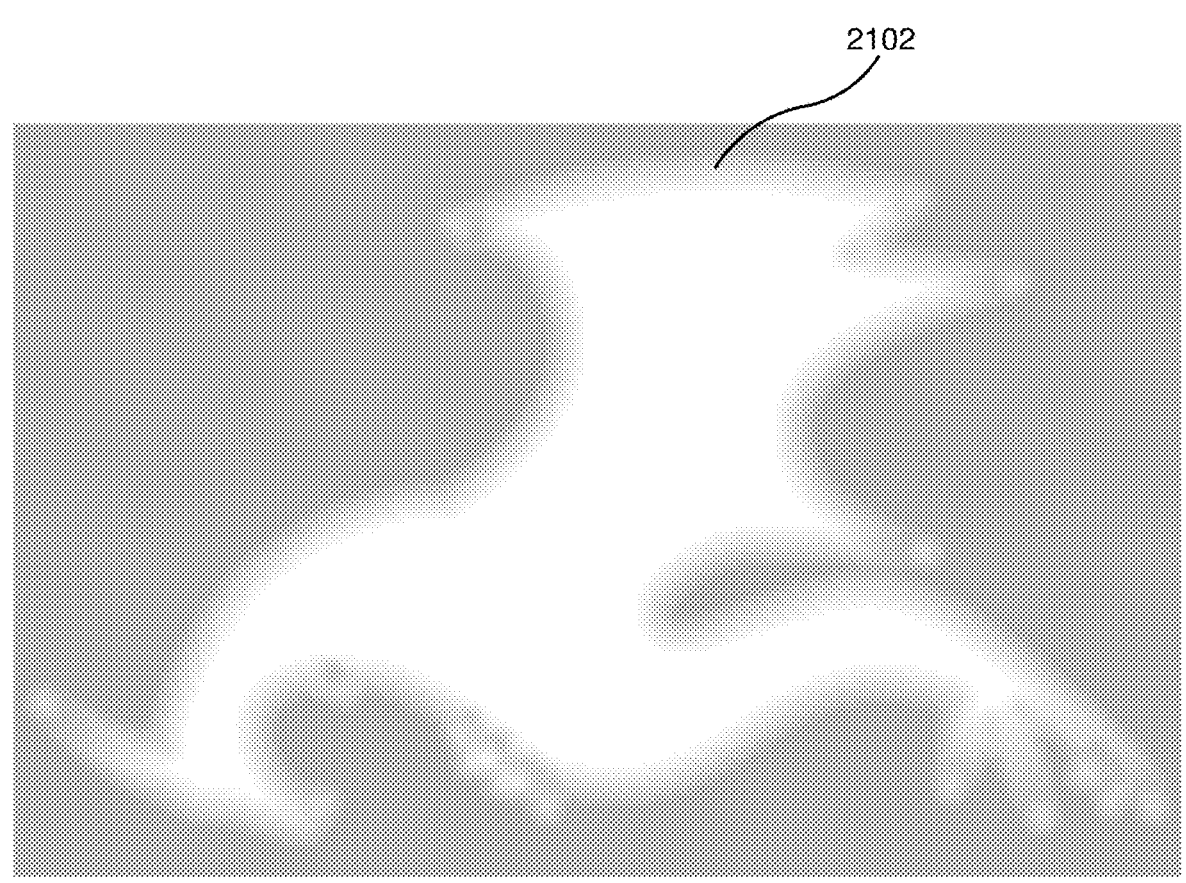
Figure 22:
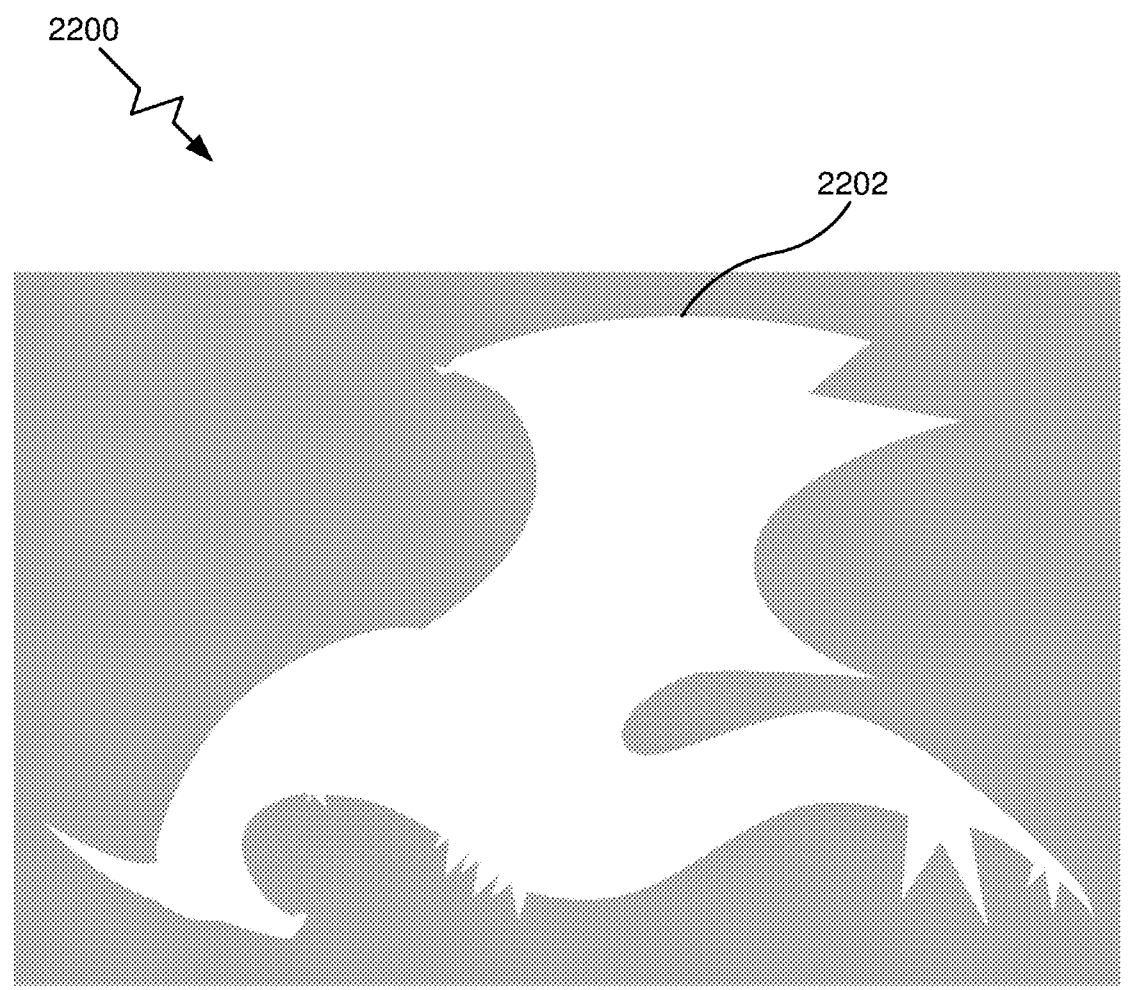
FIG. 22 is a graphical representation illustrating a coverage count of all the triangles from all linear segments of the same drawing (stroke with ~=1 pixel).

Referring now to FIGS. 19 and 20, in operation, a user may give the formula a curve, and the formula informs how many line segments to divide it up into.

The algorithm is configured to provide the formula with a curve and the formula then informs how many line segments to divide it up into. This function is performed by using tessellation and/or geometry shaders, instancing, compute shaders, CPU-side generation, or any other method. As coverage counting is a commutative operation, one can reorder and interleave triangles from the antialiasing stroke and the path interior. In some embodiments, for each linear segment, the following 5 triangles are emitted, with interpolated coverage values at each vertex. A simple fan from the midpoint may be used as illustrated in FIG. 19. FIG. 19 illustrates a representation designated generally by reference numeral 1900, with three different Bézier segments and two Bowtie segments, each with five triangles. In this figure, three of the 5 triangles in a Bowtie segment become degenerate since p0-p1. Also, it should be recognized that n0 and n1 always cross in Bowtie segments.

a) Further, in some embodiments, the algorithm continues with the following functions. Two clockwise (usually) triangles to the left of the segment for the Antialiasing Stroke:
  (One of these becomes degenerate in a Bowtie segment because p0=p1)

| Position | Coverage | Position | Coverage |
|---|---|---|---|
| p0 | 0.5 | p0 | 0.5 |
| p0 + ½n0 | 0.0 | p1 + ½n1 | 0.0 |
| p1 + ½n1 | 0.0 | p1 | 0.5 | b) Two counterclockwise (usually) triangles to the right of the segment for the Antialiasing Stroke, mirroring the left-side triangles:
  (One of these becomes degenerate in a Bowtie segment because p0=p1)

| Position | Coverage | Position | Coverage |
|---|---|---|---|
| p0 | 0.5 | p0 | 0.5 |
| p0 − ½n0 | 0.0 | p1 − ½n1 | 0.0 |
| p1 − ½n1 | 0.0 | p1 | 0.5 | c) A flat-coverage, hard-edge triangle to the midpoint of the path, for drawing the path interior according to the "Redbook" method. This will be appropriately clockwise or counter clockwise, depending on the segment's orientation relative to the center of the path:

(This triangle will be degenerate for "Bowtie Joins" because p0=p1)

| Position | Coverage |
|---|---|
| p0 | 1.0 |
| p1 | 1.0 |
| path_midpoint | 1.0 |

The key features of the rendering tool in accordance with the present invention include the Antialiasing Stroke, which performs several critical functions, including 1) creating a hard geometric edge down the center, 2) emitting clockwise triangles on the left side of the center line, counterclockwise on the right, and 3) interpolating coverage from 0.5 in the center to 0 on the outer edges. Another feature is the "Bowtie Join," which is configured to tie together the individual Bézier strokes to make a complete Antialiasing Stroke. The third critical feature is the Single draw call, which includes creating triangles for the Antialiasing Stroke, including "Bowtie Joins," and the path interior may all be emitted by a single draw call. In a coverage counting system this produces a complete antialiased path mask. In some embodiments, a novel method referred to herein as "Manhattan Antialiasing" is a technique developed where the width of a coverage ramp is configured to be equal to the Manhattan length of its normal vector, instead of 1 pixel. In one scenario, the minimum width is configured to be 1 pixel, for horizontal and vertical lines and the maximum width is set to sqrt(2) pixels, for 45 degree lines. This Manhattan Antialiasing ("AA") technique yields smoother results on a grid of square pixels. To implement this Manhattan AA technique with the Antialiasing Stroke, the algorithm outsets the left and right vertices by ½sign(n0) and ½sign(n1), instead of ½n0 and ½n1. FIG. 23 illustrates an example graphic image created by implementing the Manhattan AA technique with the antialiasing stroke. FIGS. 23, 24, 27, and 29 illustrates the result of using the Manhattan AA technique. In FIG. 27, the ramp is visibly wider when on the diagonal.

Figure 25:
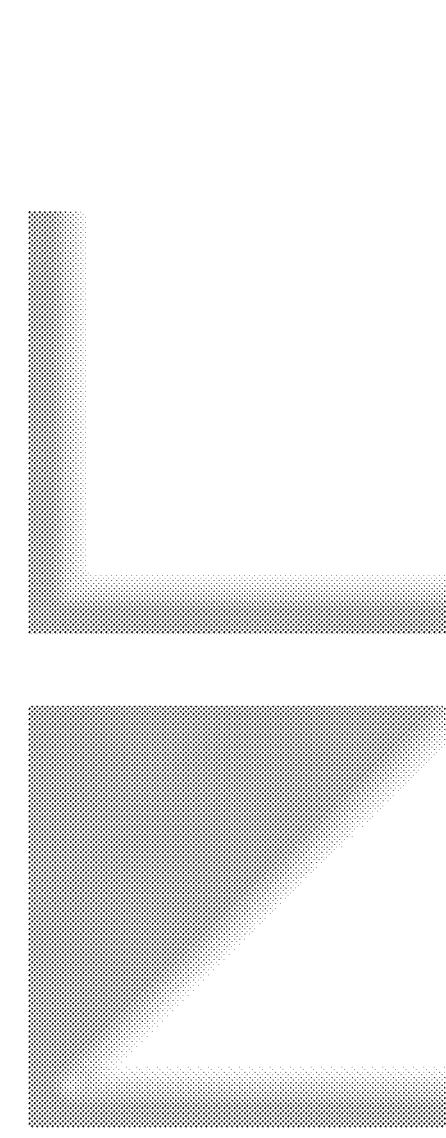
FIG. 25 is a graphical representation illustrating an artifact where 45-degree corners have too much coverage. In practice, this is not perceptible when the antialiasing stroke is only 1 pixel wide.
Figure 26:
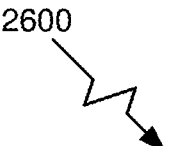
Figure 26:
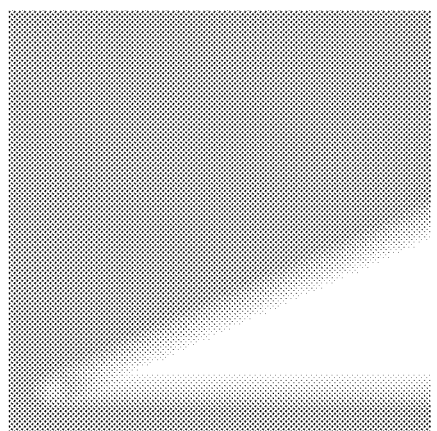
Figure 26:
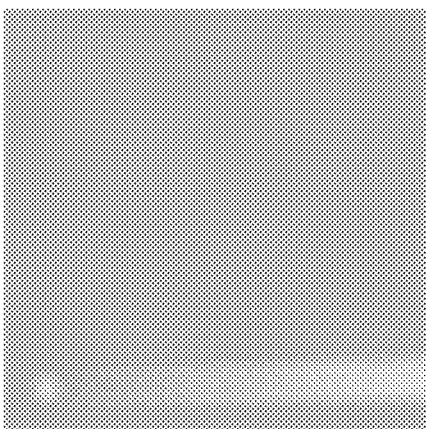

In another scenario containing acute corners, the algorithm is effective by executing its "Bowtie Joins" feature. At angles sharper than 90 degrees, "Bowtie Joins" produce a circular region with a lot of coverage (see FIGS. 25 and 26). The sharper the corner, the more pronounced the coverage. In some instances, this occurrence may not need to be fixed as there is just one pixel on a corner. This feature has no observable negative effects. Advantageously, the "Bowtie Join" erases the discontinuities caused by individual Bézier strokes. In the event, if negative effects should occur, they may be introducing an angle-dependent correction factor to the entire circular region after the Bowtie coverage has been applied. However, when using the "Manhattan" antialiasing technique and only one triangle per bowtie join, these corner artifacts are drastically reduced, and a need for such a correction factor on sharp corners has not been observed in practice. This function is illustrated in FIGS. 25 and 26, designated generally by reference numerals 2500 (in FIG. 25) and 2600 (in FIG. 26).

Referring now to FIGS. 27-38, additional example images are created using the antialiasing stroke, showing triangles generated during the antialiasing stroke, the path interior of the images, the enlarged width visualization of the stroke, the "Bowtie Join" triangles created, all triangles generated from all linear segments, coverage count of all triangles for both enlarged stroke width and 1 pixel stroke width, and the final results from using these techniques and algorithms embodied as software tools for developers and other users. FIGS. 27-38 illustrate a graphical user interface in each of these figures. Specifically, the graphical user interface in FIG. 27 is designated by reference numeral 2700, in FIG. 28, by reference numeral 2800, in FIG. 29, by reference numeral 2900, in FIG. 30, by reference numeral 3000, in FIG. 31, by reference numeral 3100, in FIG. 32, by reference numeral 3200, in FIG. 33, by reference numeral 3300, in FIG. 34, by reference numeral 3400, in FIG. 35, by reference numeral 3500, in FIG. 36, by reference numeral 3600, in FIG. 37, by reference numeral 3700, and in FIG. 38, by reference numeral 3800, respectively. FIG. 27 illustrates a path of the letter "A," designated by reference numeral 2702 and a heart, designated by reference numeral 2704. FIG. 28 illustrates a path of the letter "A," designated by reference numeral 2802 and a heart, designated by reference numeral 2804. FIG. 29 illustrates a path of the letter "A," designated by reference numeral 2902 and a path of a heart, designated by reference numeral 2904. FIG. 32 illustrates multiple bowtie joins designated by reference numeral 3202. FIG. 31 illustrates a path of the letter "A," designated by reference numeral 3102 and a heart, designated by reference numeral 3104. FIG. 34 illustrates a path of the letter "A," designated by reference numeral 3402 and a path of a heart, designated by reference numeral 3404. FIG. 33 illustrates a path of the letter "A," designated by reference numeral 3302 and a path of a heart, designated by reference numeral 3304. FIG. 30 illustrates a path of the letter "A," designated by reference numeral 3002 and a path of a heart, designated by reference numeral 3004. FIG. 35 illustrates a path of the letter "A," designated by reference numeral 3502 and a path of a heart, designated by reference numeral 3504. FIG. 36 illustrates a path of the letter "A," designated by reference numeral 3602 and a path of a heart, designated by reference numeral 3604. FIG. 37 illustrates a path of the letter "A," designated by reference numeral 3702 and a path of a heart, designated by reference numeral 3704. FIG. 38 illustrates a path of the letter "A," designated by reference numeral 3802 and a path of a heart, designated by reference numeral 3804.

Referring now to FIGS. 39-43, it is not required for the Antialiasing Stroke and the path interior to meet in the center of the Antialiasing Stroke. As long as they meet at some point between the inner and the outer edges of the Antialiasing Stroke, the geometric result is identical. In some embodiments, it may be more practical and/or efficient to choose an off-center meeting point. The illustrations in FIGS. 40-44 clearly show that an antialiasing stroke and path interior that meet on the inner and outer edges are identical. on the inner and outer edges are identical. It should also be noted that slightly different coverage values must be chosen when the antialiasing stroke and path interior do not meet on the center line. The required values are dependent on the meeting point, and must be determined by an implementer who is skilled in the art.

The foregoing description of the embodiments of the present invention has been presented for the purposes of illustration and description. It is not intended to be exhaustive or to limit the present invention to the precise form disclosed. Many modifications and variations are possible in light of the above teaching. As will be understood by those familiar with the art, the present inventive technology may be embodied in other specific forms without departing from the spirit or essential characteristics thereof. Likewise, the particular naming and division of the modules, routines, features, attributes, methodologies and other aspects are not mandatory or significant, and the mechanisms that implement the present inventive technology or its features may have different names, divisions and/or formats. Furthermore, as will be apparent to one of ordinary skill in the relevant art, the modules, routines, features, attributes, methodologies and other aspects of the present inventive technology can be implemented as software, hardware, firmware or any combination of the three. Also, wherever a component, an example of which is a module, of the present inventive technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation of its aspects in any specific programming language, or for any specific operating system or environment. Accordingly, the disclosure of the present inventive technology is intended to be illustrative, but not limiting, of the scope of the present invention, which is set forth in the following claims.

What is claimed is:

1. A method for rendering a graphic in an interactive graphics system, via executable code stored in a memory coupled to a graphical processing unit, wherein the executable code causes the graphical processing unit to trigger control actions to:

apply an anti-aliasing stroke to a select path, by executing an algorithm to render an anti-aliased coverage mask for the select path, wherein the algorithm uses a single shader program and a single draw call and tessellates the anti-aliasing stroke and path interior into triangles, connects adjoined stroke edges with a joining function and applies coverage to tessellated triangles, including applying positive coverage to clockwise triangles and negative coverage to counter-clockwise triangles;

store three values in a pixel local storage, including a first value that designates a current path identification value, a second value that designates a coverage count, and a third value that designates an original color of a frame buffer;

store the second value at a pixel that is being covered;

store the color in the frame buffer at the pixel being covered before the current path starts rendering and storing a unique identification of a last path to be drawn at a current pixel; wherein in an instance that the path identification being rendered does not match one in the pixel local storage, determining the path is a first fragment from the path to touch the pixel;

in an instance that multiple fragments from a single path touch a same pixel, the third value enables re-blending of the path into the frame buffer using an updated second value and loading a current frame buffer color as the original color of the frame buffer into the third value in the pixel local storage;

reset the coverage count to zero to enable batching of multiple paths;

update the first value in the pixel local storage to match the identification being rendered; and perform incremental blending by rendering the path in a single pass.

2. The method according to claim 1, wherein performing incremental blending includes accumulating total coverage count or winding number.

3. The method according to claim 1, wherein the executable code causes the graphical processing unit to trigger control actions to further:

cover the path with a draw that blends into the frame buffer using the coverage count or winding number that was established in a first pass.

4. The method according to claim 1, wherein the executable code causes the graphical processing unit to trigger control actions to further:

apply an editor tool in the graphical processing unit to execute the anti-aliasing stroke.

5. The method according to claim 1, wherein the executable code causes the graphical processing unit to trigger control actions to further:

apply an algorithm executing a function to subdivide the path into a plurality of linear segments.

6. The method according to claim 1, wherein the executable code causes the graphical processing unit to trigger control actions to further:

enable access to fast, user-defined values at each pixel location.

7. The method according to claim 1, further comprising:

blending the frame buffer incrementally at every path fragment.

8. The method according to claim 7, further comprising:

storing the original frame buffer color for the current path in the pixel local storage.

9. The method according to claim 8, further comprising:

enabling incremental re-blending at every fragment, by drawing the path in a single pass.

10. The method according to claim 9, further comprising:

blending incrementally against the frame buffer's original color from when the current path began rendering, instead of current contents of a framework and storing the path identification value in a local pixel storage.

11. A non-transitory computer-readable medium storing instructions that, when executed on a processor, cause the processor to render a graphic, by performing the steps of:

applying an anti-aliasing stroke to a select path, by executing an algorithm to render an anti-aliased coverage mask for the select path, wherein the algorithm uses a single shader program and a single draw call and tessellates the anti-aliasing stroke and path interior into triangles, connects adjoined stroke edges with a joining function and applies coverage to tessellated triangles, including applying positive coverage to clockwise triangles and negative coverage to counter-clockwise triangles;

storing three values in a pixel local storage, including a first value that designates a current path identification value, a second value that designates a coverage count, and a third value that designates an original color of a frame buffer;

storing the second value at a pixel that is being covered;

storing the color in the frame buffer at the pixel being covered before the current path starts rendering and storing a unique identification of a last path to be drawn at a current pixel; wherein in an instance that the path identification being rendered does not match one in the pixel local storage, determining the path is a first fragment from the path to touch the pixel; and in an instance that multiple fragments from a single path touch a same pixel, the third value enables re-blending of the path into the frame buffer using an updated second value and loading a current frame buffer color as the original color of the frame buffer into the third value in the pixel local storage;

resetting the coverage count to zero to enable batching of multiple paths;

updating the first value in the pixel local storage to match the identification being rendered; and performing incremental blending by rendering the path in a single pass.

12. The non-transitory computer-readable medium according to claim 11, wherein performing incremental blending includes accumulating total coverage count or winding number.

13. The non-transitory computer-readable medium according to claim 11, further comprising:

a function to cover the path with a draw that blends into the framebuffer using the coverage count or winding number that was established in a first pass.

14. The non-transitory computer-readable medium according to claim 11, further comprising:

an editor tool in a graphical processing unit to execute the anti-aliasing stroke.

15. The non-transitory computer-readable medium according to claim 11, further comprising:

an algorithm executing a function to subdivide the path into a plurality of linear segments.

16. The non-transitory computer-readable medium according to claim 11, further comprising:

a function to enable access to fast, user-defined values at each pixel location.

17. The non-transitory computer-readable medium according to claim 11, further comprising:

blending the frame buffer incrementally at every path fragment.

18. The non-transitory computer-readable medium according to claim 17, further comprising:

storing the original frame buffer color for the current path in the pixel local storage.

19. The non-transitory computer-readable medium according to claim 18, further comprising:

enabling incremental re-blending at every fragment, by drawing the path in a single pass.

20. The non-transitory computer-readable medium according to claim 19, further comprising:

blending incrementally against the frame buffer's original color from when the current path began rendering, instead of current contents of a framework and storing the path identification value in a local pixel storage.

* * * * *